(12) United States Patent
Yamamoto et al.

(10) Patent No.: US 9,256,362 B2
(45) Date of Patent: Feb. 9, 2016

(54) NETWORK SYSTEM, COMMUNICATION METHOD AND COMMUNICATION TERMINAL

(75) Inventors: Masaki Yamamoto, Osaka (JP);
Masahide Takasugi, Osaka (JP);
Misuzu Kawamura, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 292 days.

(21) Appl. No.: 13/519,789

(22) PCT Filed: Dec. 24, 2010

(86) PCT No.: PCT/JP2010/073329
§ 371 (c)(1),
(2), (4) Date: Jun. 28, 2012

(87) PCT Pub. No.: WO2011/081088
PCT Pub. Date: Jul. 7, 2011

(65) Prior Publication Data
US 2012/0281020 A1 Nov. 8, 2012

(30) Foreign Application Priority Data

Dec. 29, 2009 (JP) .................... 2009-299235
Dec. 7, 2010 (JP) .................... 2010-272904

(51) Int. Cl.
*G09G 5/00* (2006.01)
*G06F 3/0488* (2013.01)
*G06F 3/0485* (2013.01)
*G06F 3/0486* (2013.01)
(Continued)

(52) U.S. Cl.
CPC .......... *G06F 3/04883* (2013.01); *G06F 3/0486* (2013.01); *G06F 3/04855* (2013.01); *H04L 12/1827* (2013.01); *G06F 2203/04806* (2013.01); *H04M 1/72544* (2013.01); *H04M 1/72555* (2013.01); *H04M 2250/22* (2013.01)

(58) Field of Classification Search
USPC .................... 345/619, 629; 382/187
See application file for complete search history.

(56) References Cited

U.S. PATENT DOCUMENTS

| 5,389,749 A | * | 2/1995 | Hokari et al. ............... 187/293 |
| 5,890,178 A | * | 3/1999 | Haneda ....................... 715/203 |
| 6,029,214 A | * | 2/2000 | Dorfman et al. ............. 710/73 |

(Continued)

FOREIGN PATENT DOCUMENTS

| JP | 2004-126338 A | 4/2004 |
| JP | 2004-234594 A | 8/2004 |

(Continued)

*Primary Examiner* — M Good Johnson
(74) *Attorney, Agent, or Firm* — Birch, Stewart, Kolasch & Birch, LLP

(57) ABSTRACT

Provided is a network system including at least first and second communication terminals capable of communicating with each other via a network. The first communication terminal causes handwritten data input in response to an instruction for a point on an image to be displayed in a certain position on the image corresponding to this point, associates the point information about the point with the handwritten data and transmits the point information and the handwritten data to the second communication terminal. Based on the point information and the handwritten data from the first communication terminal, the second communication terminal causes at least a part of the image to be displayed on a second display and also causes the handwritten data to be displayed in a location in accordance with the point information.

9 Claims, 52 Drawing Sheets

(51) Int. Cl.
*H04L 12/18* (2006.01)
*H04M 1/725* (2006.01)

(56) References Cited

U.S. PATENT DOCUMENTS

| | | | |
|---|---|---|---|
| 6,366,698 B1* | 4/2002 | Yamakita | 382/187 |
| 6,798,907 B1* | 9/2004 | Clary et al. | 382/187 |
| 7,003,308 B1* | 2/2006 | Fuoss et al. | 455/466 |
| 7,343,552 B2* | 3/2008 | Denoue et al. | 715/230 |
| 7,486,824 B2* | 2/2009 | Clary et al. | 382/187 |
| 7,499,716 B2* | 3/2009 | Helferich | 455/458 |
| 7,516,183 B2* | 4/2009 | Shiigi | 709/206 |
| 7,751,623 B1* | 7/2010 | Simmons et al. | 382/186 |
| 7,869,655 B2* | 1/2011 | Clary et al. | 382/187 |
| 8,782,159 B2* | 7/2014 | Shiigi | 709/207 |
| 2001/0056410 A1* | 12/2001 | Ishigaki | 705/67 |
| 2002/0136462 A1* | 9/2002 | Hebert, Jr. | 382/246 |
| 2003/0063067 A1* | 4/2003 | Chuang | 345/156 |
| 2003/0117379 A1* | 6/2003 | Carro | 345/173 |
| 2003/0194990 A1* | 10/2003 | Helferich | 455/412.2 |
| 2004/0263486 A1* | 12/2004 | Seni | 345/173 |
| 2005/0013487 A1* | 1/2005 | Clary et al. | 382/187 |
| 2005/0060644 A1* | 3/2005 | Patterson | 715/505 |
| 2005/0088418 A1* | 4/2005 | Nguyen | 345/173 |
| 2006/0013368 A1* | 1/2006 | LaBaw | 379/88.13 |
| 2007/0260675 A1* | 11/2007 | Forlines et al. | 709/203 |
| 2007/0288164 A1* | 12/2007 | Gordon et al. | 701/213 |
| 2008/0119235 A1* | 5/2008 | Nielsen et al. | 455/566 |
| 2009/0078473 A1* | 3/2009 | Overgard et al. | 178/18.01 |
| 2009/0220162 A1* | 9/2009 | Clary et al. | 382/246 |
| 2010/0067674 A1* | 3/2010 | Lee | 379/100.01 |
| 2010/0251106 A1* | 9/2010 | Barrus et al. | 715/268 |
| 2012/0192250 A1* | 7/2012 | Rakan | 726/2 |

FOREIGN PATENT DOCUMENTS

| | | |
|---|---|---|
| JP | 2008-40703 A | 2/2008 |
| WO | WO 2007/122989 A1 | 11/2007 |

* cited by examiner

| RCVTELNO | SENDER'S TELEPHONE NUMBER |
|---|---|
| RCVMAIL | STORAGE AREA FOR RECEIVED MAIL |
| SENDMAIL | STORAGE AREA FOR TRANSMITTED MAIL |
| SEL | MEMORY NUMBER OF SELECTED ADDRESS |
| ROOM_NAME | GENERATED ROOM NAME |

~103A

| . MAIN | BODY OF MAIL |
|---|---|
| . FROM | MAIL ADDRESS OF SENDER OF MAIL |
| . TO | MAIL ADDRESS OF DESTINATION OF MAIL |

(b)

| AdrDB[] ADDRESS BOOK DATA | MEMORY NO. (MNO) | NAME (Name) | TELEPHONE NUMBER (TELNo) | MAIL ADDRESS (MailADR) | ... |
|---|---|---|---|---|---|
| | 001 | NAME 1 | 090-XXXX-XXX1 | Name1@xxx.xxx.xxx | |
| | 002 | NAME 2 | 090-XXXX-XXX2 | Name2@yyy.yyy.yyy | |
| | 003 | NAME 3 | 090-XXXX-XXX3 | Name3@zzz.zzz.zzz | |
| | 004 | NAME 4 | 090-XXXX-XXX4 | Name4@xxx.xxx.xxx | |
| | 005 | NAME 5 | 090-XXXX-XXX5 | Name5@yyy.yyy.yyy | |
| | 006 | NAME 6 | 090-XXXX-XXX6 | Name6@zzz.zzz.zzz | |
| | ... | | | | |

~103B (c)

| MyAdr OWN TERMINAL'S DATA | NAME (Name) | TELEPHONE NUMBER (TELNo) | MAIL ADDRESS (MailADR) |
|---|---|---|---|
| | NAME 0 | 090-YYYY-YYYY | Name0@xxx.xxx.xxx |

~103C (d)

| HIS_IPADR | IP ADDRESS OF PARTNER OF COMMUNICATION | ~103D |
|---|---|---|
| MY_IPADR | IP ADDRESS OF OWN TERMINAL | ~103E |

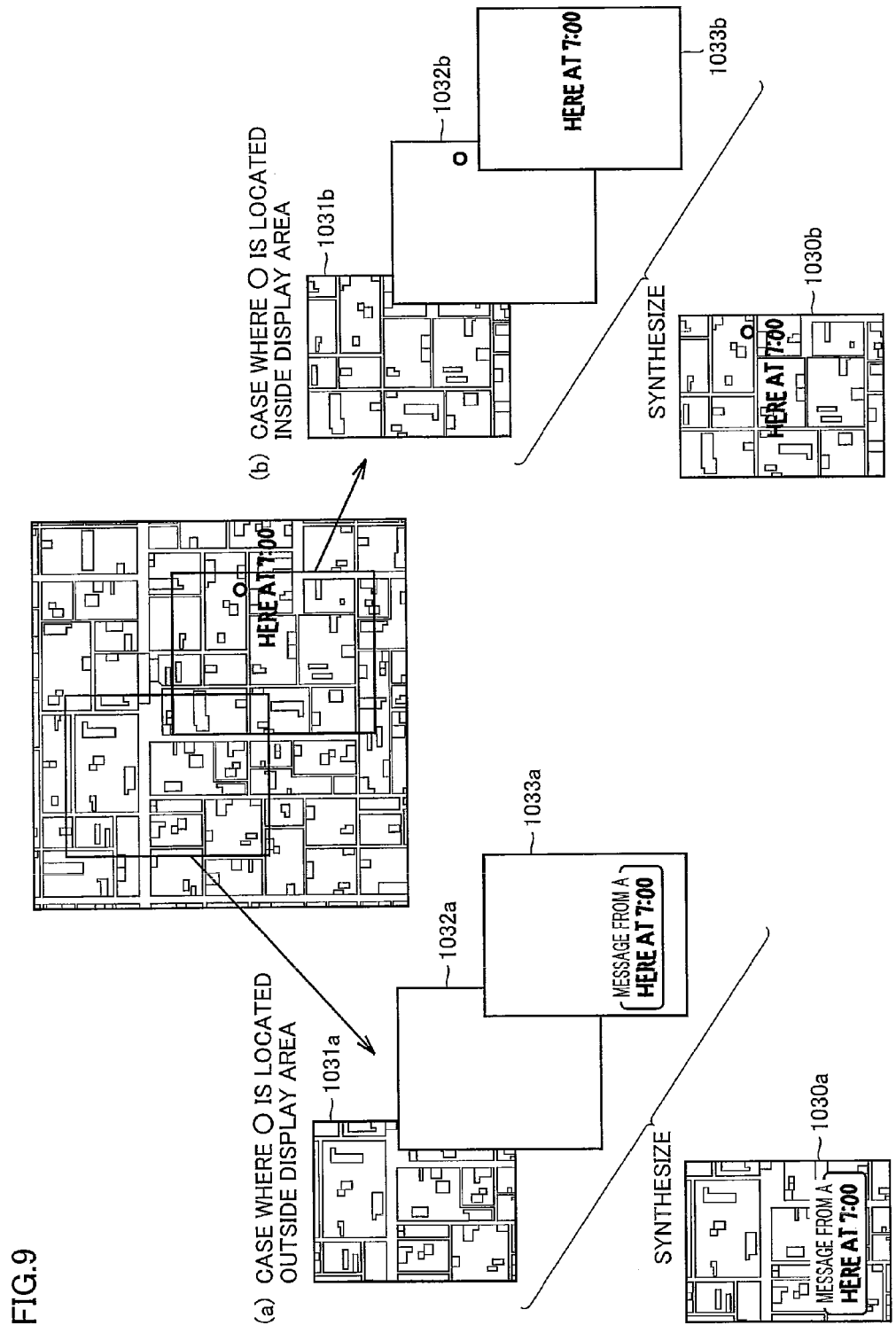

| ROOM NAME | TERMINAL INFORMATION (IP ADDRESS) |
|---|---|
| R | A |
| S | B |
| R | C |
| T | D |
|  |  |
|  |  |

~406A (b)

| ROOM NAME | TERMINAL INFORMATION (IP ADDRESS) |
|---|---|
| R | A |
| S | B |
| R | C |
| T | D |
| S | E |
|  |  |

| | ITEMS | DETAILS OF ITEMS | REFERENCE | FIRST EXAMPLE ITEM NAME | FIRST EXAMPLE DATA |
|---|---|---|---|---|---|
| (a) | POINT POSITION INFORMATION | POSITION OF DATA PAIRED WITH BACKGROUND INFORMATION | (Ax, Ay) *STARTING POINT LOCATED AT UPPER LEFT IN BACKGROUND IMAGE | point | (50, 530) |
| (b) | POINT-INDICATING SIGN INFORMATION | IMAGE DATA OF POINT POSITION INDICATING SIGN | ↙ | signbin | — |
| (c) | | RECTANGLE OF POINT POSITION INDICATING SIGN | (Cx1, Cy1, Cx2, Cy2) *STARTING POINT LOCATED AT UPPER LEFT IN BACKGROUND IMAGE | sign | (50, 450, 130, 530) |
| (d) | | RECTANGLE AS CANDIDATE FOR DISPLAY POSITION OF (e) | (Dx1, Dy1, Dx2, Dy2) *STARTING POINT LOCATED AT UPPER LEFT IN BACKGROUND IMAGE | signinfo | (100, 350, 400, 420) |
| (e) | HANDWRITING INFORMATION | IMAGE DATA OF ADDITIONAL INFORMATION ABOUT POINT | HERE AT 7:00 | infobin | — |
| (f) | | RECTANGLE OF ADDITIONAL INFORMATION ABOUT POINT | (Fx1, Fy1, Fx2, Fy2) *STARTING POINT LOCATED AT UPPER LEFT IN BACKGROUND IMAGE | info | (70, 300, 320, 450) |
| (g) | BACKGROUND INFORMATION (MAP) | CENTER OF MAP LOCATED EQUIDISTANT FROM EACH END OF MAP | [LATITUDE, LONGITUDE] | center | [40.714728, −73.998672] |
| (h) | | MAGNIFICATION LEVEL OF MAP (SCALING) | zoom | zoom | 14 |
| (i) | | SIZE OF MAP IMAGE | width x height | size | 480 x 640 |

FIG.19

IN CASE OF HTTP COMMUNICATION:

Content-Type: multipart/form-data; boundary=----

----

Content-Disposition: form-data; name="point"

50, 530

----

Content-Disposition: form-data; name="signbin"; filename="signbin.gif" Content-Type: image/gif (IMAGE DATA OF POINT POSITION POINTING SIGN DATA)

----

Content-Disposition: form-data; name="sign"

50, 450, 130, 530

----

Content-Disposition: form-data; name="signinfo"

100, 350, 400, 420

----

Content-Disposition: form-data; name="infobin"; filename="signbin.gif" Content-Type: image/gif (IMAGE DATA OF HANDWRITTEN DATA)

IN CASE OF TCP/IP COMMUNICATION
(DEFINE RETURN AS SEPARATOR OF DATA):
   point=40.714728,-73.998672[RETURN]
   signbin=<DATA SIZE> [RETURN]
   (IMAGE DATA OF POINT POSITION INDICATING SIGN)
   sign=50,450,130,530[RETURN]
   signInfo=100,350,400,420[RETURN]
   infobin=<DATA SIZE> [RETURN]
   (IMAGE DATA OF ADDITIONAL INFORMATION ABOUT POINT)
   info=70,300,320,450[RETURN]
   center=40. 714728,-73.998672[RETURN]
   zoom=14[RETURN]
   size=480,640[RETURN]

．
DATA (a)
EXIST AROUND HERE ON MAP

．
DATA (a)
EXIST AROUND HERE ON MAP

．
DATA (a)
EXIST AROUND HERE ON MAP

■
DATA (a)
EXIST AROUND HERE ON MAP

■
DATA (a)
EXIST AROUND HERE ON MAP

■
DATA (a)
EXIST AROUND HERE ON MAP

NETWORK SYSTEM, COMMUNICATION METHOD AND COMMUNICATION TERMINAL

TECHNICAL FIELD

The present invention relates to a network system including at least first and second communication terminals capable of communicating with each other via a network, a communication method and a communication terminal, and particularly to a network system having first and second communication terminals transmitting and receiving contents to and from each other, a communication method and a communication terminal.

BACKGROUND ART

There is a known network system in which a plurality of communication terminals connectable to an Internet network directly exchange contents data with one another. Examples of the network system include a server/client system, a P2P (Peer to Peer) system and the like. In such a network system, each of the communication terminals transmits and receives photographic image data, data for identifying the image storing position, handwritten image data (handwritten data), text data, and the like. Then, each of the communication terminals causes a display to display images and texts based on the received data.

For example, Japanese Patent Laying-Open No. 2004-234594 (PTL 1) discloses a photo-communication system. According to Japanese Patent Laying-Open No. 2004-234594 (PTL 1), a pair of information communication terminals includes image input means for receiving image data from a memory card and the like of a digital camera; data recording means for recording image data and the like; input means for a user providing an instruction input therethrough; image display means for displaying a recorded image and the like; data communication means for exchanging the data such as the recorded image with another terminal; and control means for controlling execution of each terminal. Each of the pair of information communication terminals is configured such that, when a handwritten graphic element is written through the input means overlaid on the image display means while looking at the image displayed on the image display means, the results of scribbles including images are displayed on another information communication terminal in real time.

CITATION LIST

Patent Literature

PTL 1: Japanese Patent Laying-Open No. 2004-234594

SUMMARY OF INVENTION

Technical Problem

However, the communication terminal on the receiving side may not be able to entirely display the contents that have been received by the communication terminal on the transmitting side. For example, some of the contents may be covered since the display of the communication terminal on the receiving side is relatively small in size.

The present invention has been made to solve the above-described problems. An object of the present invention is to allow the communication terminal on the receiving side to display the contents transmitted from the communication terminal on the transmitting side in the position desired by the communication terminal on the transmitting side.

Solution to Problem

According to an aspect of the present invention, a network system including at least first and second communication terminals capable of communicating with each other via a network is provided. The first communication terminal includes a first display, a first communication device and a first processor. The first processor causes an image to be displayed on the first display, causes handwritten data input in response to an instruction for a point on the image to be displayed in a certain position on the image corresponding to the point, associates point information about the point with the handwritten data, and causes the first communication device to transmit the point information and the handwritten data to the second communication terminal. The second communication terminal includes a second display, a second communication device and a second processor. Based on the point information about the point and the handwritten data from the first communication terminal, the second processor causes at least a part of the image to be displayed on the second display and causes the handwritten data to be displayed in a location in accordance with the point information.

Preferably, the image is greater in size than the second display.

Preferably, the second processor determines whether or not the point in the image is displayed on the second display. When the point is displayed, the second processor causes the handwritten data to be entirely displayed on the second display based on the point information.

Preferably, when the point is displayed, the second processor determines whether or not the second display can entirely display the handwritten data. When the second display cannot entirely display the handwritten data, the second processor causes the handwritten data to be moved based on the point information, thereby allowing the handwritten data to be entirely displayed on the second display.

Preferably, when the point is displayed, the second processor determines whether or not the second display can entirely display the handwritten data. When the second display cannot entirely display the handwritten data, the second processor reduces a size of the handwritten data based on the point information, thereby allowing the handwritten data to be entirely displayed on the second display.

Preferably, when the point is not displayed, the second processor causes the handwritten data to be displayed in a prescribed position on the second display.

Preferably, when the point is not displayed, the second processor causes an image showing a direction of the point to be displayed on the second display.

Preferably, the image is a map.

According to another aspect of the present invention, a communication method in a network system including at least first and second communication terminals capable of communicating with each other via a network is provided. The communication method includes the steps of: the first communication terminal receiving an instruction for a point on an image; the first communication terminal receiving an input of handwritten data; the first communication terminal causing at least a part of the image to be displayed on a first display and causing the handwritten data to be displayed in a location corresponding to the point; the first communication terminal associating point information about the point with the handwritten data and causing a first communication device to transmit the point information and the handwritten data to the second communication terminal; and, based on the point information and the handwritten data from the first communication terminal, the second communication terminal causing at least a part of the image to be displayed on a second display and causing the handwritten data to be displayed in a location in accordance with the point information.

According to another aspect of the present invention, a communication terminal capable of communicating with another communication terminal via a network is provided. The communication terminal includes a display; a communication device; and a processor. The processor causes handwritten data input in response to an instruction for a point of an image displayed on the display to be displayed in a certain position on the image corresponding to the point, associates point information about the point with the handwritten data, and causes the communication device to transmit the point information and the handwritten data to another communication terminal.

According to another aspect of the present invention, a communication terminal capable of communicating with another communication terminal via a network is provided. The communication terminal includes a display; a communication device; and a processor. Based on point information and handwritten data from another communication terminal, the processor causes the display to display the handwritten data in a location in accordance with the point information.

Advantageous Effects of Invention

As described above, the network system, the communication method and the communication terminal according to the present invention allow the communication terminal on the receiving side to display the contents transmitted from the communication terminal on the transmitting side in a position desired by the transmitting side.

BRIEF DESCRIPTION OF DRAWINGS

FIG. 8 is a representation of various kinds of data structures constituting a memory according to the present embodiment.

FIG. 9 is a representation of the data structure of image data according to the present embodiment.

FIG. 11 is a representation of the data structure of a room management table stored in a memory or a fixed disk of the chat server according to the present embodiment.

FIG. 13 is a representation of the data structure of transmit data according to the present embodiment.

FIG. 19 is a diagram showing an example of the transmit data in the case where chat communication is performed based on an HTTP (HyperText Transfer Protocol) according to the present embodiment.

FIG. 20 is a diagram showing an example of the transmit data in the case where chat communication is performed based on a TCP/IP (Transmission Control Protocol/Internet Protocol) according to the present embodiment.

DESCRIPTION OF EMBODIMENTS

Figure 1:
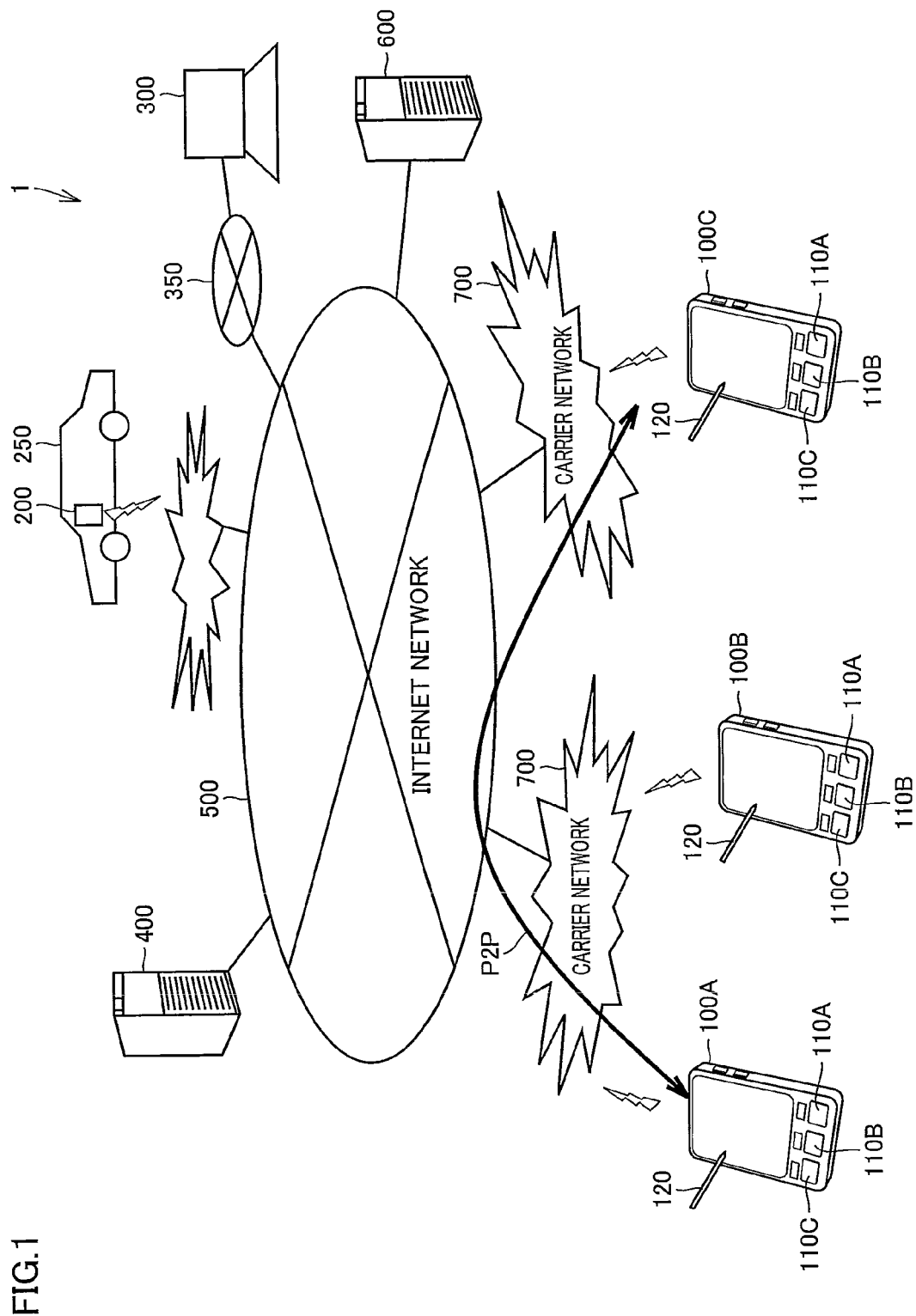
FIG. 1 is a schematic diagram showing an example of a network system according to the present embodiment.

The embodiments of the present invention will be hereinafter described with reference to the accompanying drawings. In the following description, the same components are designated by the same reference characters. Names and functions thereof are also the same. Accordingly, the detailed description thereof will not be repeated.

Furthermore, hereinafter, a mobile phone 100 will be referred to as a representative example of a "communication terminal". However, the communication terminal may be a personal computer, a car navigation device (a satellite navigation system), a personal navigation device (PND), a personal data assistance (PDA), or other information communication devices connected to a network, such as a game machine, an electronic dictionary and an electronic book.

<General Configuration of Network System 1>

The general configuration of a network system 1 according to the present embodiment will be first described. FIG. 1 is a schematic diagram showing an example of network system 1 according to the present embodiment. As shown in FIG. 1, network system 1 includes mobile phones 100A, 100B and 100C, a chat server (first server device) 400, a contents server (second server device) 600, an Internet network (first network) 500, and a carrier network (second network) 700. Furthermore, network system 1 according to the present embodiment includes a car navigation device 200 mounted in a vehicle 250, and a personal computer (PC) 300.

Note that, to facilitate description, hereinafter described will be network system 1 according to the present embodiment including a first mobile phone 100A, a second mobile phone 100B and a third mobile phone 100C. Furthermore, in describing a configuration, a function or the like common to mobile phones 100A, 100B and 100C, the mobile phones will also collectively be referred to as mobile phone 100. Furthermore, in describing a configuration, a function or the like common to mobile phones 100A, 100B and 100C, car navigation device 200, and personal computer 300, they will also collectively be referred to as a communication terminal.

Mobile phone 100 is configured to be connectable to carrier network 700. Car navigation device 200 is configured to be connectable to Internet network 500. Personal computer 300 is configured to be connectable through a local area network (LAN) 350, a wide area network (WAN) or the like to Internet network 500. Chat server 400 is configured to be connectable to Internet network 500. Contents server 400 is configured to be connectable to Internet network 500.

More specifically, first mobile phone 100A, second mobile phone 100B, third mobile phone 100C, car navigation device 200, and personal computer 300 are interconnectable via carrier network 700, mail transmission server (chat server 400 in FIG. 2), contents server 600 (in the case shown in FIG. 65), Internet network 500, and also capable of mutually transmitting and receiving data. Furthermore, mobile phone 100, car navigation device 200 and personal computer 300 are assigned identification information such as a mail address, an Internet protocol (IP) address or the like for identifying their own terminals. In other words, mobile phone 100, car navigation device 200 and personal computer 300 can each store identification information of other communication terminals in its internal storage medium and, based on that identification information, communicate data with the other communication terminals via carrier network 700, Internet network 500 and/or the like.

Note that mobile phone 100, car navigation device 200 and personal computer 300 according to the present embodiment can use IP addresses assigned to other terminals to each communicate data with these other communication terminals without depending on servers 400 and 600. That is, network system 1 according to the present embodiment includes mobile phone 100, car navigation device 200 and personal computer 300 that is capable of configuring a so-called peer-to-peer (P2P) type network.

Herein, when each communication terminal accesses chat server 400, that is, when each communication terminal accesses the Internet, the communication terminal is assigned an IP address by chat server 400 or another server device (not shown). The IP address is assigned in a process known in detail, and accordingly, how the IP address is assigned will not be described in detail.

<General Outline of Operation of Network System 1>

Figure 2:
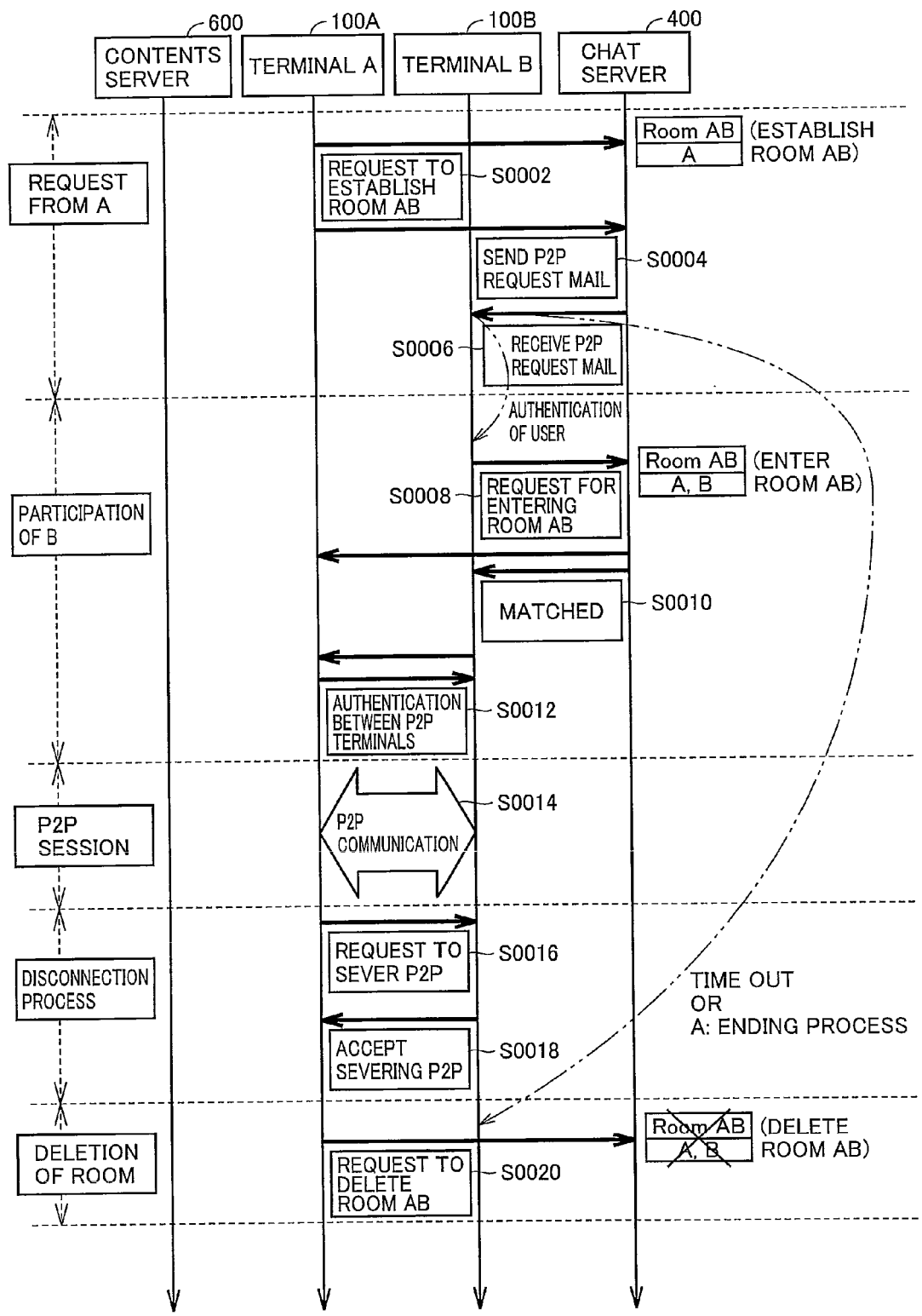
FIG. 2 is a sequence diagram showing an outline of the operation in the network system according to the present embodiment.

Network system 1 according to the present embodiment generally operates, as will be described hereinafter. FIG. 2 is a sequence diagram showing an outline of an operation in network system 1 according to the present embodiment. As shown in FIGS. 1 and 2, the communication terminals according to the present embodiment first need to exchange (or obtain) their IP addresses mutually in order to perform P2P type data communication. Once each communication terminal has obtained an IP address, the communication terminal performs P2P type data communication to transmit a message, an attached file, and/or the like to the other communication terminals.

Hereinafter, however, will be described how each communication terminal communicates a message, an attached file and/or the like through a chat room generated by chat server 400, and also will be described how first mobile phone 100A generates a new chat room and invites second mobile phone 100B to the chat room.

Initially, first mobile phone 100A (indicated in FIG. 2 as a terminal A) requests IP registration (or login) from chat server 400 (step S0002). First mobile phone 100A may obtain an IP address simultaneously, or may obtain it in advance. More specifically, first mobile phone 100A transmits, to chat server 400 via carrier network 700, mail transmission server 600 (chat server 400) and Internet network 500, the mail and IP addresses of first mobile phone 100A, the mail address of second mobile phone 100B, and a message requesting generation of a new chat room.

In response to the request, chat server 400 associates the mail address of first mobile phone 100A with the IP address thereof and thus stores the addresses. Chat server 400 generates a room name based on the mail address of first mobile phone 100A and the mail address of second mobile phone 100B, and generates a chat room with that room name. Chat server 400 may notify first mobile phone 100A that the chat room has been generated. Chat server 400 associates the room name with the current participant communication terminals' IP addresses and thus stores them.

Alternatively, based on the mail address of first mobile phone 100A and the mail address of second mobile phone 100B, first mobile phone 100A generates a room name for a new chat room, and transmits that room name to chat server 400. Chat server 400 generates a new chat room based on the room name.

First mobile phone 100A transmits, to second mobile phone 100B, a P2P participation request mail indicating that the new chat room has been generated, i.e., an invitation to the chat room (step S0004, step S0006). More specifically, first mobile phone 100A transmits the P2P participation request mail to second mobile phone 100B via carrier network 700, mail transmission server 600 (chat server 400) and Internet network 500 (step S0004, step S0006). It is to be noted that chat server 400 may also serve as contents server 600.

When second mobile phone 100B receives the P2P participation request mail (step S0006), second mobile phone 100B generates a room name based on the mail address of first mobile phone 100A and the mail address of second mobile phone 100B, and transmits to chat server 400 the mail and IP addresses of second mobile phone 100B and a message indicating that second mobile phone 100B will enter the chat room having the room name (step S0008). Second mobile phone 100B may obtain an IP address simultaneously, or may initially obtain an IP address and subsequently access chat server 400.

Chat server 400 receives the message and determines whether the mail address of second mobile phone 100B corresponds to the room name, and then, chat server 400 associates the mail address of second mobile phone 100B with the IP address thereof and stores them. Then, chat server 400 signals to first mobile phone 100A that second mobile phone 100B has entered the chat room, and chat server 400 transmits the IP address of second mobile phone 100B to first mobile phone 100A (step S0010). Simultaneously, chat server 400 signals to second mobile phone 100B that chat server 400 has accepted entrance of second mobile phone 100B into the chat room, and chat server 400 transmits the IP address of first mobile phone 100A to second mobile phone 100B.

First mobile phone 100A and second mobile phone 100B obtain their partners' mail and IP addresses and authenticate each other (step S0012). Once the authentication has been completed, first mobile phone 100A and second mobile phone 100B start P2P communication (chat communication) (step S0014). The outline of the operation during the P2P communication will be described later.

When first mobile phone 100A transmits to second mobile phone 100B a message indicating that P2P communication is severed (step S0016), second mobile phone 100B transmits to first mobile phone 100A a message indicating that second mobile phone 100B has accepted the request to sever the communication (step S0018). First mobile phone 100A transmits a request to chat server 400 to delete the chat room (step S0020), and chat server 400 deletes the chat room.

Figure 3:
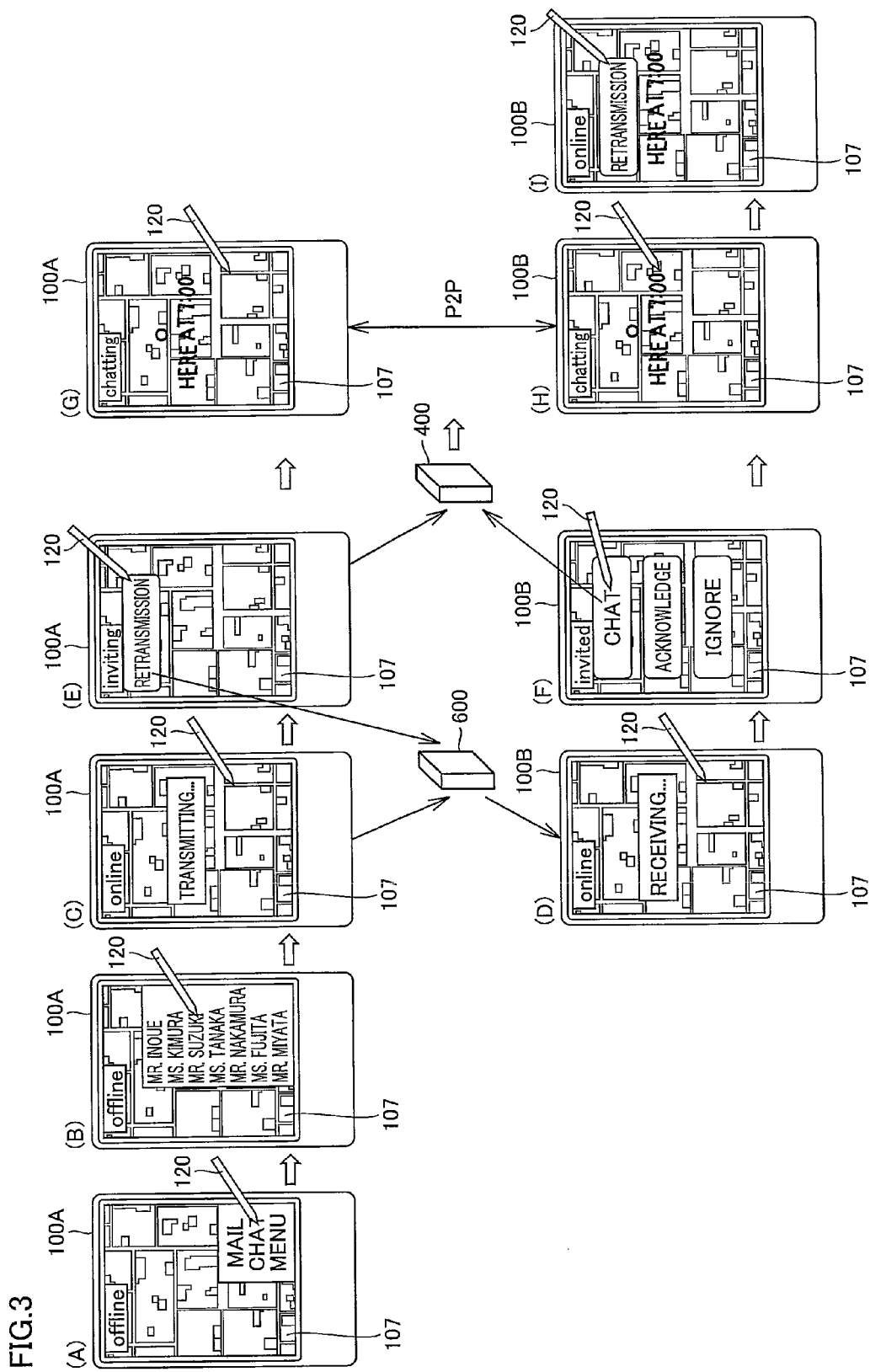
FIG. 3 is a representation of transition of the display manner in a communication terminal in accordance with the outline of the operation according to the present embodiment.

Hereinafter reference will be made to FIG. 2 and FIG. 3 to more specifically describe how network system 1 according to the present embodiment generally operates. FIG. 3 is a representation of transition of the display manner in the communication terminal in accordance with the outline of the operation according to the present embodiment. In the following description, first mobile phone 100A and second mobile phone 100B transmit and receive a handwritten image (first contents) to and from each other while displaying a map image (second contents) as a background.

As shown in FIG. 3(A), initially, the user of first mobile phone 100A downloads a map image or the like and is browsing the map image. When the user of first mobile phone 100A desires to have a chat with the user of second mobile phone 100B about the map image, first mobile phone 100A receives an instruction for starting the chat. As shown in FIG. 3(B), first mobile phone 100A receives an instruction for selecting a user who is to be a chat partner.

In this case, as shown in FIG. 3(C), first mobile phone 100A transmits a map image as an attached file (or the body of the mail) via contents server 600 to second mobile phone 100B (step S0004). As shown in FIG. 3(D), second mobile phone 100B receives the mail including the map image (step S0006), and displays the map image.

It is to be noted that first mobile phone 100A may transmit an URL (Uniform Resource Locator) for obtaining the map image and information for identifying the map image to second mobile phone 100B. Then, based on this URL, second mobile phone 100B may download the same map image as that of first mobile phone 100A from contents server 600.

Furthermore, first mobile phone 100A and second mobile phone 100B may download the map image from contents server 600 after starting the P2P communication. For example, via the P2P communication, first mobile phone 100A may transmit the URL for obtaining the map image and the information for identifying the map image to second mobile phone 100B or may transmit the map image itself to second mobile phone 100B.

As shown in FIG. 3(E), while first mobile phone 100A is not connected to second mobile phone 100B via P2P communication, first mobile phone 100A can repeat transmission of the mail. Once the mail has been transmitted, first mobile phone 100A registers its own IP address with chat server 400 and requests chat server 400 to generate a new chat room based on the mail address of first mobile phone 100A and the mail address of second mobile phone 100B (step S0002).

As shown in FIG. 3(F), second mobile phone 100B receives an instruction to start the chat, and transmits to chat server 400 a room name, a message indicating that second mobile phone 100B enters the chat room, and its own IP address (step S0008). First mobile phone 100A obtains the IP address of second mobile phone 100B while second mobile phone 100B obtains the IP address of first mobile phone 100A (step S0010), and they authenticate each other (step S0012).

Thus, as shown in FIGS. 3(G) and 3(H), first mobile phone 100A and second mobile phone 100B can perform P2P communication (step S0014). In other words, first mobile phone 100A receives an input of the handwritten image from the user and displays the handwritten image on the map image. Furthermore, first mobile phone 100A transmits the handwritten data to second mobile phone 100B. Second mobile phone 100B displays the handwritten image on the map image based on the handwritten data from first mobile phone 100A.

Second mobile phone 100B receives an input of the handwritten image from the user and displays the handwritten image on the map image. Second mobile phone 100B also transmits the handwritten data to first mobile phone 100A. Second mobile phone 100B displays the handwritten image on the map image based on the handwritten data from first mobile phone 100A.

After first mobile phone 100A severs the P2P communication (step S0016, step S0018), second mobile phone 100B can transmit mail to first mobile phone 100A or the like, as shown in FIG. 3(I). It is to be noted that the P2P communication can also be performed by a TCP/IP communication method while mail can also be transmitted/received by an HTTP communication method. In other words, mail can also be transmitted/ received during the P2P communication.

Figure 65:
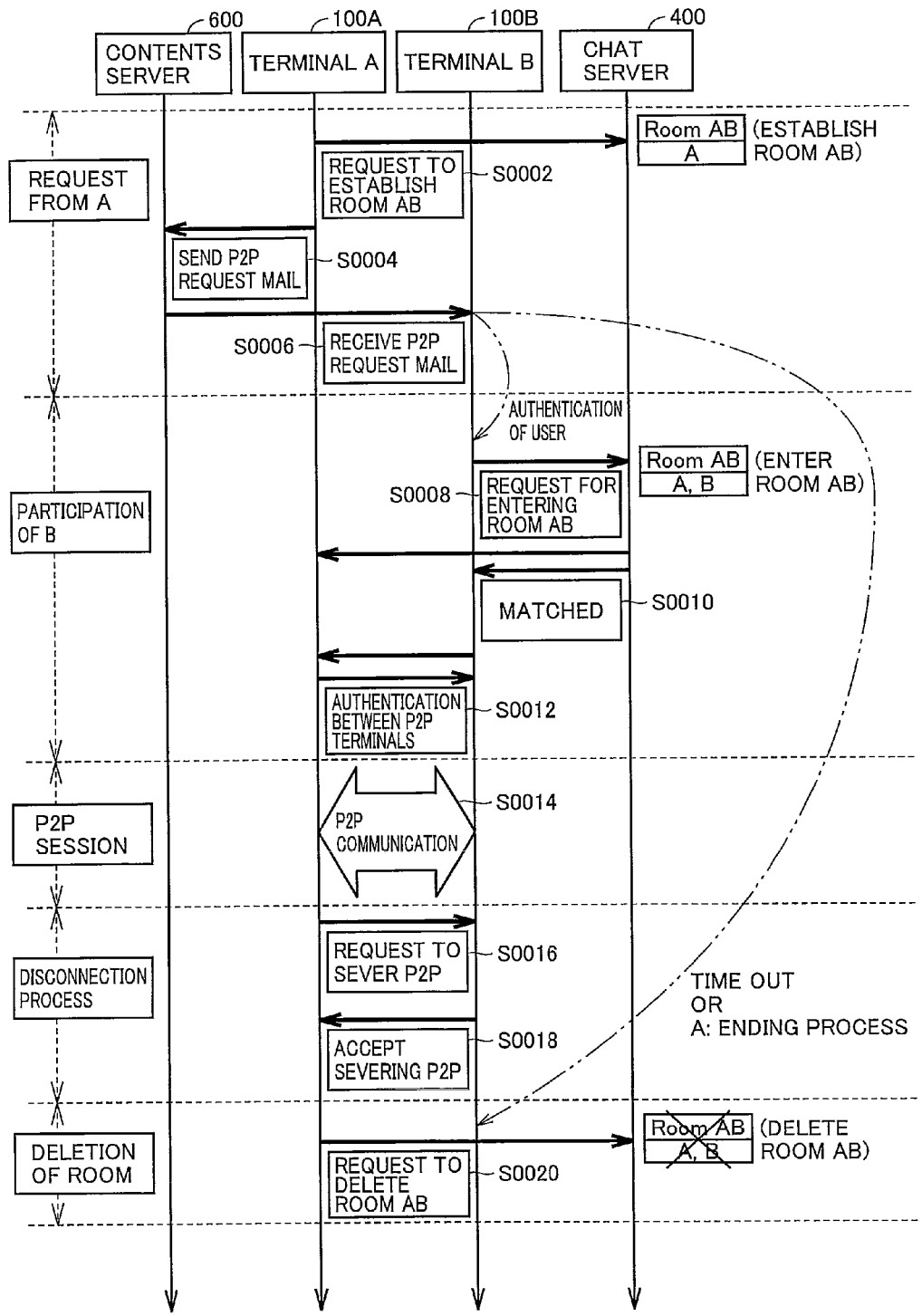
FIG. 65 is a sequence diagram showing a modification example of the outline of the operation in the network system according to the present embodiment.

FIG. 65 is a sequence diagram showing a modification example of the outline of the operation in network system 1 according to the present embodiment. FIG. 2 is an outline of the operation in the case where chat server 400 serves as a mail transmission server. In contrast, FIG. 65 is an outline of the operation in the case where contents server 600 serves as a mail transmission server. In addition, the mail transmission server may also be a device different from chat server 400 and contents server 600.

<Outline of Operation Related to Transmission and Reception of Handwritten Data in Network System 1>

Figure 4:
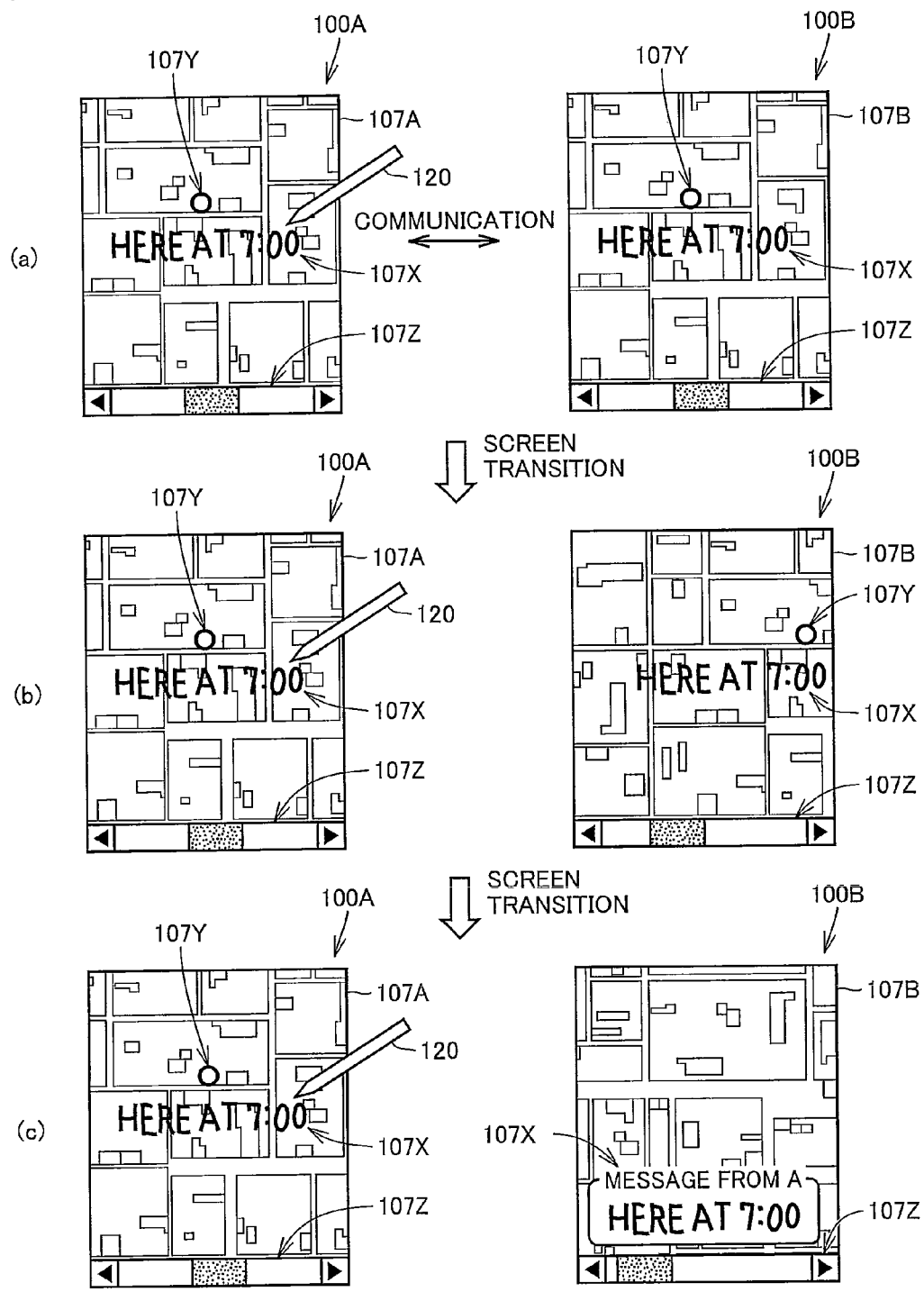
FIG. 4 is the first representation of the outline of the operation related to transmission and reception of handwritten data according to the present embodiment.
Figure 5:
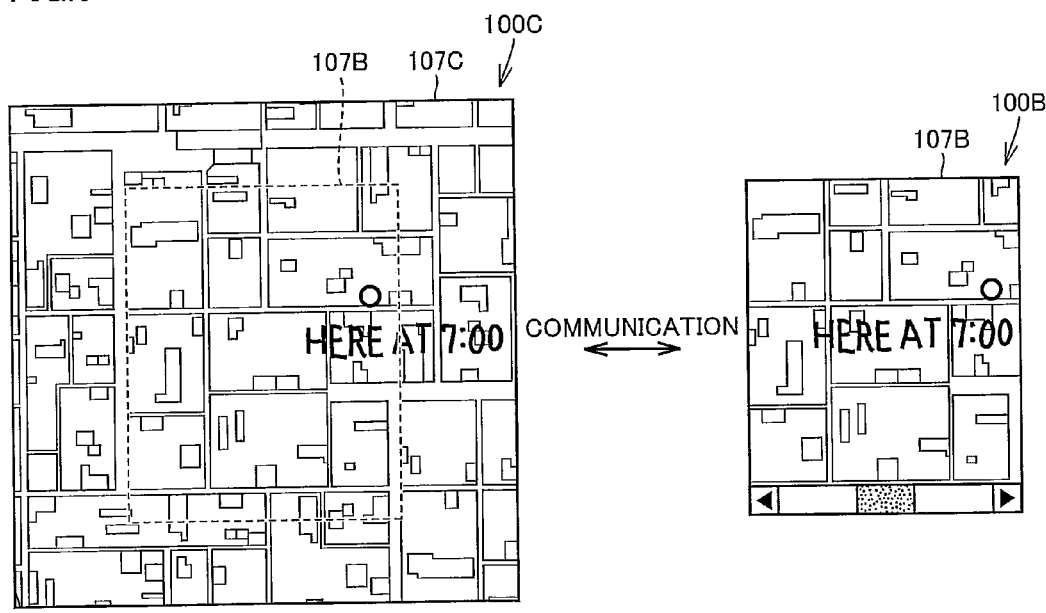
FIG. 5 is the second representation of the outline of the operation related to transmission and reception of the handwritten data according to the present embodiment.

Then, the outline of the operation related to transmission and reception of the handwritten data will be described in greater detail. FIG. 4 is the first representation of the outline of the operation related to transmission and reception of handwritten data. FIG. 5 is the second representation of the outline of the operation related to transmission and reception of the handwritten data.

Referring to FIG. 4(a), the user inputs a handwritten image to first mobile phone 100A. In the present embodiment, the user inputs a handwritten image and designation of the point where the handwritten image is to be displayed. First mobile phone 100A causes its display 107A to display an image 107Y for showing the position designated by the user and a handwritten image 107X. First mobile phone 100A transmits the designated point information and the handwritten data to second mobile phone 100B.

In addition, first mobile phone 100A may receive the input of the handwritten image after receiving designation of the point, or may receive designation of the point after receiving the input of the handwritten image. The former manner will be described in the present embodiment.

Second mobile phone 100B receives the designated point information and the handwritten data from first mobile phone 100A. Second mobile phone 100B displays the handwritten data in the vicinity of the designated point on a display 107B based on the designated point information. In this case, second mobile phone 100B can display image 107Y showing the designated point and entire handwritten image 107X.

In other words, in the state shown in FIG. 4(a), second mobile phone 100B displays the map image such that handwritten images 107X can be entirely displayed. Second mobile phone 100B displays a scroll bar 107Z at the edge portion of display 107B or the window displaying the map image. As apparent from the position of the scroll bar, in the state shown in FIG. 4, second mobile phone 100B displays the map image and the handwritten image such that the designated point is located approximately in the center of display 107B.

Referring to FIG. 4(b), when second mobile phone 100B receives an instruction for scrolling the screen from the user, second mobile phone 100B causes scroll bar 1072 to be moved and changes the display area of the map image. In this case, the map image is scrolled such that the designated point is located near the right edge of display 107B.

In this case, when the relative positional relationship between the designated point before scrolling and the handwritten image is maintained, display 107B cannot display the entire handwritten image. Accordingly, second mobile phone 100B re-displays the handwritten image in the vicinity of the designated point and in the position where the handwritten image can be entirely displayed. In other words, second mobile phone 100B displays the handwritten image in the vicinity of the designated point and in the position where the handwritten image can be entirely displayed.

Referring to FIG. 4(c), when second mobile phone 100B further receives an instruction for scrolling the screen from the user, second mobile phone 100B causes scroll bar 107Z to be further moved and changes the display area of the map image. In this case, the map image is scrolled such that the designated point is located on the outside of display 107.

In this case, when the relative positional relationship between the designated point before scrolling and the handwritten image is maintained, display 107B cannot display the entire handwritten image. Since image 107Y showing the designated point is not displayed on display 107B, second mobile phone 100B displays a handwritten image at the edge portion or the like on display 107B or the window, together with the information indicating that the handwritten image has been input on first mobile phone 100A. In other words, when the designated point is located on the outside of the display area, second mobile phone 100B displays a handwritten image on a prescribed area on display 107 or the window. It is to be noted that, when the designated point is located on the outside of the display area, the sign indicating existence of the handwritten image may be displayed in a prescribed area on display 107 or the window without having to display the handwritten image.

Alternatively, referring to FIG. 5, the user inputs a handwritten image to third mobile phone 100C. In FIG. 5, a display 107C of third mobile phone 100C is larger than display 107B of second mobile phone 100B. As described above, in the present embodiment, the user inputs designation of the point with respect to the handwritten image to be input, and also inputs a handwritten image. Third mobile phone 100C causes display 107C to display image 107Y for showing the position designated by the user and handwritten image 107X. Third mobile phone 100C transmits the designated point information and the handwritten data to second mobile phone 100B.

Second mobile phone 100B receives the designated point information and the handwritten data from third mobile phone 100C. Based on the designated point information, second mobile phone 100B displays the handwritten data near the designated point on display 107B. In second mobile phone 100B, the map image is scrolled such that the designated point is located near the right edge portion on display 107B.

In this case, when the relative positional relationship between the designated point before scrolling and the handwritten image is maintained, display 107B cannot entirely display the handwritten image. Accordingly, second mobile phone 100B re-displays the handwritten image in the vicinity of the designated point and also in the position where the handwritten image can be entirely displayed. In other words, second mobile phone 100B displays the handwritten image in the vicinity of the designated point and also in the position where the handwritten image can be entirely displayed.

In this way, in network system 1 according to the present embodiment, mobile phone 100 on the handwritten-image transmitting side transmits the designated point together with handwritten data. On the other hand, based on the designated point, mobile phone 100 on the receiving side displays the handwritten image such that the handwritten image entirely fall within the range of display 107. This allows the communication terminal on the receiving side to display the contents transmitted from the communication terminal on the transmitting side in the position corresponding to the display position desired by the transmitting side.

The configuration of network system 1 for implementing such a function will be hereinafter described in detail.

<Hardware Configuration of Mobile Phone 100>

Figure 6:
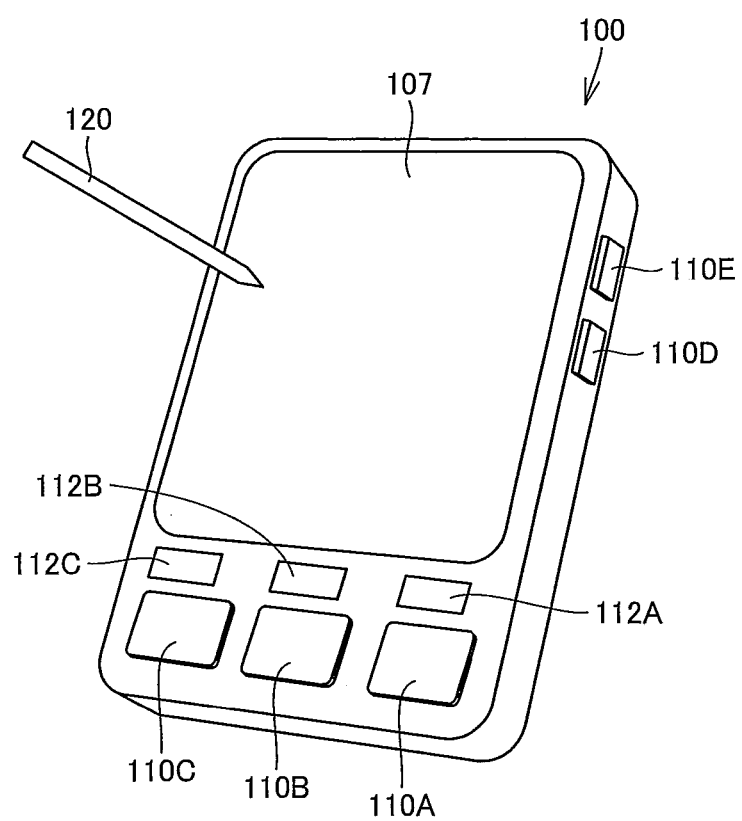
FIG. 6 is a representation of an appearance of a mobile phone according to the present embodiment.
Figure 7:
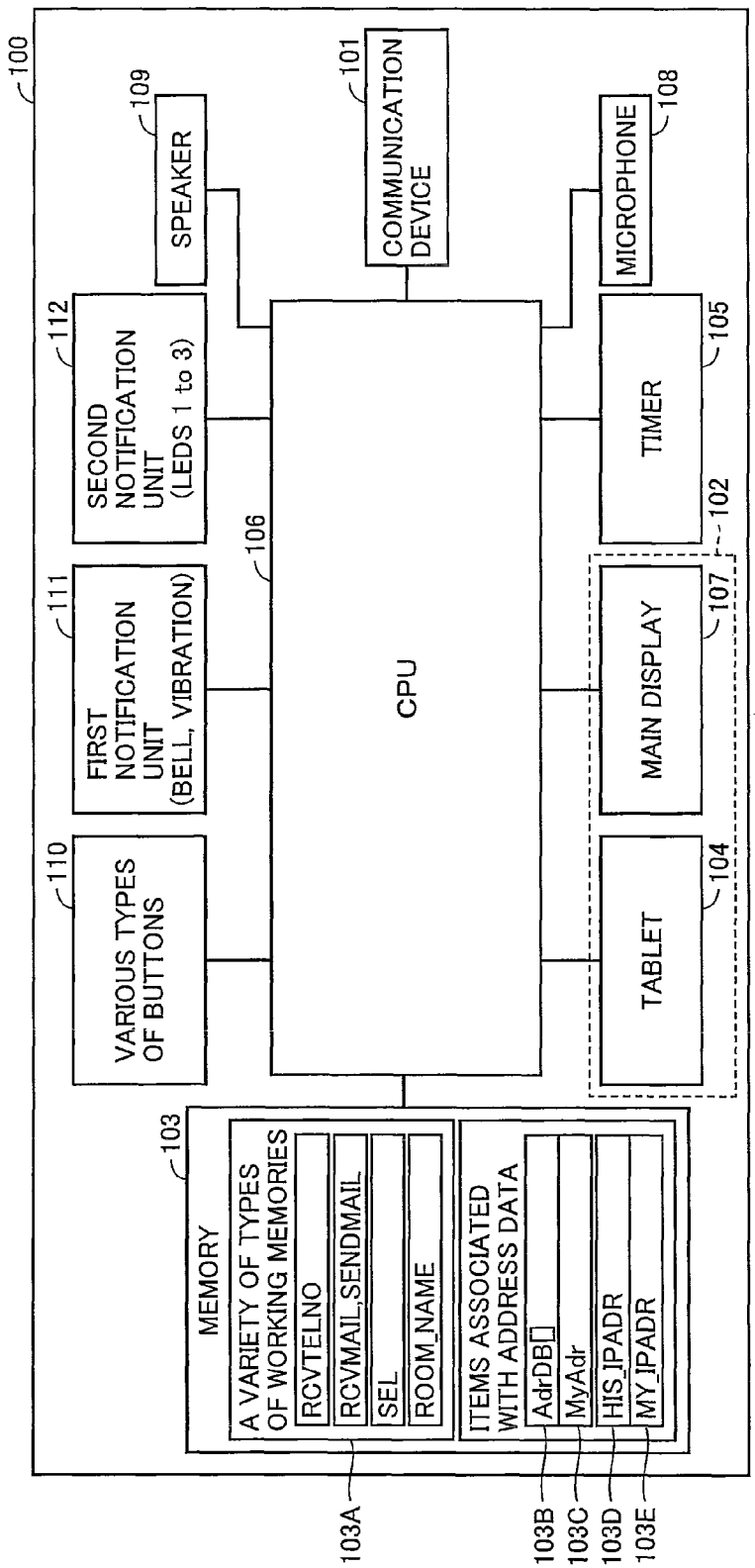
FIG. 7 is a block diagram showing the hardware configuration of the mobile phone according to the present embodiment.

Mobile phone 100 according to the present embodiment has a hardware configuration, as will be described hereinafter. FIG. 6 is a representation of an appearance of mobile phone 100 according to the present embodiment. FIG. 7 is a block diagram showing the hardware configuration of mobile phone 100 according to the present embodiment.

As shown in FIGS. 6 and 7, mobile phone 100 according to the present embodiment includes a communication device 101 communicating data with an external network, a memory 103 storing a program and a variety of types of databases, a CPU (Central Processing Unit) 106, a display 107, a microphone 108 receiving external sound, a speaker 109 outputting sound, various types of buttons 110 receiving a various pieces of information input, a first notification unit 111 outputting audible notification indicating that externally communicated data, a call signal and/or the like have/has been received, and a second notification unit 112 displaying notification indicating that externally communicated data, a call signal and/or the like have/has been received.

Display 107 according to the present embodiment implements a touch panel 102 configured of a liquid crystal panel, a CRT or the like. Specifically, mobile phone 100 according to the present embodiment is provided with a pen tablet 104 under (or at the back side of) display 107. This allows the user to use a stylus pen 120 or the like to handwrite and input graphical information or the like through pen tablet 104 to CPU 106.

In addition, the user can provide a handwritten input also by the following methods. Specifically, a special pen that outputs infrared rays and acoustic waves is utilized, thereby allowing the movement of the pen to be identified by a receiving unit receiving the infrared rays and acoustic waves emitted from the pen. In this case, by connecting this receiving unit to the device storing the movement path, CPU 106 can receive the movement path output from this device as handwritten input.

Alternatively, the user can also write a handwritten image onto an electrostatic panel using a finger or a pen for an electrostatic application.

In this way, display 107 (touch panel 102) displays an image, a text and/or the like based on data output by CPU 106.

Various types of buttons 110 receive information from a user, for example, by operating a key for input. For example, various types of buttons 110 include a TEL button 110A for receiving a telephone call or making a telephone call, a mail button 110B for receiving mail or sending mail, a P2P button 110C for receiving P2P communication or sending P2P communication, an address book button 110D used to access address book data, and an end button 110E for terminating a variety of types of processes. That is, when P2P participation request mail is received via communication device 101, various types of buttons 110 selectably receive an instruction input by a user to enter a chat room, an instruction to display the mail's content(s), and the like.

First notification unit 111 outputs a ringer tone through speaker 109 or the like. Alternatively, first notification unit 111 has a vibration function. When an incoming call, mail, P2P participation request mail and/or the like are/is received, first notification unit 111 outputs sound, vibrates mobile phone 100, and/or the like.

Second notification unit 112 includes a light emitting diode (LED) 112A for TEL, an LED 112B for mail, and an LED 112C for P2P. LED 112A for TEL flashes on/off when a call is received. LED 112B for mail flashes on/off when mail is received. LED 112C for P2P flashes on/off when P2P communication is received.

CPU 106 controls each unit of mobile phone 100. For example, CPU 106 receives a variety of types of instructions from a user via various types of buttons 110, and communicates data with an external communication terminal via communication device 101, communication device 101, a network and/or the like.

Communication device 101 and communication device 101 receive data to be communicated from CPU 106 and convert the data into a communication signal, and send the signal through an antenna (not shown). Communication device 101 and communication device 101 receive a communication signal through the antenna and convert the signal into communicated data, and input the data to CPU 106.

Memory 103 is implemented as: random access memory (RAM) functioning as working memory; read only memory (ROM) storing a control program or the like; a hard disk storing image data or the like; and the like. FIG. 8(a) represents a data structure of a variety of types of work memory 103A configuring memory 103. FIG. 8(b) represents address book data 103B stored in memory 103. FIG. 8(c) represents own terminal's data 103C stored in memory 103. FIG. 8(d) represents own terminal's IP address data 103D and another terminal's IP address data 103E stored in memory 103.

As shown in FIG. 8(a), work memory 103A in memory 103 includes a RCVTELNO area storing an originator's telephone number, a RCVMAIL area storing information on received mail, a SENDMAIL area storing information on sent mail, an SEL area storing the memory number of an address selected, and a ROOMNAME area storing a room name generated. It is to be noted that work memory 103A does not need to store a telephone number. The information on received mail includes the body of mail stored in a MAIN area, and a mail address of a sender of mail stored in the RCVMAIL area at a FROM area. The information on sent mail includes the body of mail stored in the MAIN area, and a mail address of a destination of mail stored in the RCVMAIL area at a TO area.

As shown in FIG. 8(b), address book data 103B associates a memory number for each destination (or each other communication terminal). Address book data 103B associates a name, a telephone number, a mail address, and the like with one another for each destination, and thus stores them.

As shown in FIG. 8(c), own terminal's data 103C stores the name, the telephone number, the mail address and the like of the user's own terminal.

As shown in FIG. 8(d), the own terminal's IP address data 103D contains the own terminal's IP address. Another terminal's IP address data 103E contains another terminal's IP address.

By utilizing the data shown in FIG. 8, each mobile phone 100 according to the present embodiment can transmit and receive data to and from other communication terminals by the method as described above (see FIGS. 1 to 3).

Hereinafter described will be the data structure of the image data displayed on display 107, that is, the data structure of the image data processed by memory 103 and CPU 106. FIG. 9 is a representation of the data structure of the image data according to the present embodiment.

Referring to FIG. 9(a), when the designated point is located on the outside of the display area on display 107, image data 1030a displayed on display 107 by CPU 106 includes a layer 1031a showing a background of the map image and the like, a layer 1032a for showing the designated point (FIG. 9(a) does not show the designated point), and a layer 1033a for showing handwritten image 107X and image 107Y showing the designated point. In other words, memory 103 stores layers 1031a to 1033a as image data 1030a. CPU 106 reads the data of layers 1031a to 1033a from memory 103 and displays a background and a handwritten image.

It is to be noted that the layer for showing the designated point may be the same layer for showing handwritten image 107X and image 107Y showing the designated point.

Referring to FIG. 9(b), when the designated point is located inside the display area on display 107, image data 1030b displayed on display 107 by CPU 106 includes a layer 1031b showing a background of the map image and the like, a layer 1032b for showing the designated point, and a layer 1033b for showing handwritten image 107X and image 107Y showing the designated point. In other words, memory 103 stores layers 1031b to 1033b as image data 1030b. CPU 106 reads the data of layers 1031b to 1033b from memory 103, and displays a background and a handwritten image.

<Hardware Configuration of Chat Server 400 and Contents Server 600>

The present embodiment provides chat server 400 and contents server 600 having a hardware configuration, as will be described hereinafter. The hardware configuration of chat server 400 will be hereinafter first described.

Figure 10:
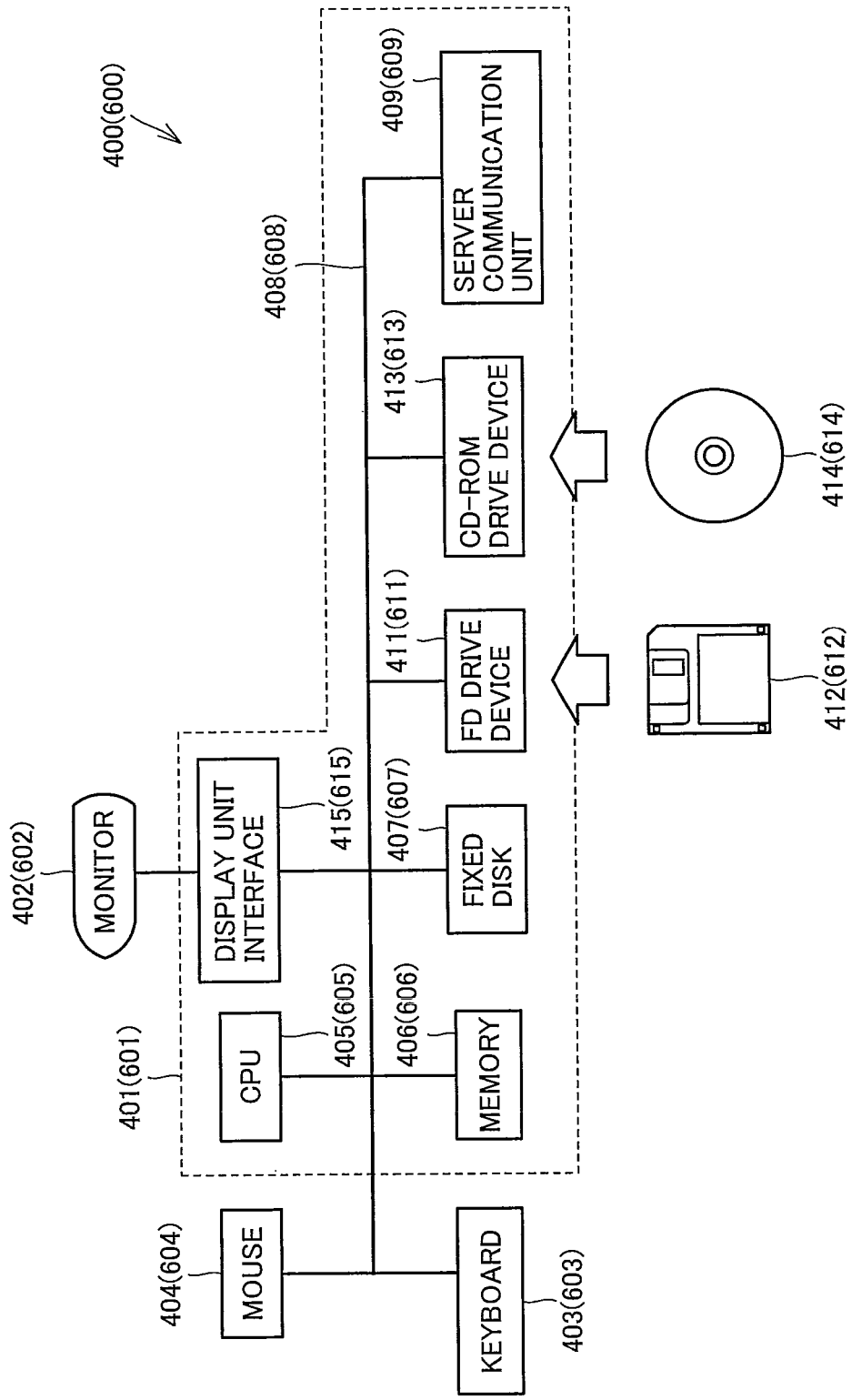
FIG. 10 is a block diagram showing the hardware configuration of a chat server according to the present embodiment.

FIG. 10 is a block diagram showing the hardware configuration of chat server 400 according to the present embodiment. As shown in FIG. 10, chat server 400 according to the present embodiment includes a CPU 405, a memory 406, a fixed disk 407, and a server communication device 409 interconnected by an internal bus 408.

Memory 406 stores a variety of types of information, and for example, temporarily stores data required for execution of a program in CPU 405. Fixed disk 407 stores a program executed by CPU 405, a database, and the like. CPU 405, which controls each element of chat server 400, is a device performing a variety of types of operations.

Server communication device 409 receives data output from CPU 405, converts the data into an electrical signal, and externally transmits the signal. Server communication device 409 also converts the externally received electrical signal into data and inputs the data to CPU 405. More specifically, server communication device 409 receives data from CPU 405 and transmits the data on Internet network 500, carrier network 700, and/or the like to mobile phone 100, car navigation device 200, personal computer 300, or devices connectable to a network, such as a game machine, an electronic dictionary, an electronic book and the like. Server communication device 409 then inputs, to CPU 405, the data received via Internet network 500, carrier network 700 and/or the like from mobile phone 100, car navigation device 200, personal computer 300, or devices connectable to a network, such as a game machine, an electronic dictionary, an electronic book and the like.

The data stored in memory 406 or fixed disk 407 will be hereinafter described. FIG. 11(a) is a first representation of a data structure of a room management table 406A stored in chat server 400 at memory 406 or fixed disk 407. FIG. 11(b) is a second representation of the data structure of room management table 406A stored in chat server 400 at memory 406 or fixed disk 407.

As shown in FIGS. 11(a) and 11(b), room management table 406A associates a room name with an IP address and thus stores them. For example, at a point in time, as shown in FIG. 11(a), chat rooms having room names R, S and T, respectively, are generated in chat server 400. A communication terminal having an IP address A and a communication terminal having an IP address C are in the chat room with room name R. A communication terminal having an IP address B is in the chat room with room name S. A communication terminal having an IP address D is in the chat room with room name T.

As will be described hereinafter, room name R is determined by CPU 406 based on the mail address of the communication terminal having IP address A and the mail address of the communication terminal having IP address B. In the state shown in FIG. 11(a), when the communication terminal having an IP address E newly enters the chat room with room name S, then, as shown in FIG. 11(b), room management table 406A associates room name S with IP address E and thus stores them.

More specifically, when chat server 400 receives a request from first mobile phone 100A to generate a new chat room (as indicated in FIG. 2 at step S0002), CPU 405 generates a room name based on the mail address of first mobile phone 100A and the mail address of second mobile phone 100B, and then stores that room name in room management table 406A in association with the IP address of first mobile phone 100A.

Then, when second mobile phone 100E requests chat server 400 to allow second mobile phone 100B to enter a chat room (as indicated in FIG. 2 at step S0008), CPU 405 associates that room name with the IP address of second mobile phone 100B and thus stores them in room management table 406A. CPU 406 reads from room management table 406A the IP address of first mobile phone 100A associated with that room name CPU 406 transmits the IP address of first mobile phone 100A to each second communication terminal, and transmits the IP address of second mobile phone 100B to first mobile phone 100A.

Then, the hardware configuration of contents server 600 will be described. As shown in FIG. 10, contents server 600 according to the present embodiment includes a CPU 605, a memory 606, a fixed disk 607, and a server communication device 609 interconnected by an internal bus 608.

Memory 606 stores a variety of types of information, and for example, temporarily stores data required for execution of a program in CPU 605. Fixed disk 607 stores a program executed by CPU 605, a database, and the like. CPU 605, which controls each element of contents server 600, is a device performing a variety of types of operations.

Server communication device 609 receives data output from CPU 605, converts the data into an electrical signal, and externally transmits the signal. Server communication device 609 also converts an externally received electrical signal into data and inputs the data to CPU 605. More specifically, server communication device 609 receives data from CPU 605 and transmits the data on Internet network 500, carrier network 700, and/or the like to mobile phone 100, car navigation device 200, personal computer 300, or devices connectable to a network, such as a game machine, an electronic dictionary, an electronic book and the like. Server communication device 609 then inputs, to CPU 605, the data received via Internet network 500, carrier network 700 and/or the like from mobile phone 100, car navigation device 200, personal computer 300, or devices connectable to a network, such as a game machine, an electronic dictionary, an electronic book and the like.

Memory 606 or fixed disk 615 in contents server 600 stores the contents (second contents) utilized as a background image in the handwriting chat communication, for example, a map image and the like. CPU 605 in contents server 600 receives designation of the contents from the communication terminal via server communication device 609. CPU 605 in contents server 600 reads, from memory 606, the contents in accordance with the designation based on the designation of the contents, and transmits the contents to the communication terminal via server communication device 609.

More specifically, contents server 600 receives the type of the contents, the area of the contents and the like as designation of the contents. Examples of designation of the type of contents may include designation of the type of the image data such as a map image and a photographic image, designation of map scaling, and the like. Examples of designation of the contents area may include designation of a part of the area in the contents of a large size (for example, information about the latitude/longitude, or the like).

<Communication Process in Mobile Phone 100>

Figure 12:
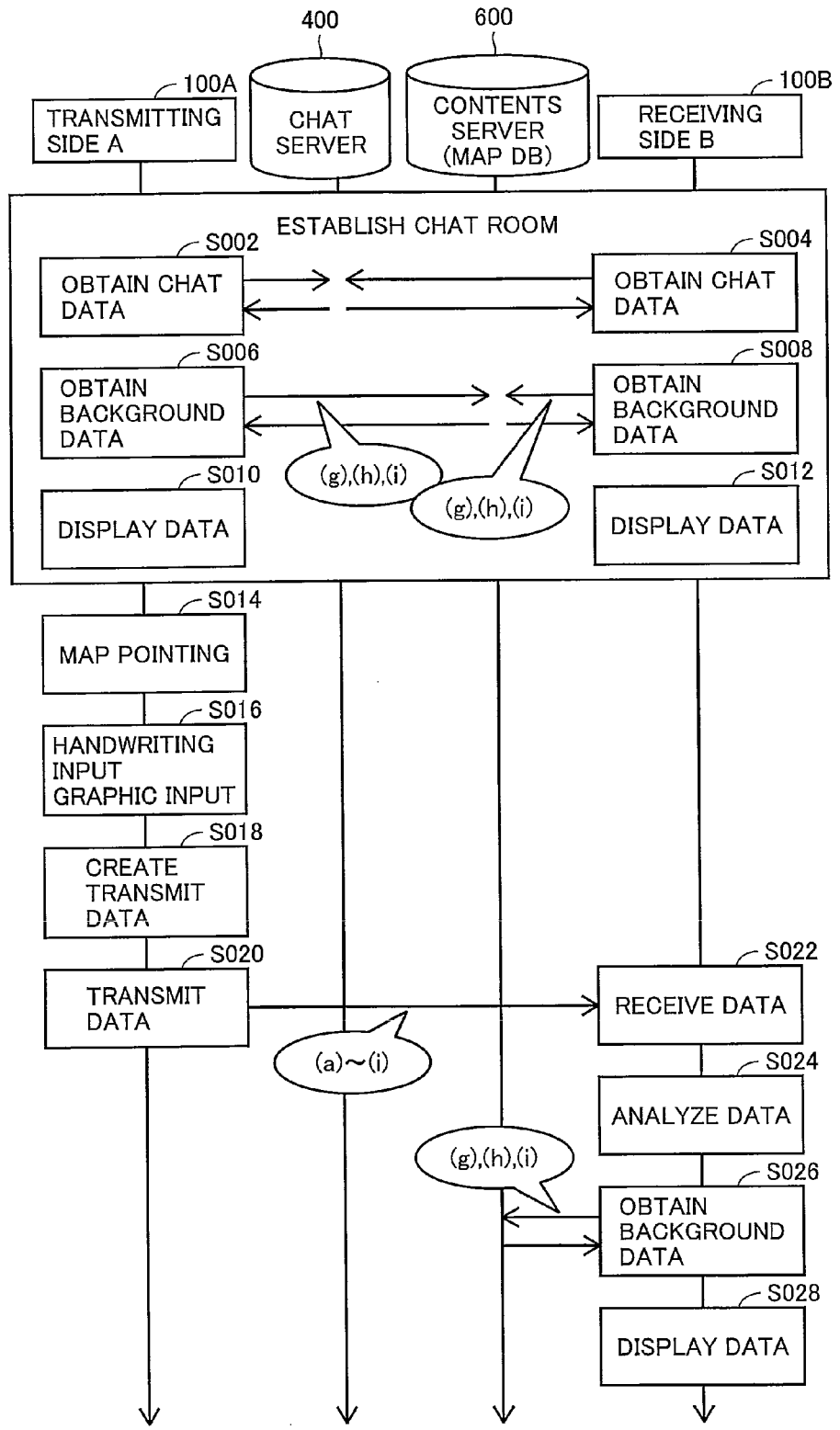
FIG. 12 is a flowchart showing the first example of a procedure of a P2P communication process in the mobile phone according to the present embodiment.
Figure 14:
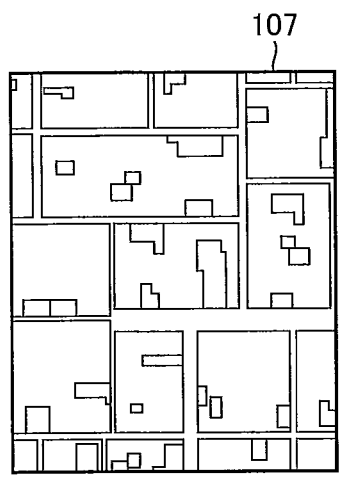
FIG. 14 is the first representation of a screen displayed on a display (touch panel) according to the present embodiment.
Figure 15:
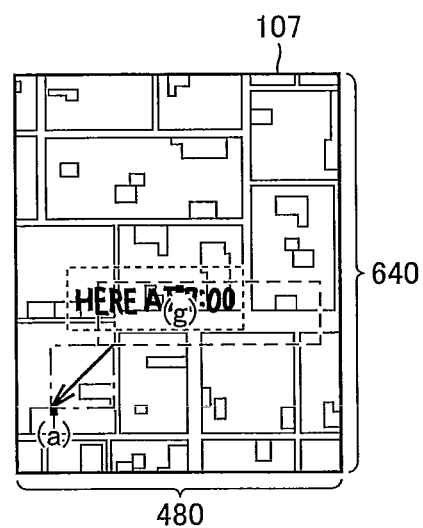
FIG. 15 is the first representation for illustrating the transmit data according to the present embodiment.

The P2P communication process in mobile phone 100 according to the present embodiment will be hereinafter described. FIG. 12 is a flowchart showing the first example of a procedure of the P2P communication process in mobile phone 100 according to the present embodiment. FIG. 13 is a representation of the data structure of transmit data according to the present embodiment. FIG. 14 is the first representation of a screen displayed on display 107 (touch panel 102). FIG. 15 is the first representation for illustrating the transmit data according to the present embodiment.

In the following, an explanation will be given with regard to the case where the handwritten data is transmitted from first mobile phone 100A to second mobile phone 100B in the state where a chat room has already been established, that is, in the state where PSP communication has been established.

As shown in FIG. 12, CPU 106 of first mobile phone 100A (on the transmitting side) first obtains data about the chat communication from chat server 400 via communication device 101 (step S002). Similarly, CPU 106 of second mobile phone 100B (on the receiving side) also obtains the data about the chat communication from chat server 400 via communication device 101 (step S004).

It is to be noted that the "data about the chat communication" includes an ID of the chat room, member's terminal information, notification (announcement information), chat contents up until this point of time, and the like.

CPU 106 of first mobile phone 100A obtains the map image as background information from contents server 600 via communication device 101 (step S006). More specifically, CPU 106 transmits information showing the center of the map ((g) in FIG. 13), information showing the map scaling ((h) in FIG. 13) and information showing the size of the map image ((i) in FIG. 13) to contents server 600 via communication device 101. Based on the information from first mobile phone 100A, CPU 605 of contents server 600 reads the map image in accordance with this information from memory 606. CPU 605 transmits the map image to first mobile phone 100A via server communication device 609.

Similarly, CPU 106 of second mobile phone 100B also obtains a map image as a background from contents server 600 via communication device 101 (step S008). In addition, although first mobile phone 100A and second mobile phone 100B obtain background data during the chat communication in this example, the present invention is not limited thereto, but first mobile phone 100A and second mobile phone 100B may obtain background data before the chat communication.

CPU 106 of first mobile phone 100A causes touch panel 102 to display a map image (step S010). Similarly, CPU 106 of second mobile phone 100B causes touch panel 102 to display a map image (step S012).

As shown in FIG. 14, in steps S010 and S012, the map image is displayed on display 107.

CPU 106 of first mobile phone 100A receives, via touch panel 102, an instruction for designating the position within the map image (step S014). CPU 106 of first mobile phone 100A receives an input of the handwritten image via touch panel 102 (step S016). In this case, CPU 106 may receive selection of an image for showing the designated position (point) (which will be hereinafter referred to as a point-position indicating sign or simply as a point image), the relationship between the position of the image and the designated point, and the like. CPU 106 associates the handwritten data, the designated point and the information about the image showing the designated point with one another, and stores them in memory 103.

CPU 106 creates transmit data having the handwritten data, the designated point and the information about the image showing the designated point associated with one another (step S018). More specifically, as shown in FIGS. 13 and 15, the transmit data includes information showing the designated point ((a) in FIG. 13), image data of the image (point image) for showing the designated point ((b) in FIG. 13), information for identifying the area for displaying the image showing the designated point ((c) in FIG. 13), information for identifying the area for displaying the handwritten image ((d) in FIG. 13), handwritten data ((e) in FIG. 13), an area for displaying the handwritten image ((f) in FIG. 13), information showing the center of the map ((g) in FIG. 13), information showing the map scaling ((h) in FIG. 13), and information showing the size of the map image ((i) in FIG. 13).

CPU 106 transmits the transmit data to second mobile phone 100B via communication device 101 (step S020). CPU 106 of second mobile phone 100B receives the transmit data via communication device 101 (step S022).

CPU 106 of second mobile phone 100B analyzes the transmit data (step S024). CPU 106 receives a map image from contents server 600 based on the information showing the center of the map ((g) in FIG. 13), the information showing the map scaling ((h) in FIG. 13), and the information showing the size of the map image ((i) in FIG. 13) (step S026). CPU 106 causes display 107 to display the map image (step S028).

Figure 16:
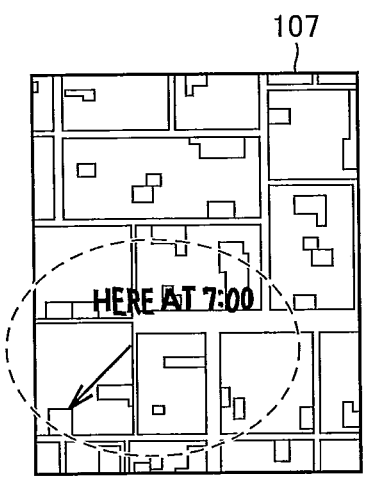
FIG. 16 is the second representation of a screen displayed on the display (touch panel) according to the present embodiment.

FIG. 16 is the second representation of a screen displayed on display 107 (touch panel 102). As shown in FIG. 16, in step S028, CPU 106 causes display 107 to display a background image representing a handwritten image based on the transmit data and the map image.

Figure 17:
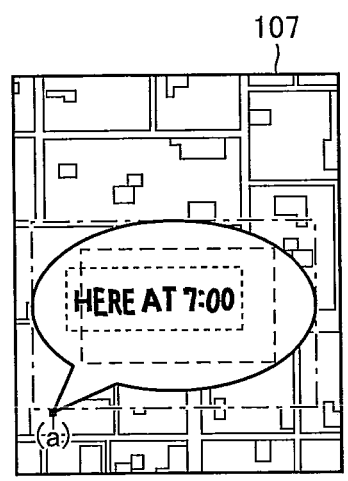
FIG. 17 is the second representation for illustrating the transmit data according to the present embodiment.

FIG. 17 is the second representation for illustrating the transmit data according to the present embodiment. Referring to FIGS. 16 and 17, the image data of the image for showing the designated point ((b) in FIG. 13) may be an image showing an arrow, an image showing a call-out, a line, a picture image, a triangle, a circle, and a crosshair cursor. The information for identifying the area for displaying an image showing the designated point ((c) in FIG. 13) may be four coordinates showing the corners of a rectangle circumscribing an arrow, or may be four coordinates showing the corners of a rectangle circumscribing the call-out.

The information for identifying the area for displaying the handwritten image ((d) in FIG. 13) may be four coordinates showing the corners of a rectangle outside the area where a point image is displayed (hereinafter also referred to as a handwritten data area), may be four coordinates showing the corners of a rectangle inside the area where a point image is displayed, or may be four coordinates showing the corners of a rectangle extending across the area displaying a point image between the inside and the outside of the area.

Figure 18:
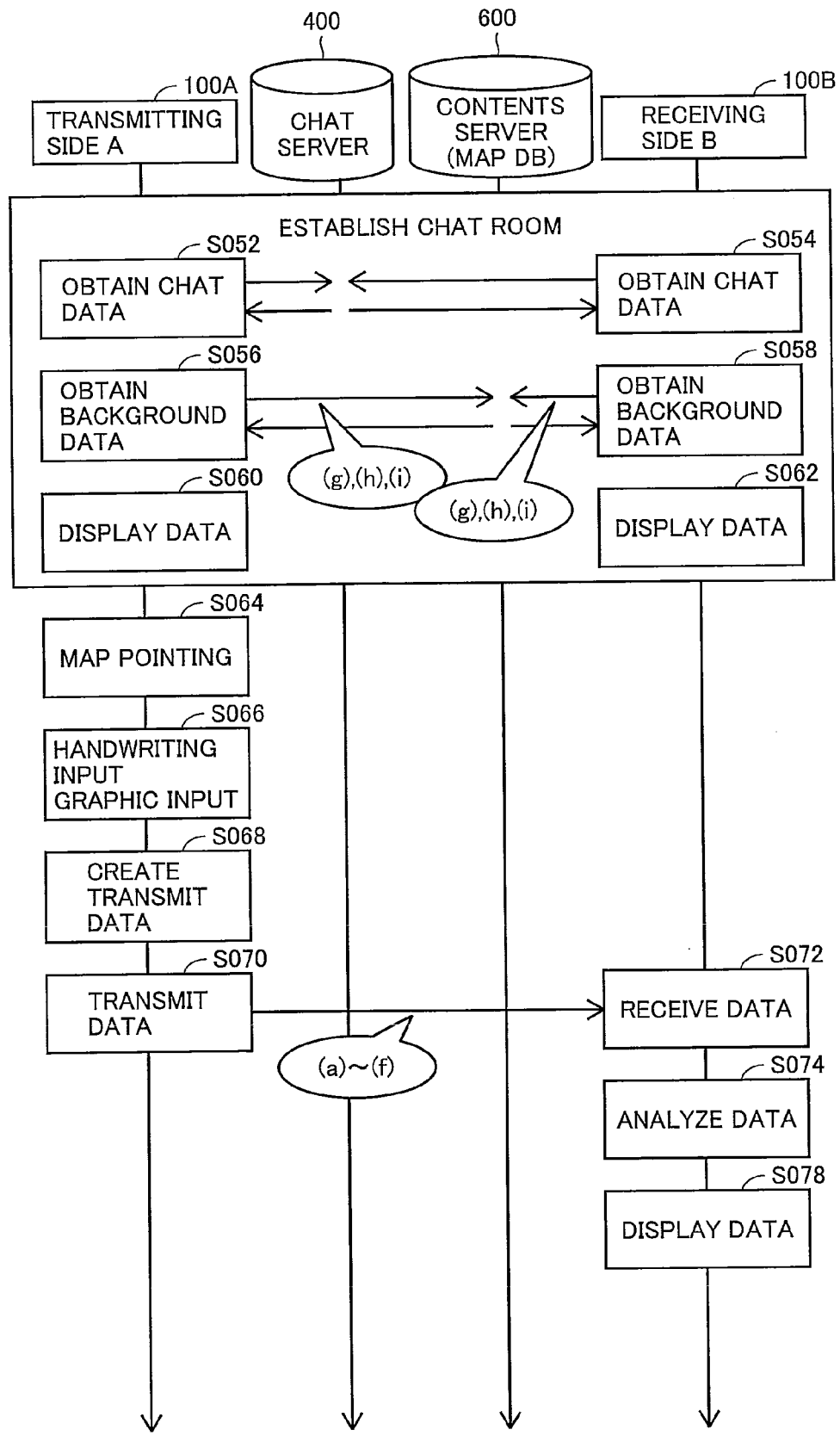
FIG. 18 is a flowchart showing the second example of a procedure of the P2P communication process in the mobile phone according to the present embodiment.

FIG. 18 is a flowchart showing the second example of a procedure of the P2P communication process in mobile phone 100 according to the present embodiment. Referring to FIGS. 12 and 18, the first example and the second example are different from each other in the process in and after step S018 in the first example (step S068 in the second example). Thus, since the first example and the second example are the same in the process before step S018 (step S068), the description thereof will not be repeated.

Referring to FIG. 18, in the second example, CPU 106 creates transmit data having the handwritten data, the designated point and the information about the image showing the designated point associated with one another (step S068). More specifically, as shown in FIGS. 13 and 15, the transmit data includes information showing the designated point ((a) in FIG. 13), image data of the image (point image) for showing the designated point ((b) in FIG. 13), information for identifying the area for displaying the image showing the designated point ((c) in FIG. 13), information for identifying the area for displaying the handwritten image ((d) in FIG. 13), handwritten data ((e) in FIG. 13), and an area for displaying the handwritten image ((f) in FIG. 13).

CPU 106 transmits the transmit data to second mobile phone 100B via communication device 101 (step S070). CPU 106 of second mobile phone 100B receives the transmit data via communication device 101 (step S072).

CPU 106 of second mobile phone 100B analyzes the transmit data (step S074). As shown in FIG. 16, based on the already obtained map image and the received transmit data, CPU 106 causes display 107 to display the background image in which a handwritten image is drawn (step S078). In other words, it is preferable in the second example that second mobile phone 100B displays a background based on the background data similar to that in first mobile phone 100A.

For the purpose of reference, FIG. 19 shows an example of the transmit data in the case where chat communication is performed based on an HTTP (HyperText Transfer Protocol). FIG. 20 shows an example of the transmit data in the case where chat communication is performed based on a TCP/IP (Transmission Control Protocol/Internet Protocol).

<Map Pointing Process in Mobile Phone 100>

Figure 21:
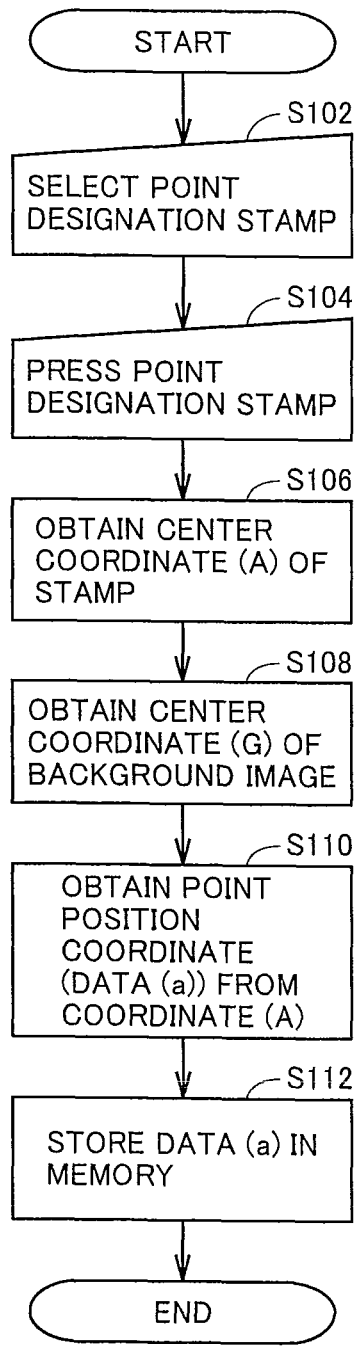
FIG. 21 is a flowchart showing a procedure of a map pointing process in the mobile phone according to the present embodiment.
Figure 22:
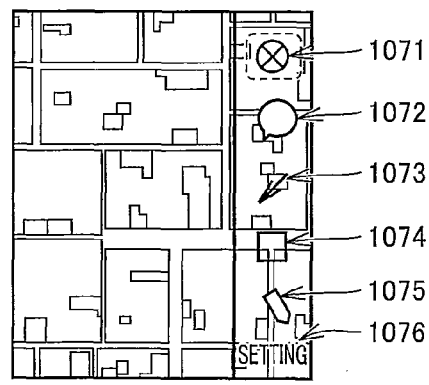
FIG. 22 is the first representation of a screen during the pointing process according to the present embodiment.
Figure 23:
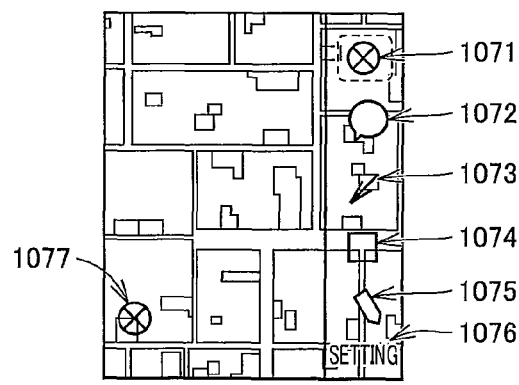
FIG. 23 is the second representation of the screen during the pointing process according to the present embodiment.
Figure 24:
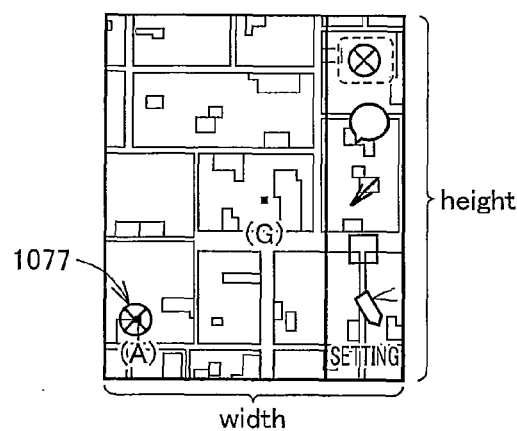
FIG. 24 is a representation for illustrating coordinates obtained in the map pointing process according to the present embodiment.

In the present embodiment, mobile phone 100 performs the map pointing process, as will be described hereinafter. FIG. 21 is a flowchart showing a procedure of the map pointing process in mobile phone 100 according to the present embodiment, FIG. 22 is the first representation of a screen during the pointing process according to the present embodiment. FIG. 23 is the second representation of the screen during the pointing process according to the present embodiment. FIG. 24 is a representation for illustrating coordinates obtained in the map pointing process.

Referring to FIG. 21, CPU 106 receives an instruction via touch panel 102 from the user to select a point designation stamp (image showing the designated point) (step S102). More specifically, as shown in FIG. 22, CPU 106 causes touch panel 102 to display a point designation button 1071, a call-out button 1072, an arrow button 1073, a rectangular button 1074, a handwriting button 1075, and a setting button 1076. CPU 106 detects via touch panel 102 that point designation button 1071 has been pressed, thereby accepting the instruction to select the point designation stamp.

CPU 106 receives the instruction from the user via touch panel 102 to press the point designation stamp (step S104). More specifically, as shown in FIG. 23, CPU 106 detects that stylus pen 120 or a finger has touched touch panel 102.

Referring to FIG. 24, CPU 106 obtains a center coordinate (A) of the stamp based on the touched position (step S106). The center coordinate (A) of the stamp only needs to be the information for identifying the position of the background image. For example, the center coordinate (A) of the stamp is for identifying the position of the stamp within touch panel 102 or the window in the case where the upper right portion in touch panel 102 or the window is set at (0, 0).

CPU 110 obtains a center coordinate (G) of the map image which is a background (step S108). The center coordinate (G) of the map image is for identifying the center of touch panel 102 or the window within the map image in the case where the upper right portion in the map image that is currently displayed is set at (0, 0).

CPU 110 obtains a point position coordinate (data (a)) based on the coordinate (A) and the coordinate (G) (step S110). In other words, based on the coordinate (G), CPU 106 converts the coordinate (A) of the stamp within display 107 or the window (screen coordinate system) into a coordinate (a) of the stamp in the map image (image coordinates system). CPU 110 stores data (a) in memory 103 (step S112).

<Graphic Input Process in Mobile Phone 100>

Figure 25:
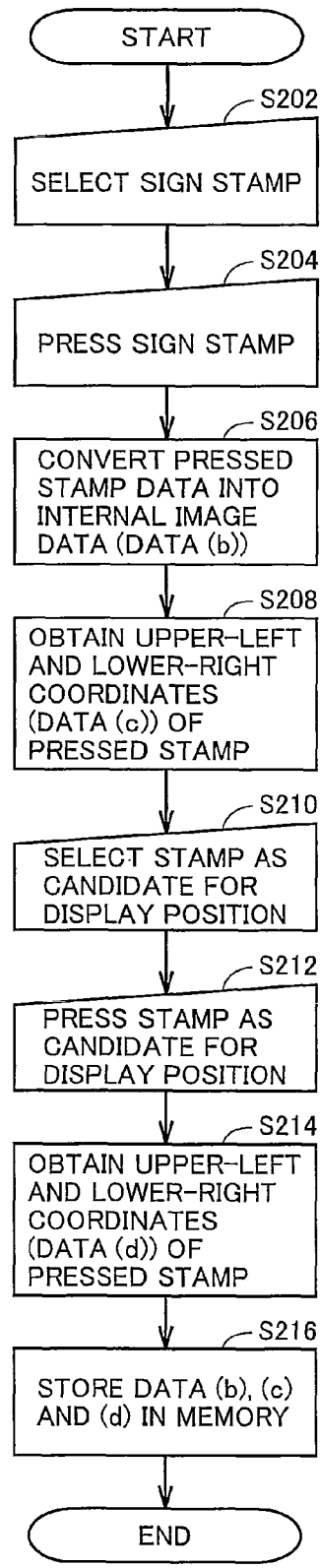
FIG. 25 is a flowchart illustrating a procedure of a graphic input process in the mobile phone according to the present embodiment.
Figure 26:
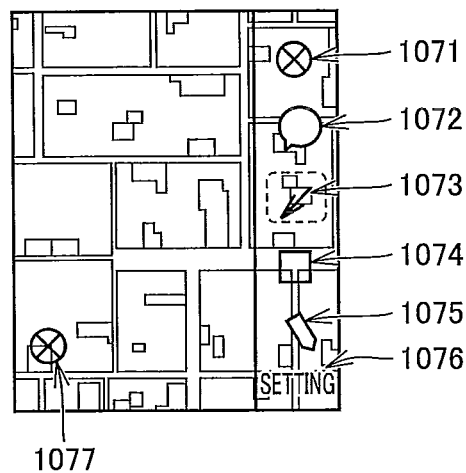
FIG. 26 is the first representation of a screen during the graphic input process according to the present embodiment.
Figure 27:
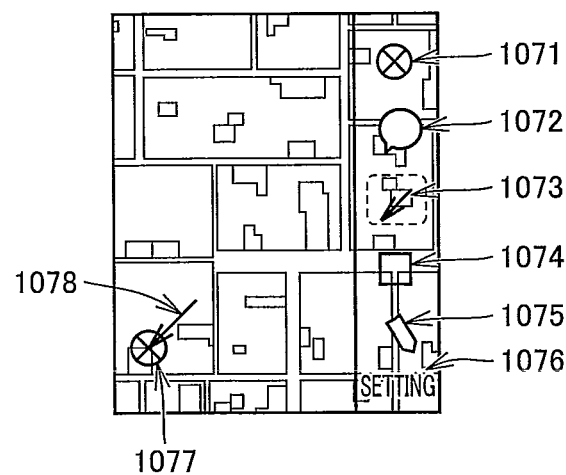
FIG. 27 is the second representation of the screen during the graphic input process according to the present embodiment.
Figure 28:
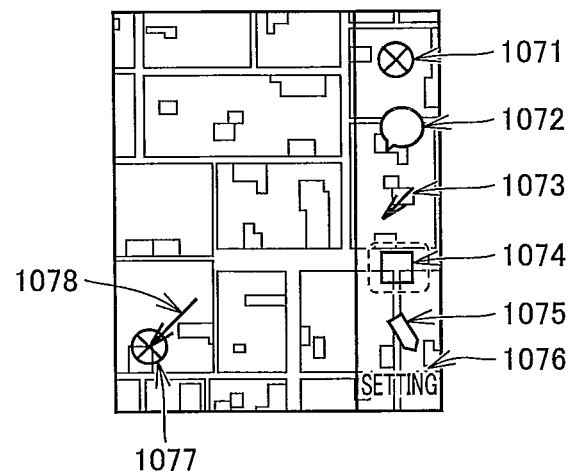
FIG. 28 is the third representation of the screen during the graphic input process according to the present embodiment.
Figure 29:
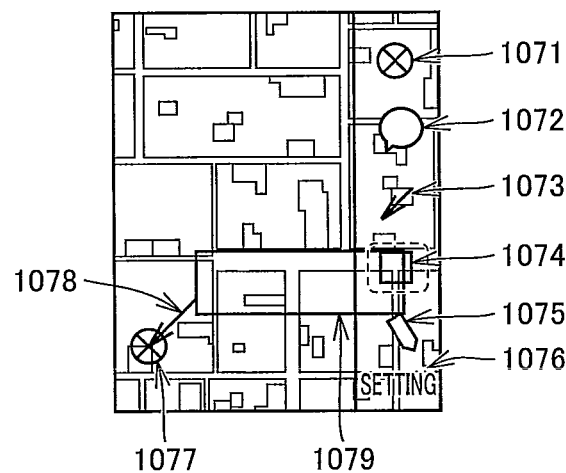
FIG. 29 is the fourth representation of the screen during the graphic input process according to the present embodiment.

In the present embodiment, mobile phone 100 performs the graphic input process, as will be described hereinafter. FIG. 25 is a flowchart illustrating a procedure of a graphic input process in mobile phone 100 according to the present embodiment. FIG. 26 is the first representation of a screen during the graphic input process according to the present embodiment. FIG. 27 is the second representation of the screen during the graphic input process according to the present embodiment. FIG. 28 is the third representation of the screen during the graphic input process according to the present embodiment. FIG. 29 is the fourth representation of the screen during the graphic input process according to the present embodiment.

Referring to FIG. 25, CPU 110 receives an instruction from the user via touch panel 102 to select a sign stamp (step S202). More specifically, referring to FIG. 26, CPU 106 detects via touch panel 102 that arrow button 1073 has been pressed.

CPU 106 receives an instruction from the user via touch panel 105 to press the sign stamp (step S204). More specifically, referring to FIG. 27, CPU 106 detects depression by stylus pen 120 or a finger via touch panel 102 to obtain the touched position. CPU 106 causes touch panel 102 to display a stamp in the position corresponding to the touched position.

CPU 106 converts the pressed stamp data into internal image data (data (b)) (step S206). Based on the touched position, CPU 106 obtains upper-left and lower-right coordinates (data (c)) of the pressed stamp (step S208).

CPU 106 receives an instruction from the user via touch panel 102 to select a stamp for showing a candidate for the display position (step S210). More specifically, referring to FIG. 28, CPU 106 detects via touch panel 102 that rectangular button 1074 has been pressed.

CPU 110 receives an instruction via touch panel 102 from the user to press a stamp for showing a candidate for the display position (step S212). More specifically, referring to FIG. 29, CPU 106 detects depression by stylus pen 120 or a finger via touch panel 102, to obtain the touched position. CPU 106 causes touch panel 102 to display a rectangle in the position corresponding to the touched position.

CPU 110 obtains upper-left and lower-right coordinates (data (d)) of the pressed stamp (step S214). CPU 106 stores data (b), (c) and (d) in memory 103 (step S216).

<Handwriting Input Process in Mobile Phone 100>

Figure 30:
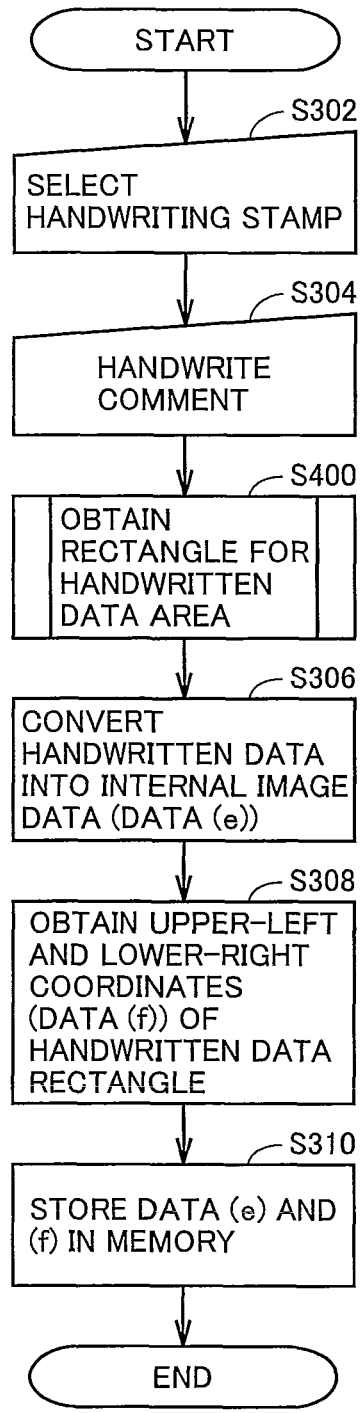
FIG. 30 is a flowchart showing a procedure of the handwriting input process in the mobile phone according to the present embodiment.
Figure 31:
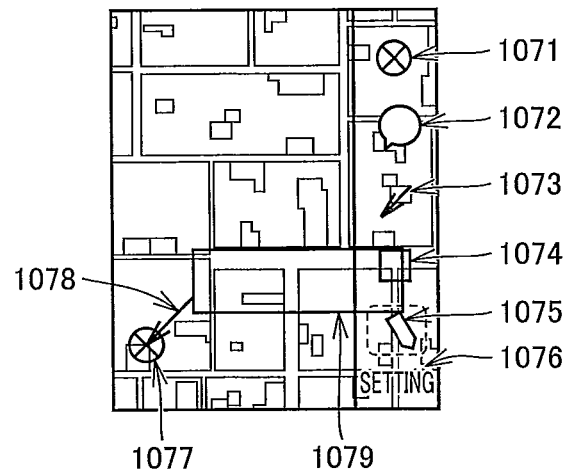
FIG. 31 is the first representation of a screen during the handwriting input process according to the present embodiment.
Figure 32:
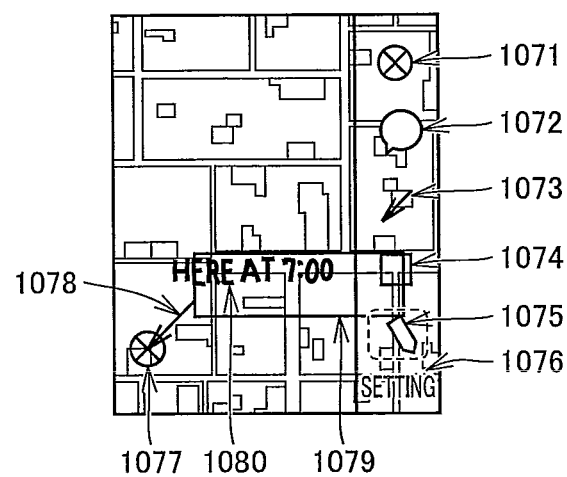
FIG. 32 is the second representation of the screen during the handwriting input process according to the present embodiment.

In the present embodiment, mobile phone 100 performs the handwriting input process, as will be described hereinafter. FIG. 30 is a flowchart showing a procedure of the handwriting input process in mobile phone 100 according to the present embodiment. FIG. 31 is the first representation of a screen during the handwriting input process according to the present embodiment. FIG. 32 is the second representation of the screen during the handwriting input process according to the present embodiment.

Referring to FIG. 30, CPU 106 receives an instruction from the user via touch panel 102 to select a handwritten stamp (step S302). More specifically, referring to FIG. 31, CPU 106 detects via touch panel 102 that handwriting button 1075 has been pressed.

CPU 110 receives an input of the handwritten image such as a comment from the user via touch panel 102 (step S304). More specifically, referring to FIG. 32, CPU 106 obtains the movement path of the touched position by sequentially obtaining the position touched by stylus pen 120 or a finger via touch panel 102. CPU 106 causes touch panel 102 to display a handwritten image.

CPU 110 executes the rectangle obtaining process for the handwritten data area (step S400). The rectangle obtaining process for the handwritten data area (step S400) will be described later.

CPU 106 converts the handwritten data into internal image data (data (e)) (step S306). It is to be noted that CPU 106 may transmit the pen coordinates obtained at each prescribed time for a period of time from pen-down to pen-up. For example, CPU 106 may transmit the contact coordinates (x1, y1) (x2, y2) (x3, y3) measured at each prescribed time to another device at every measurement. CPU 106 obtains the upper-left and the lower-right coordinates of the rectangle of the handwritten data (data (f)) (step S308). CPU 106 then stores data (e) and (f) in memory 103 (step S310).

Figure 33:
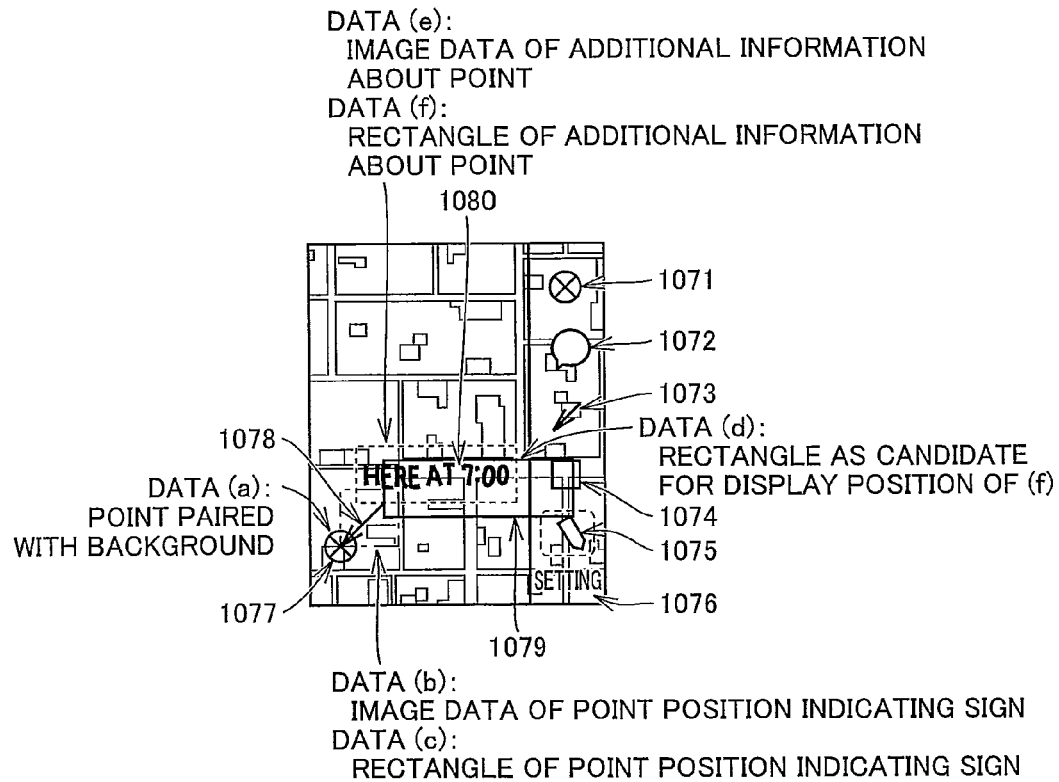
FIG. 33 is a representation for illustrating the transmit data generated in the graphic input process and the handwriting input process according to the present embodiment.

The data structure of the transmit data generated in the graphic input process and the handwriting input process will then be described. FIG. 33 is a representation for illustrating the transmit data generated in the graphic input process and the handwriting input process.

Referring to FIG. 33, the transmit data includes data (a) to data (g). As described above, the transmit data may also include data (h) and data (i).

In addition, CPU 106 may transmit data (a) to data (i) as one piece of transmit data or may transmit data (a) to data (i) each time CPU 106 obtains the data. Furthermore, when receiving an instruction to select a button other than the handwriting button or accepting depression of the transmit button that is not shown, CPU 106 may transmit the handwritten data (e). Alternatively, CPU 106 may transmit the handwritten data (e) at regular time intervals. Alternatively, CPU 106 may transmit handwritten information for each stroke. Alternatively, CPU 106 may sequentially transmit only the difference information of the handwritten image.

Figure 34:
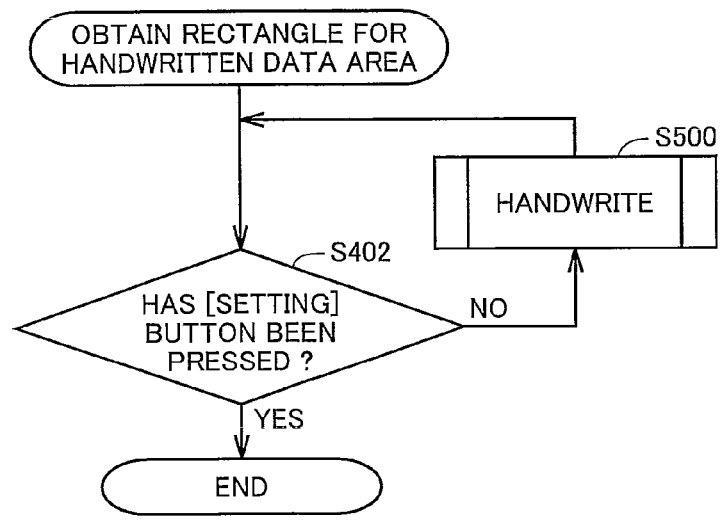
FIG. 34 is a flowchart illustrating a procedure of a rectangle obtaining process for a handwritten data area in the mobile phone according to the present embodiment.

In the present embodiment, mobile phone 100 performs a rectangle obtaining process for the handwritten data area, as will be described hereinafter. FIG. 34 is a flowchart illustrating a procedure of the rectangle obtaining process for the handwritten data area in mobile phone 100 according to the present embodiment.

Referring to FIG. 34, CPU 106 determines whether or not setting button 1076 has been pressed by the user via touch panel 102 (step S402). When setting button 1076 has not been pressed (NO in step S402), CPU 106 performs the handwriting process (step S500). The handwriting process (step S500) will be described later.

On the other hand, when setting button 1076 has been pressed (YES in step S402), CPU 106 ends the rectangle obtaining process for the handwritten data area.

Figure 35:
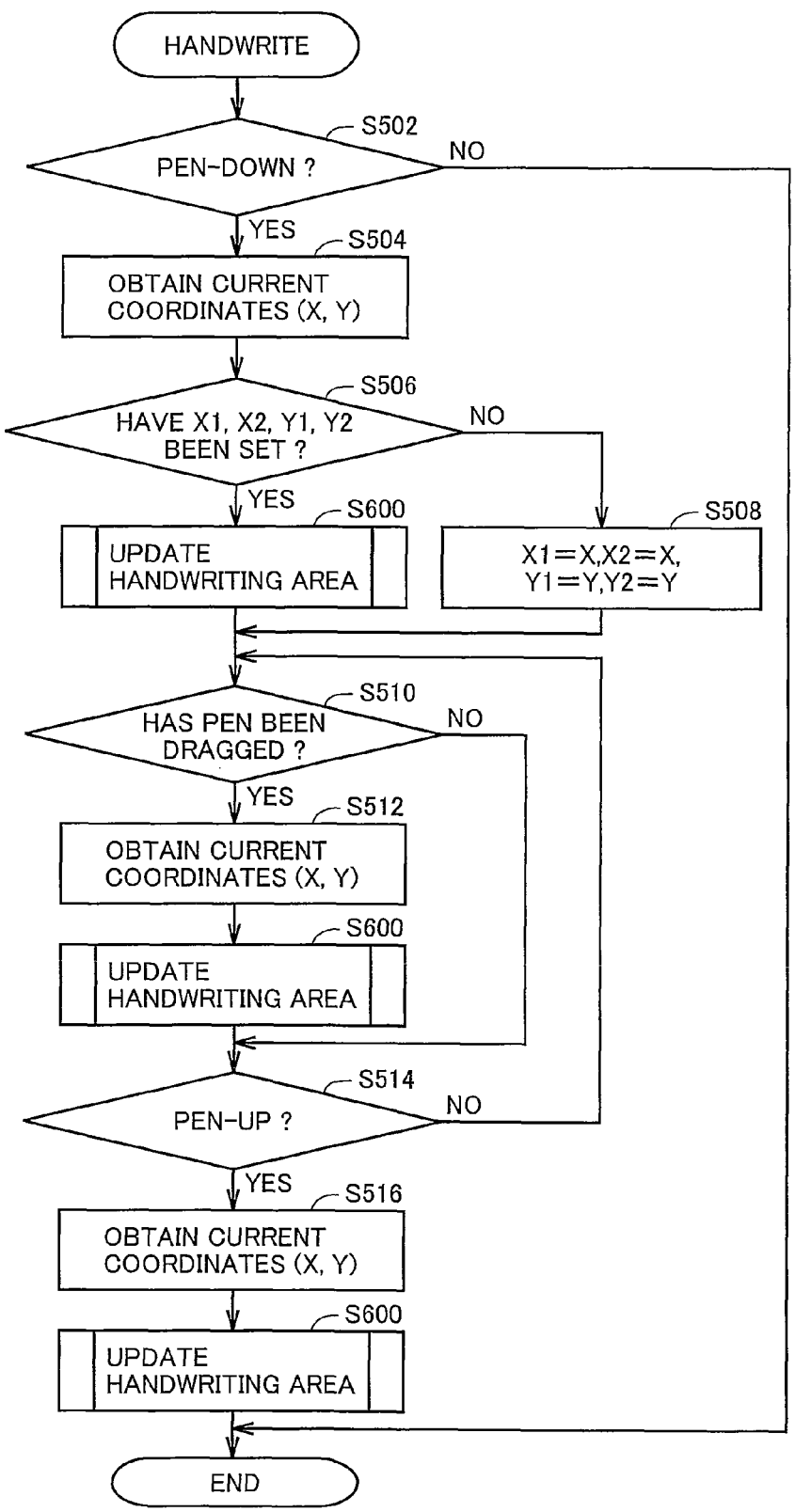
FIG. 35 is a flowchart illustrating a procedure of a handwriting process in the mobile phone according to the present embodiment.
Figure 36:
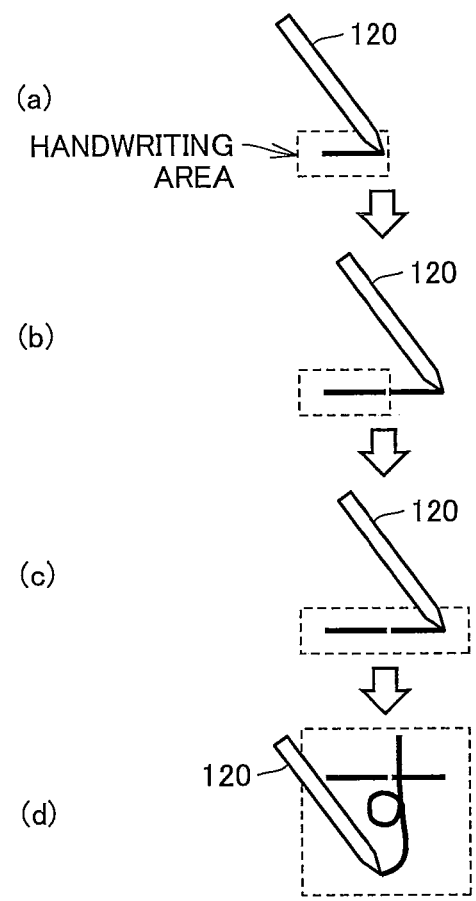
FIG. 36 is a representation of a change in the handwritten data area according to the present embodiment.

In the present embodiment, mobile phone 100 performs the handwriting process, as will be described hereinafter. FIG. 35 is a flowchart illustrating a procedure of the handwriting process in mobile phone 100 according to the present embodiment. FIG. 36 is a representation of a change in the handwritten data area according to the present embodiment.

Referring to FIG. 35, CPU 106 determines whether or not pen-down (touch operation) has been received via touch panel 102 (step S502). When pen-down has not been received (NO in step S502), CPU 106 ends the handwriting process.

When pen-down has been received (YES in step S502), CPU 106 obtains the coordinates (X, Y) that has been touched (step S504). CPU 106 determines whether or not the handwritten data area has been set (step S506). More specifically, CPU 106 determines whether or not the upper-left coordinates (X1, Y1) and the lower-right coordinates (X2, Y2) in the handwritten data area have been set.

When the handwritten data area has been set (YES in step S506), CPU 106 performs the updating process for the handwritten data area (step S600). In other words, as described later, since the handwritten data area may be increased in size in accordance with progress in input of the handwritten image as shown in FIG. 36, the updating process for the handwritten data area should be performed while the handwritten image is being input. The details of the updating process for the handwritten data area (step S600) will be described later.

When the handwritten data area has not been set (No in step S506), CPU 106 substitutes X into a variable X1, substitutes a value X into a variable X2, substitutes a value Y into a variable Y1, and substitutes a value Y into a variable Y2 (step S508). CPU 106 determines via touch panel 102 whether or not the pen has been dragged (step S510). When the pen has not been dragged (NO in step S510), CPU 106 performs the process from step S514.

When the pen has been dragged (YES in step S510), CPU 106 obtains the current coordinates (X, Y) via touch panel 102 (step S512). CPU 106 performs the updating process for the handwritten data area (step S600). CPU 106 determines via touch panel 102 whether or not pen-up has been performed (whether or not a series of touch operations has been ended) (step S514). When pen-up has not been performed (NO in step S514), CPU 106 repeats the process from step S510.

When pen-up has been performed (YES in step S514), CPU 106 obtains the current coordinates (X, Y) (step S516). CPU 106 performs the updating process for the handwritten data area (step S600). CPU 106 then ends the handwriting process.

As shown in FIGS. 36(a) to 36(d), the handwritten data area is expanded in accordance with progress in input of the handwritten image. Accordingly, it is preferable that the handwritten data area is established at the point of time when input of the handwritten image is ended, that is, at the point of time when pen-up has been performed. In the present embodiment, the handwritten data area corresponding to a series of touch operations is updated as appropriate in the updating process for the handwritten data area (step S600), which will be described later.

Figure 37:
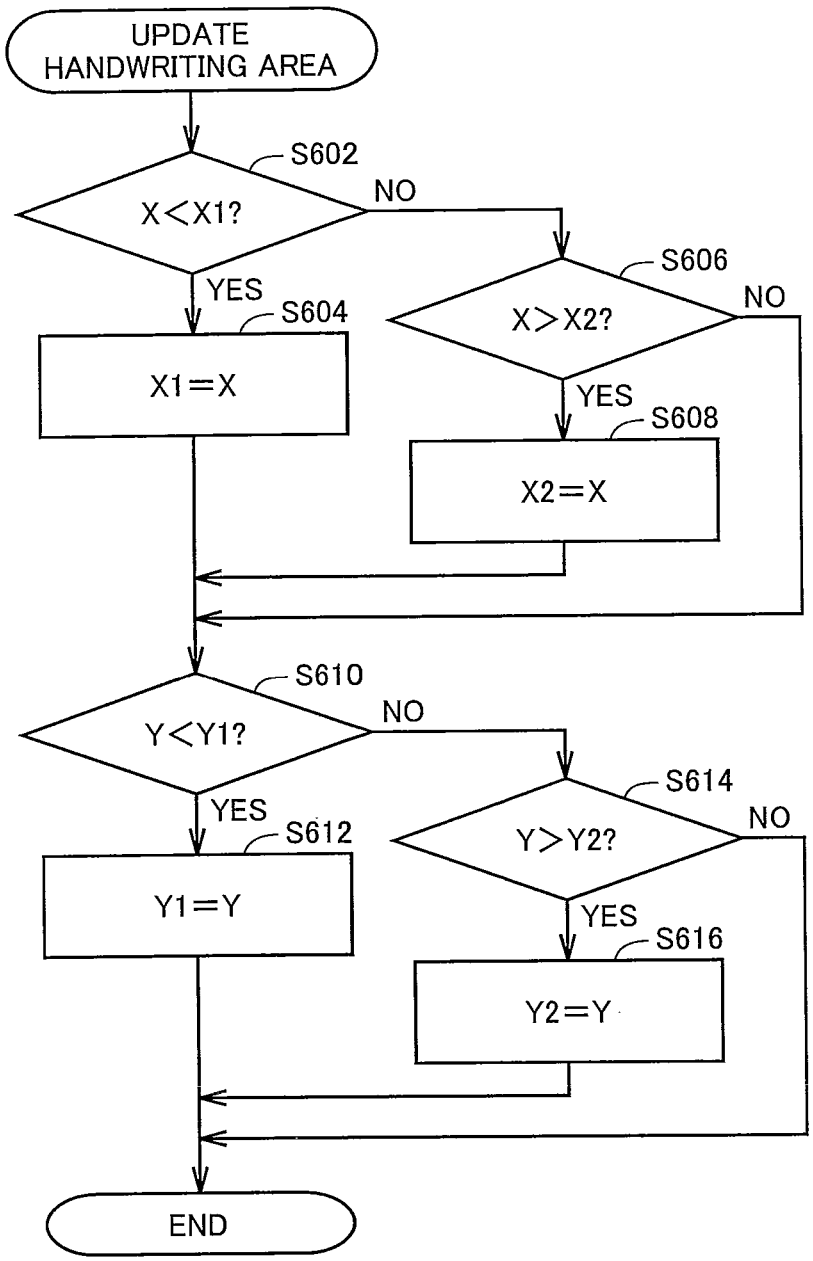
FIG. 37 is a flowchart illustrating a procedure of an updating process for the handwritten data area in the mobile phone according to the present embodiment.

In the present embodiment, mobile phone 100 performs the updating process for the handwritten data area, as will be described hereinafter. FIG. 37 is a flowchart illustrating a procedure of an updating process for the handwritten data area in mobile phone 100 according to the present embodiment. In the following, an explanation will be given with regard to the case where the upper-left coordinates in the handwritten data area are set at (X1, Y1) and the lower-right coordinates in the handwritten data area are set at (X2, Y2).

Referring to FIG. 37, CPU 106 determines whether or not the X coordinate at the current touched position is less than variable X1 (step S602). When X is less than X1 (YES in step S602), CPU 106 substitutes value X into variable X1 (step S604). CPU 106 then performs the process from step S610.

When X is not less than variable X1 (NO in step S602), CPU 106 determines whether or not the X coordinate at the touched position is greater than variable X2 (step S606). When X is greater than variable X2 (YES in step S606), CPU 106 substitutes value X into variable X2. CPU 106 then performs the process from step S610.

When X is not more than variable X2 (NO in step S606), CPU 106 determines whether or not the Y coordinate at the touched position is less than variable Y1 (step S610). When Y is less than variable Y1 (YES in step S610), CPU 106 substitutes value Y into variable Y1 (step S612). CPU 106 then ends the updating process for the handwritten data area.

When Y is not less than variable Y1 (NO in step S610), CPU 106 determines whether or not the Y coordinate at the touched position is greater than variable Y2 (step S614). When Y is greater than variable Y2 (YES in step S614), CPU 106 substitutes value Y into variable Y2 (step S616). CPU 106 then ends the updating process for the handwritten data area.

When Y is not more than variable Y2 (NO in step S614), CPU 106 ends the updating process for the handwritten data area.

<Background Data Obtaining Process in Mobile Phone 100>

Figure 38:
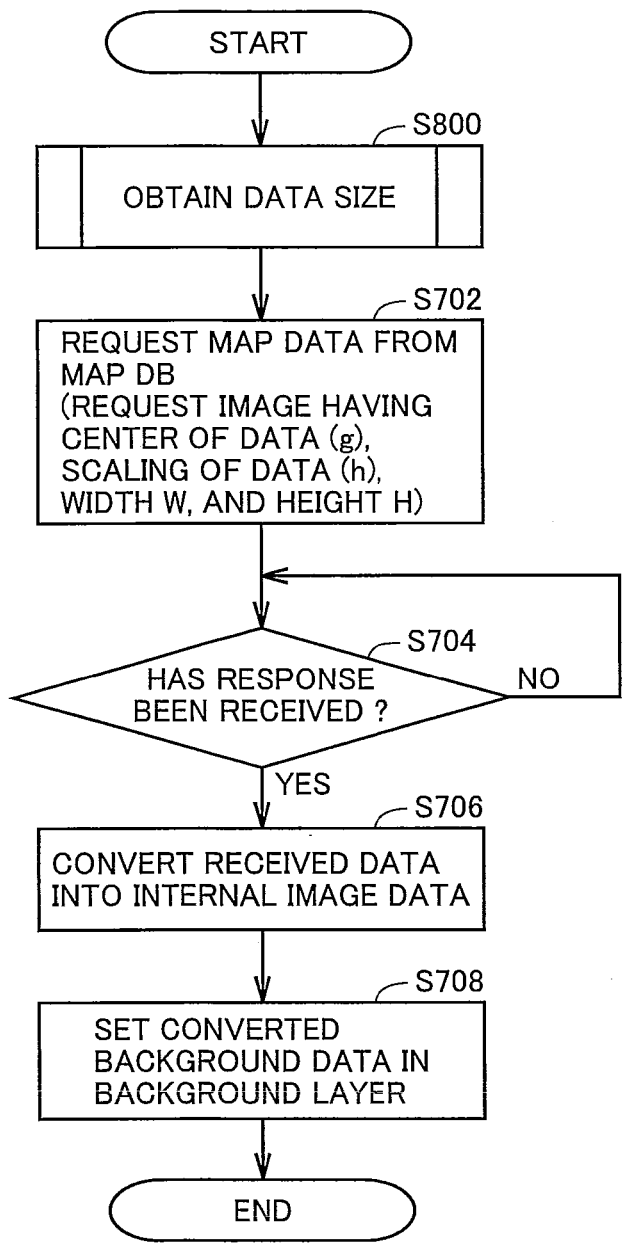
FIG. 38 is a flowchart illustrating a procedure of a background data obtaining process in the mobile phone according to the present embodiment.

In the present embodiment, mobile phone 100 performs a background data obtaining process, as will be described hereinafter. FIG. 38 is a flowchart illustrating a procedure of the background data obtaining process in mobile phone 100 according to the present embodiment.

Referring to FIG. 38, CPU 106 performs a data size obtaining process (step S800). The data size obtaining process (step S800) will be described later.

CPU 106 requests map data from the map database (contents server 600) via communication device 101 (step S702). More specifically, CPU 106 transmits data (g), (h) and (i) via communication device 101. CPU 106 determines whether or not a response has been received from contents server 600 via communication device 101 (step S704). When a response has not been received from contents server 600 (NO in step S704), CPU 106 repeats the process in step S704.

When the response has been received from contents server 600 via communication device 101 (YES in step S704), CPU 106 converts the received data into internal image data (step S706). CPU 106 sets the converted background data (map image data) in a background layer (step S708). CPU 106 ends the background data obtaining process.

In the present embodiment, mobile phone 100 performs the data size obtaining process, as will be described hereinafter.

Figure 39:
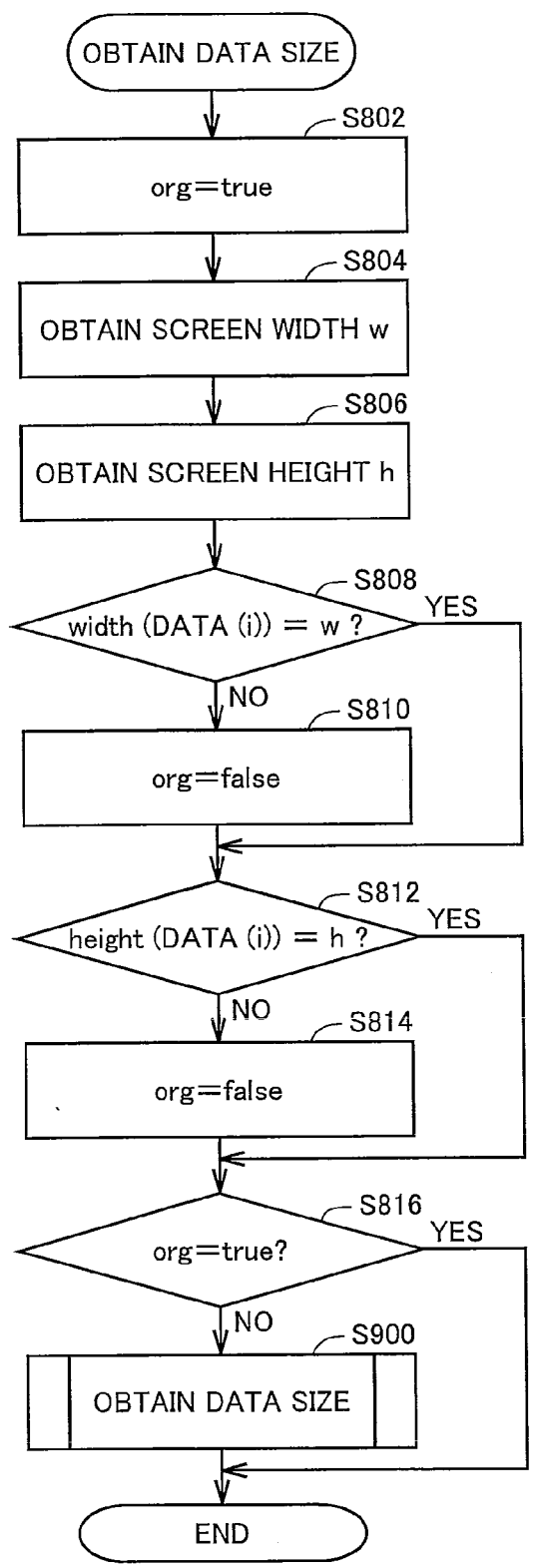
FIG. 39 is a flowchart illustrating a procedure of a data size obtaining process in the mobile phone according to the present embodiment.

FIG. 39 is a flowchart illustrating a procedure of a data size obtaining process in mobile phone 100 according to the present embodiment.

Referring to FIG. 39, CPU 106 substitutes "true" into a variable "org" (step S802). CPU 106 obtains a width w of the screen in touch panel 102 or the window (step S804). CPU 106 obtains a height h of the touch panel or the window (step S806).

CPU 106 determines whether or not the condition that width (data (i))=w is satisfied (step S808). When the condition that variable "width" (data (i))=w is satisfied (YES in step S808), CPU 106 performs the process from step S812.

When the condition that variable "width" (data (i))=w is not satisfied (NO in step S808), CPU 106 substitutes "false" into variable "org" (step S810). CPU 106 determines whether or not the condition that a variable "height" (data (i))=h is satisfied (step S812). When the condition that variable "height" (data (i))=h is satisfied (YES in step S812), CPU 106 performs the process from step S816.

When the condition that variable "height" (data (i))=h is not satisfied (NO in step S812), CPU 106 substitutes "false" into variable "org" (step S814). CPU 106 determines whether or not "true" is substituted into variable "org" (step S816). When "true" is substituted into variable "org" (YES in step S816), CPU 106 ends the data size obtaining process.

When "true" is not substituted into variable "org" (NO in step S816), CPU 106 performs the data size setting process (step S900). Note that the data size setting process (step S900) will be described later. CPU 106 then ends the data size obtaining process.

Figure 40:
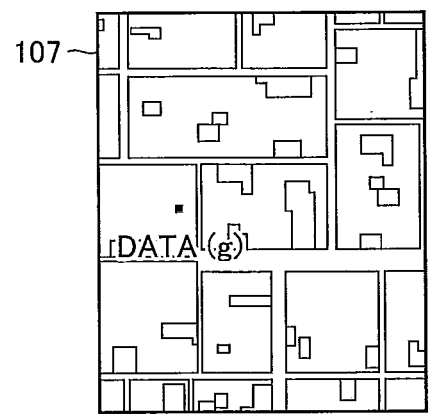
FIG. 40 is a representation of a screen in the case where a receiving terminal is identical in screen size to a transmitting terminal according to the present embodiment.
Figure 41:
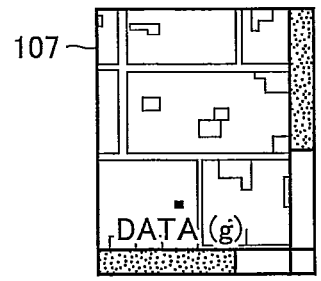
FIG. 41 is the first representation of a screen in the case where the receiving terminal is smaller in screen size than the transmitting terminal according to the present embodiment.
Figure 42:
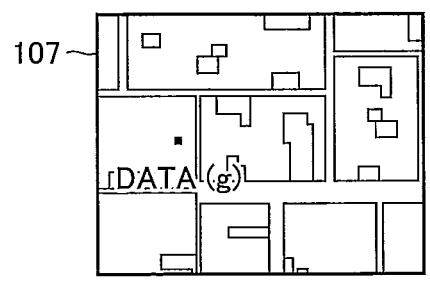
FIG. 42 is the second representation of a screen in the case where the receiving terminal is smaller in screen size than the transmitting terminal according to the present embodiment.
Figure 43:
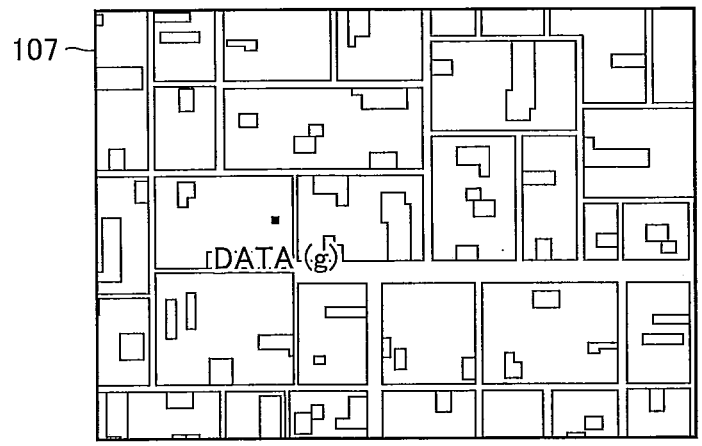
FIG. 43 is a representation of the screen of the receiving terminal in the case where the receiving terminal is larger in screen size than the transmitting terminal according to the present embodiment.

In the present embodiment, mobile phone 100 performs the data size setting process, as will be described hereinafter. FIG. 40 is a representation of a screen in the case where the receiving terminal is identical in screen size to the transmitting terminal. FIG. 41 is the first representation of a screen in the case where the receiving terminal is smaller in screen size than the transmitting terminal. FIG. 42 is the second representation of a screen in the case where the receiving terminal is smaller in screen size than the transmitting terminal. FIG. 43 is a representation of the screen of the receiving terminal in the case where the receiving terminal is larger in screen size than the transmitting terminal.

Figure 44:
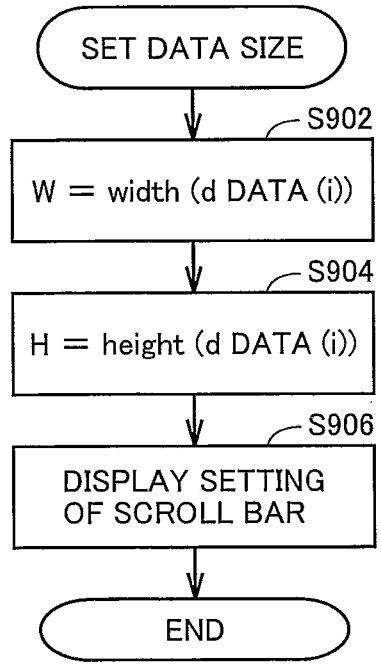
FIG. 44 is a flowchart illustrating a procedure of a data size setting process in the case where the same background as that of the transmitting side is displayed, according to the present embodiment.
Figure 45:
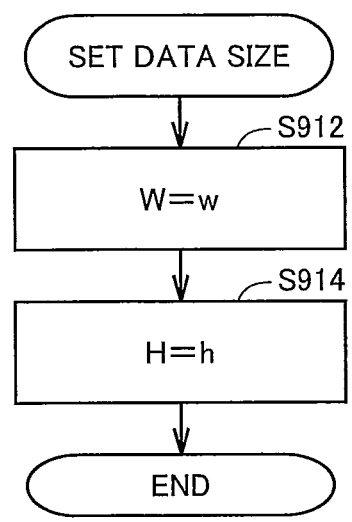
FIG. 45 is a flowchart illustrating a procedure of the data size setting process in the case where the receiving terminal displays a background different from that of the transmitting terminal according to the present embodiment.

FIG. 44 is a flowchart illustrating a procedure of the data size setting process in the case where the same background as that of the transmitting side is displayed. FIG. 45 is a flowchart illustrating a procedure of the data size setting process in the case where the receiving terminal displays a background different from that of the transmitting terminal.

Referring to FIGS. 41 and 44, CPU 106 substitutes variable "width" (t data (i)) into a variable W (step S902). CPU 106 substitutes "height" (d data (i)) into a variable H (step S904). CPU 106 performs display setting of the scroll bar on display 107 (step S906). CPU 106 then ends the data size setting process.

Referring to FIGS. 42, 43 and 45, CPU 106 substitutes the value of variable w into variable W (step S912). CPU 106 substitutes the value of a variable h into variable H (step S914). CPU 106 then ends the data size setting process.

<Data Display Process in Mobile Phone 100>

Figure 46:
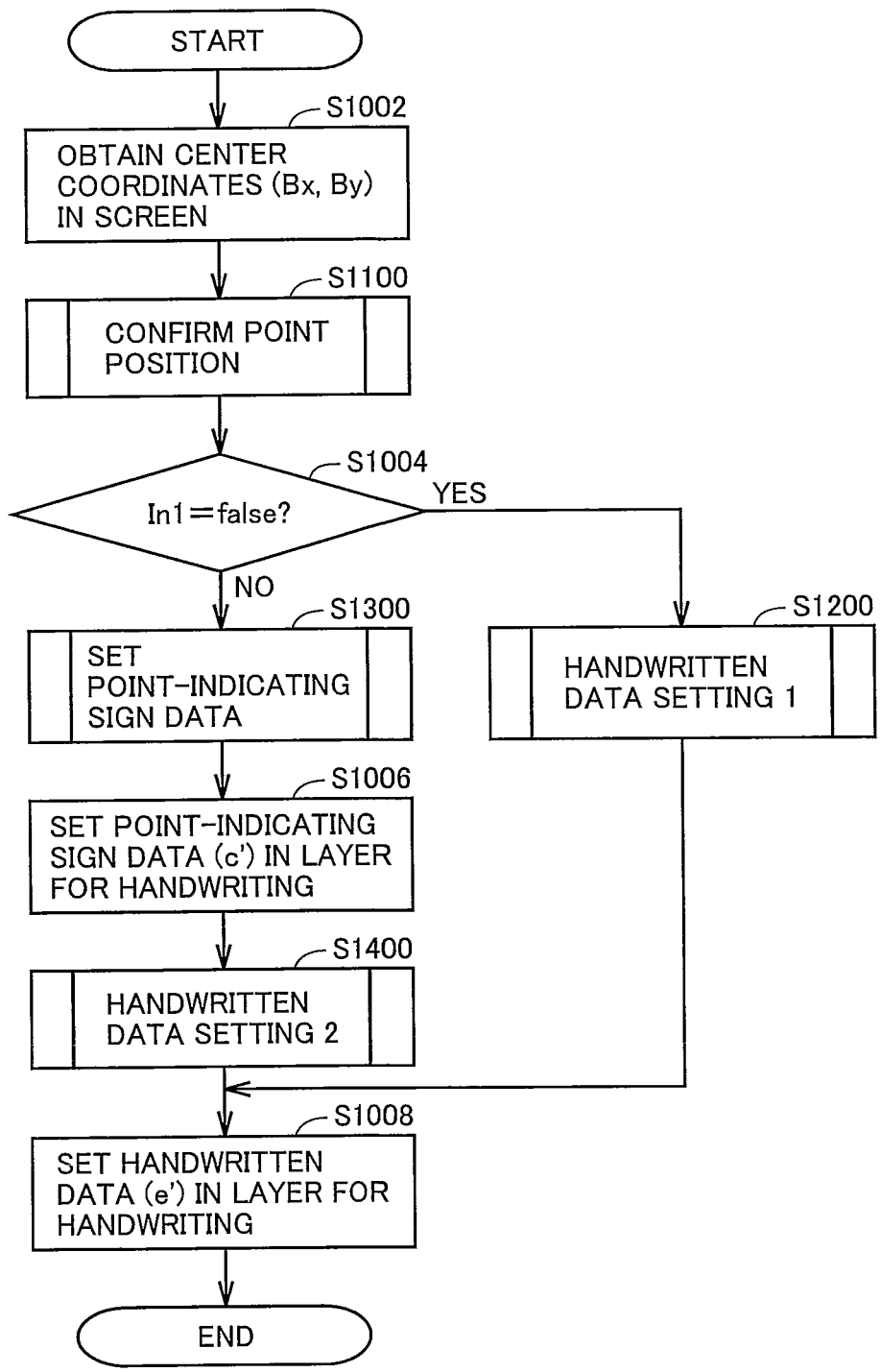
FIG. 46 is a flowchart illustrating a procedure of a data display process in the mobile phone according to the present embodiment.

In the present embodiment, mobile phone 100 performs the data processing process, as will be described hereinafter. FIG. 46 is a flowchart illustrating a procedure of a data display process in mobile phone 100 according to the present embodiment.

Referring to FIG. 46, CPU 106 obtains the center coordinates (Bx, By) in the screen that is currently displayed (step S1002). CPU 106 performs the point position confirmation process (step S1100). Note that point position confirmation process (step S1100) will be described later.

CPU 106 determines whether or not "false" is stored in a variable Ir1 (step S1004). When "false" is stored in variable Ir1 (YES in step S1004), CPU 106 performs a handwritten data setting process 1 (step S1200). Note that handwritten data setting process 1 (step S1200) will be described later. CPU 106 then performs the process from step S1008.

When "false" is not substituted into variable Ir1 (NO in step S1400), CPU 106 performs a point-indicating sign data setting process (1300). Note that the point-indicating sign data setting process (1300) will be described later.

CPU 106 sets point-indicating sign data (c') in a layer for handwriting (step S1006). CPU 106 performs a handwritten data setting process 2 (step S1400). Note that handwritten data setting process 2 (step S1400) will be described later. CPU 106 sets handwritten data (e') in the layer for handwriting (step S1008). CPU 106 then ends the data display process.

Figure 47:
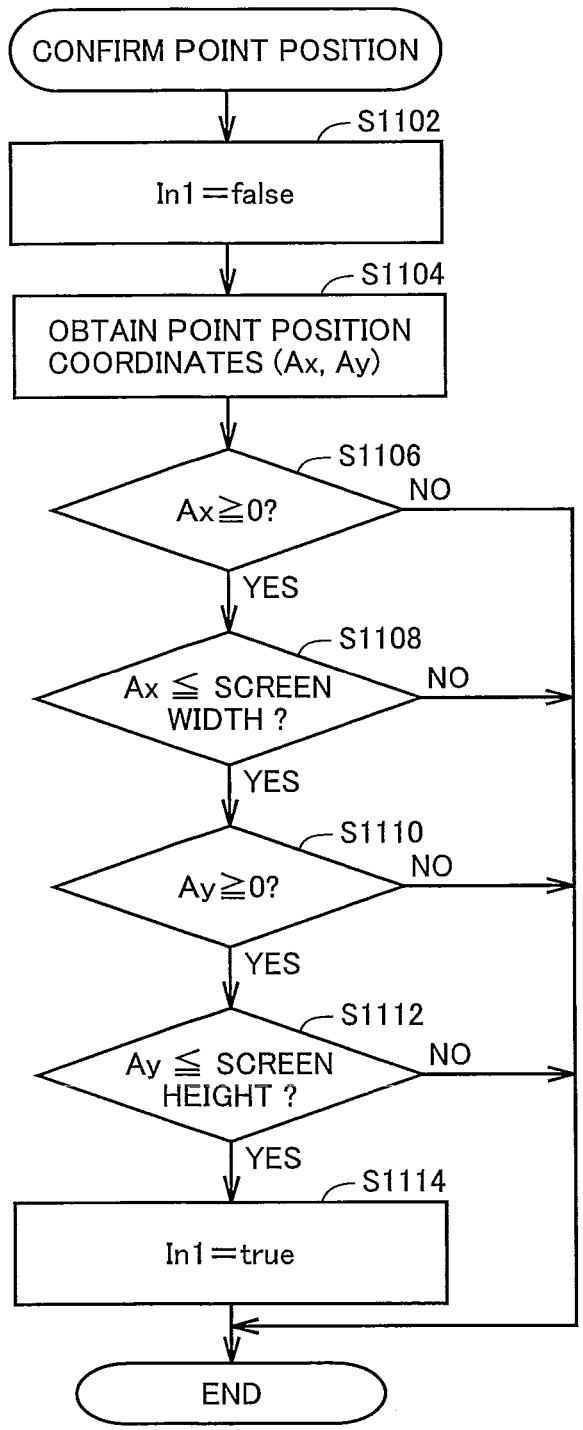
FIG. 47 is a flowchart illustrating a procedure of a point position confirmation process in the mobile phone according to the present embodiment.

In the present embodiment, mobile phone 100 performs the point position confirmation process, as will be described hereinafter. FIG. 47 is a flowchart illustrating a procedure of the point position confirmation process in mobile phone 100 according to the present embodiment.

Referring to FIG. 47, CPU 106 substitutes "false" into variable Ir1 (step S1102). CPU 106 obtains coordinates (Ax, Ay) at the point position via touch panel 102 (step S1104). CPU 106 determines whether or not a variable Ax is not less than 0 (step S1106). When variable Ax is less than 0 (NO in step S1106), CPU 106 ends the point position confirmation process.

When variable Ax is not less than 0 (YES in step S1106), CPU 106 determines whether or not variable Ax is not more than the screen width (step S1108). When variable Ax is greater than the screen width (NO in step S1108), CPU 106 ends the point position confirmation process.

When variable Ax is not more than the screen width (YES in step S1108), CPU 106 determines whether or not variable Ay is not less than 0 (step S1110). When variable Ay is less than 0 (NO in step S1110), CPU 106 ends the point position confirmation process.

When variable Ay is not less than 0 (YES in step S1110), CPU 106 determines whether or not variable Ay is not more than the screen height (step S1112). When variable Ay is greater than the screen height (NO in step S1112), CPU 106 ends the point position confirmation process.

When variable Ay is not more than the screen height (YES in step S1112), CPU 106 substitutes "true" into variable In1 (step S1114). CPU 106 then ends the point position confirmation process.

Figure 48:
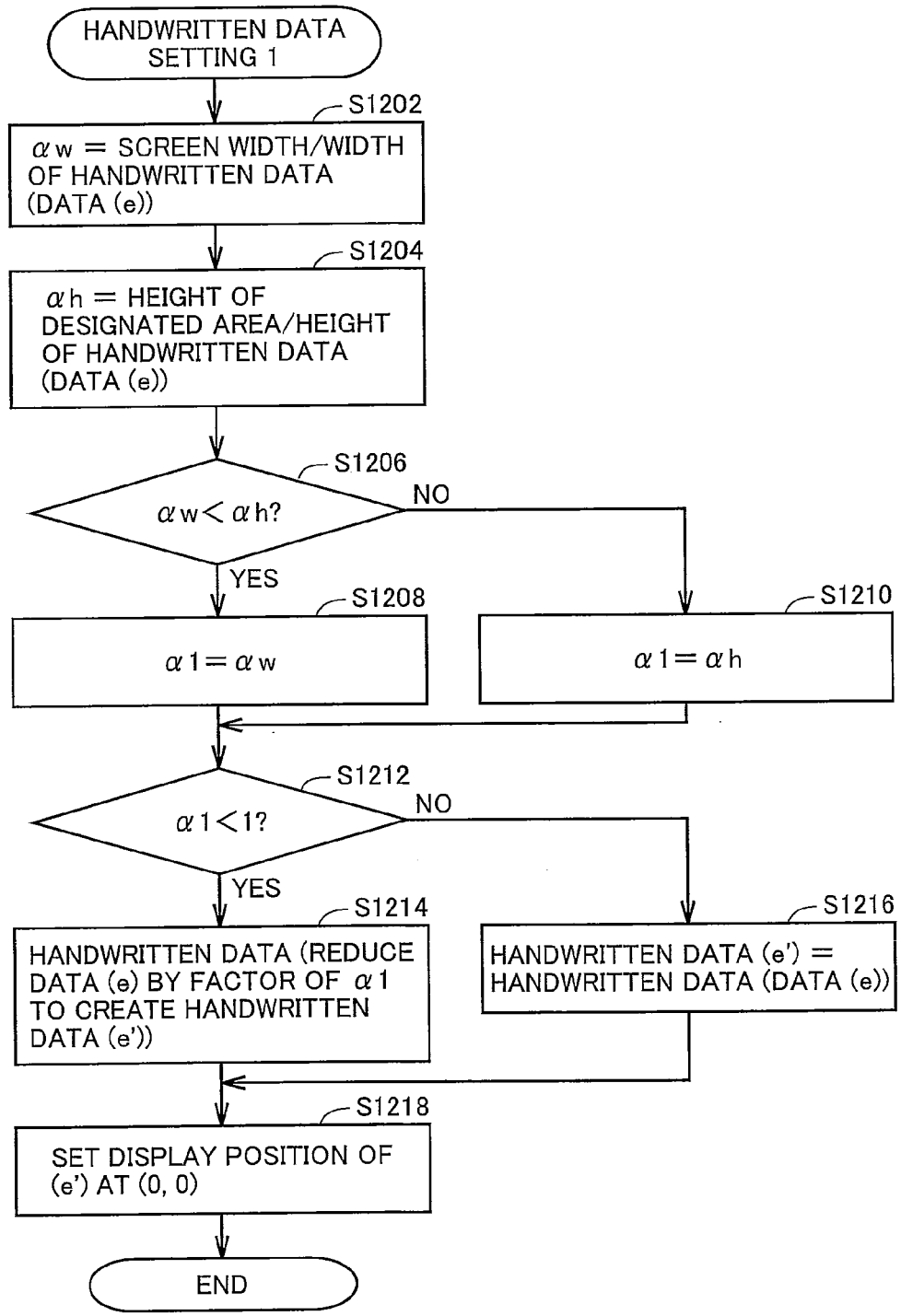
FIG. 48 is a flowchart illustrating the first example of a handwritten data setting process in the mobile phone according to the present embodiment.
Figure 49A:
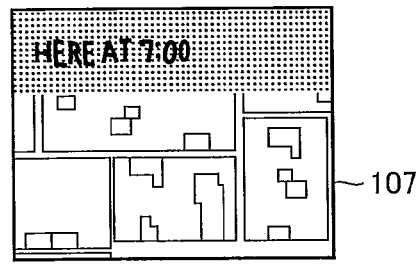
FIG. 49A is the first representation of a screen in the first example of a handwritten data setting process 1 according to the present embodiment.
Figure 49B:
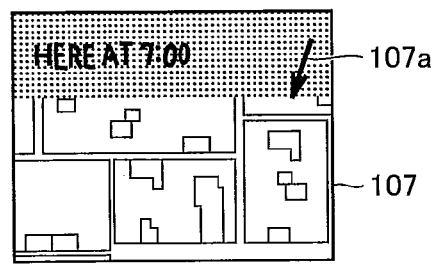
FIG. 49B is the second representation of the screen in the first example of handwritten data setting process 1 according to the present embodiment.
Figure 49C:
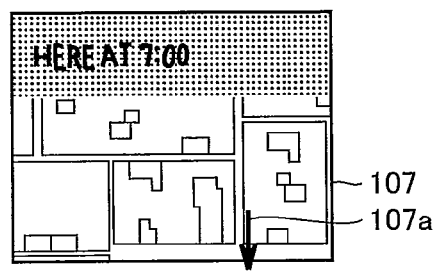
FIG. 49C is the third representation of the screen in the first example of handwritten data setting process 1 according to the present embodiment.
Figure 49D:
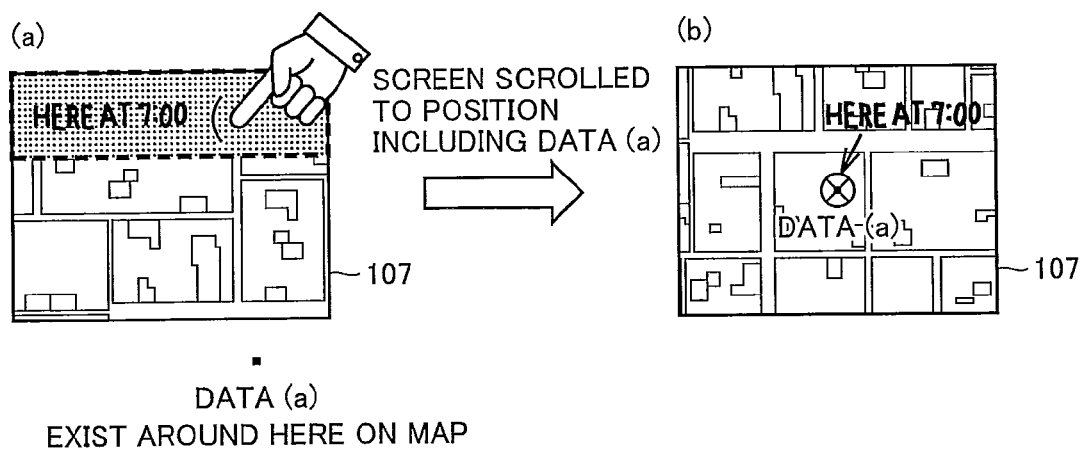
FIG. 49D is a representation of screen transition in the first example of handwritten data setting process 1 according to the present embodiment.

Then, the first example of handwritten data setting process 1 in mobile phone 100 according to the present embodiment will be described. FIG. 48 is a flowchart illustrating the first example of the handwritten data setting process in mobile phone 100 according to the present embodiment. FIG. 49A is the first representation of a screen in the first example of handwritten data setting process 1. FIG. 49B is the second representation of the screen in the first example of handwritten data setting process 1. FIG. 49C is the third representation of the screen in the first example of handwritten data setting process 1. FIG. 49D is a representation of screen transition in the first example of handwritten data setting process 1.

Referring to FIG. 48, CPU 106 substitutes the screen width/the width of the handwritten data (data (e)) into a variable $\alpha w$ (step S1202). CPU 106 substitutes the height of the designated area/the height of the handwritten data (data (e)) into a variable $\alpha h$ (step S1204). CPU 106 determines whether or not variable $\alpha w$ is less than a variable $\alpha h$ (step S1206). When variable αw is less than variable αh (YES in step S1206), CPU 106 substitutes variable αw into variable α1 (step S1208). CPU 106 then performs the process from step S1212.

When variable αw is not less than variable αh (NO in step S1206), CPU 106 substitutes variable αh into variable α1 (step S1210). CPU 106 determines whether or not variable α1 is less than 1 (step S1212). When variable α1 is less than 1 (YES in step S1212), CPU 106 reduces the handwritten data (data (e)) by a factor of α1, to create handwritten data (e') (step S1214). CPU 106 then performs the process from step S1218.

When variable α1 is not less than 1 (NO in step S1212), CPU 106 substitutes the handwritten data (data (e)) into handwritten data (e') (1216). CPU 106 sets the display position of the data (e') at coordinates (0, 0) (step S1218). CPU 106 then ends handwritten data setting process 1.

Thus, in handwritten data setting process 1, even if the designated point (data (a)) is located on the outside of touch panel 102 or the window as shown in FIG. 49A, CPU 106 causes a handwritten image to be displayed in a prescribed area (the upper area) in touch panel 102 or the window.

Alternatively, as shown in FIG. 49B, when the designated point is located on the outside of touch panel 102 or the window, CPU 106 causes an arrow 107a for indicating the direction of the designated point to be displayed in a prescribed area in touch panel 102 or the window.

Alternatively, as shown in FIG. 49C, when the designated point is located on the outside of touch panel 102 or the window, CPU 106 causes arrow 107a for indicating the direction of the designated point to be displayed in the area near the designated point on touch panel 102 or the window.

Furthermore, as shown in FIG. 49D(a), when the designated point is located on the outside of touch panel 102 or the window, CPU 106 receives, via touch panel 102, the user's touch operation to the prescribed area in touch panel 102 or the window. It is to be noted that arrow 107a may be displayed or may not be displayed. Upon receiving the user's touch operation to the prescribed area in touch panel 102 or the window, CPU 106 causes the screen to be scrolled such that the designated point is located in the center of touch panel 102 or the window, as shown in FIG. 49D(b).

Alternatively, when CPU 106 continues receiving the user's touch operation to the prescribed area in touch panel 102 or the window for more than a prescribed time period, CPU 106 causes the screen to be scrolled in the direction to the designated point after a lapse of this prescribed time period while it is continuously receiving the touch operation.

Alternatively, in the case where CPU 110 detects another (the second) touched position while it receives the user's first touch operation to the prescribed area in touch panel 102 or the window, CPU 110 causes the screen to be scrolled such that this another touched position is located in the center of touch panel 102 or the window.

Alternatively, when CPU 106 has received the user's touch operation to the prescribed area in touch panel 102 or the window, CPU 106 adjusts the scaling (display magnification) of the image (map) such that the area displayed on touch panel 102 or the window (or the center in touch panel 102 or the window) and the designated point fall within touch panel 102 or the window.

Figure 50:
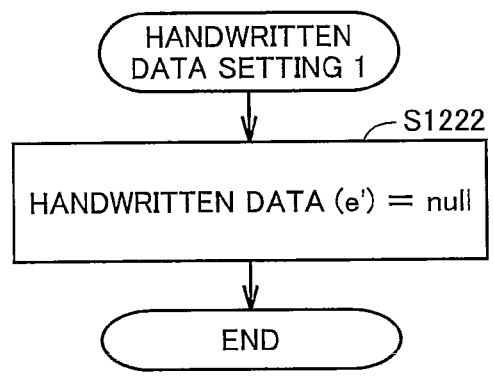
FIG. 50 is a flowchart illustrating the second example of handwritten data setting process 1 in the mobile phone according to the present embodiment.
Figure 51A:
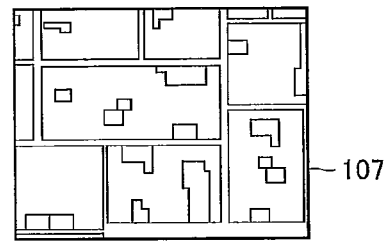
FIG. 51A is the first representation of a screen in the second example of handwritten data setting process 1 according to the present embodiment.
Figure 51B:
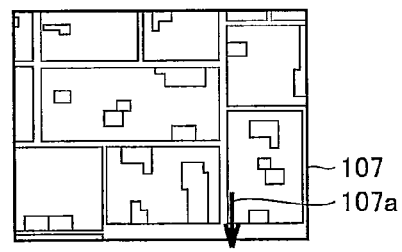
FIG. 51B is the second representation of the screen in the second example of handwritten data setting process 1 according to the present embodiment.
Figure 51C:
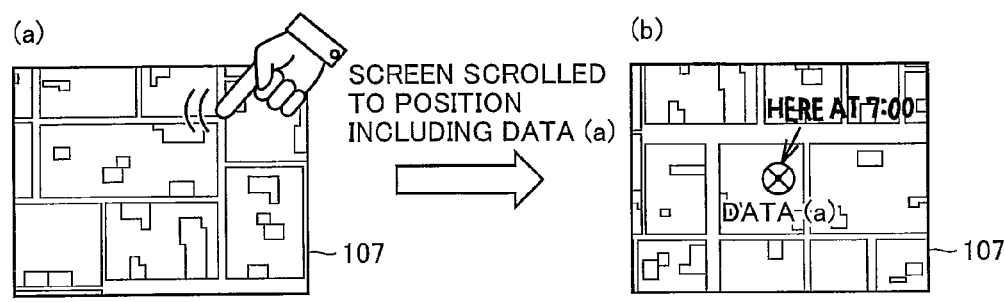
FIG. 51C is a representation of screen transition in the second example of handwritten data setting process 1 according to the present embodiment.

Then, the second example of handwritten data setting process 1 in mobile phone 100 according to the present embodiment will be described. FIG. 50 is a flowchart illustrating the second example of handwritten data setting process 1 in mobile phone 100 according to the present embodiment. FIG. 51A is the first representation of a screen in the second example of handwritten data setting process 1. FIG. 51B is the second representation of the screen in the second example of handwritten data setting process 1. FIG. 51C is a representation of screen transition in the second example of handwritten data setting process 1.

Referring to FIG. 50, CPU 106 substitutes "null" into handwritten data (e') (step S1222). CPU 106 then ends handwritten data setting process 1.

Thus, in handwritten data setting process 1, as shown in FIG. 51A, when the designated point is located on the outside of touch panel 102 or the window, CPU 106 does not cause touch panel 102 to display a handwritten image.

Alternatively, as shown in FIG. 51B, when the designated point is located on the outside of touch panel 102 or the window, CPU 106 causes arrow 107a for indicating the direction of the designated point to be displayed in the area near this designated point in touch panel 102 or the window.

Furthermore, as shown in FIG. 51C(a), when the designated point is located on the outside of touch panel 102 or the window, CPU 106 receives, via touch panel 102, the user's touch operation to touch panel 102 or the window. It is to be noted that arrow 107a may be displayed or may not be displayed. When the user's touch operation to touch panel 102 or the window has been received, CPU 106 causes the screen to be scrolled such that the designated point is located in the center of touch panel 102 or the window, as shown in FIG. 51C(b).

Alternatively, when CPU 106 continues receiving the user's touch operation to touch panel 102 or the window for more than a prescribed time period, CPU 106 causes the screen to be scrolled in the direction of the designated point after a lapse of this prescribed time period while it is continuously receiving the touch operation.

Alternatively, in the case where CPU 110 detects another (second) touched position while it receives the user's first touch operation to touch panel 102 or the window, CPU 110 causes the screen to be scrolled such that this another touched position is located in the center of touch panel 102 or the window.

Alternatively, when having received the user's touch operation to touch panel 102 or the window, CPU 106 adjusts the scaling (display magnification) of the image (map) such that the area displayed on touch panel 102 or the window (or the center in touch panel 102 or the window) and the designated point fall within touch panel 102 or the window.

Figure 52:
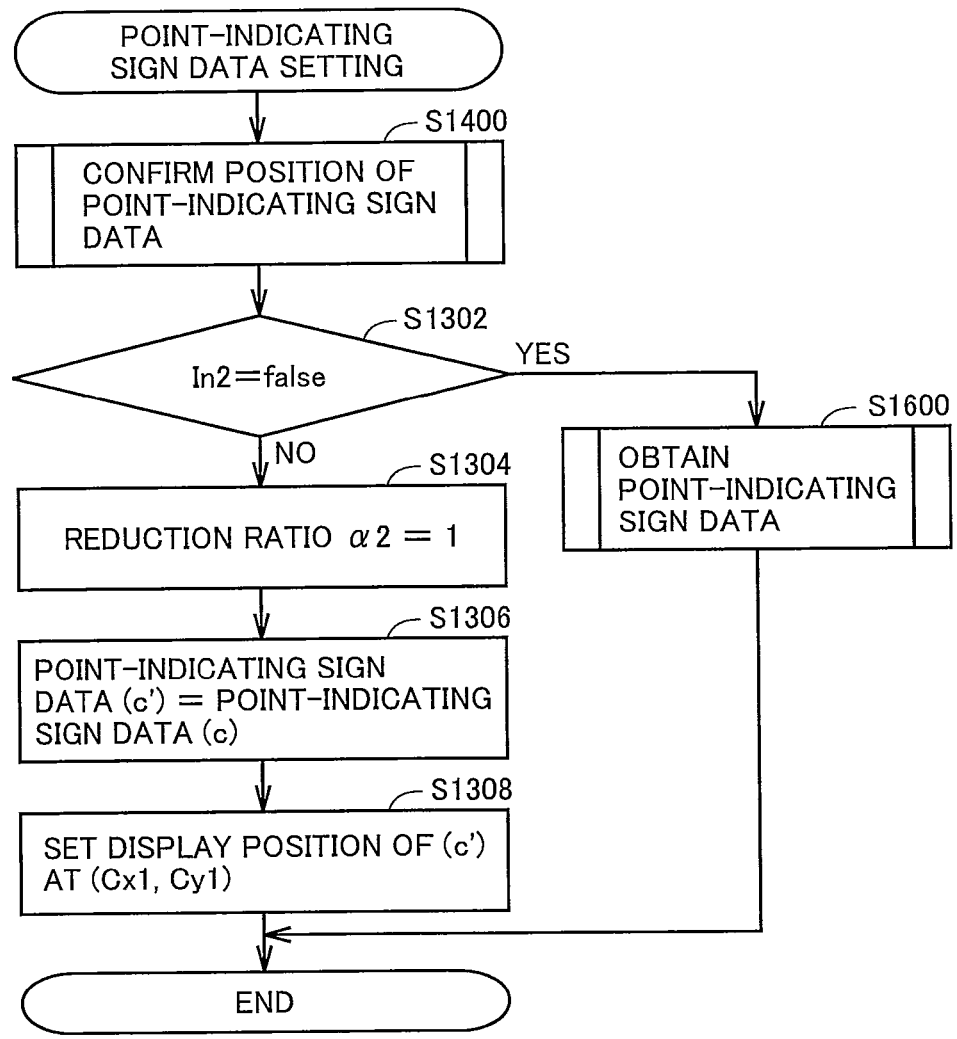
FIG. 52 is a flowchart illustrating a procedure of a point-indicating sign data setting process in the mobile phone according to the present embodiment.

In the present embodiment, mobile phone 100 performs the point-indicating sign data setting process, as will be described hereinafter. FIG. 52 is a flowchart illustrating a procedure of the point-indicating sign data setting process in mobile phone 100 according to the present embodiment.

Referring to FIG. 52, CPU 106 performs the point-indicating sign data position confirmation process (step S1400). The point-indicating sign data position confirmation process (step S1400) will be described later.

CPU 106 determines whether or not "false" is substituted into a variable In2 (step S1302). When "false" is substituted into variable In2 (YES in step S1302), CPU 106 performs the point-indicating sign data obtaining process (step S1600). CPU 106 then ends the point-indicating sign data setting process.

On the other hand, when "false" is not substituted into variable In2 (NO in step S1302), CPU 106 substitutes 1 into a reduction ratio α2 (step S1304). CPU 106 substitutes point-indicating sign data (c) into point-indicating sign data (c') (step S1306). CPU 106 sets the display position of data (c') at coordinates (Cx1, Cy1) (step S1308). CPU 106 then ends the point-indicating sign data setting process.

Figure 53:
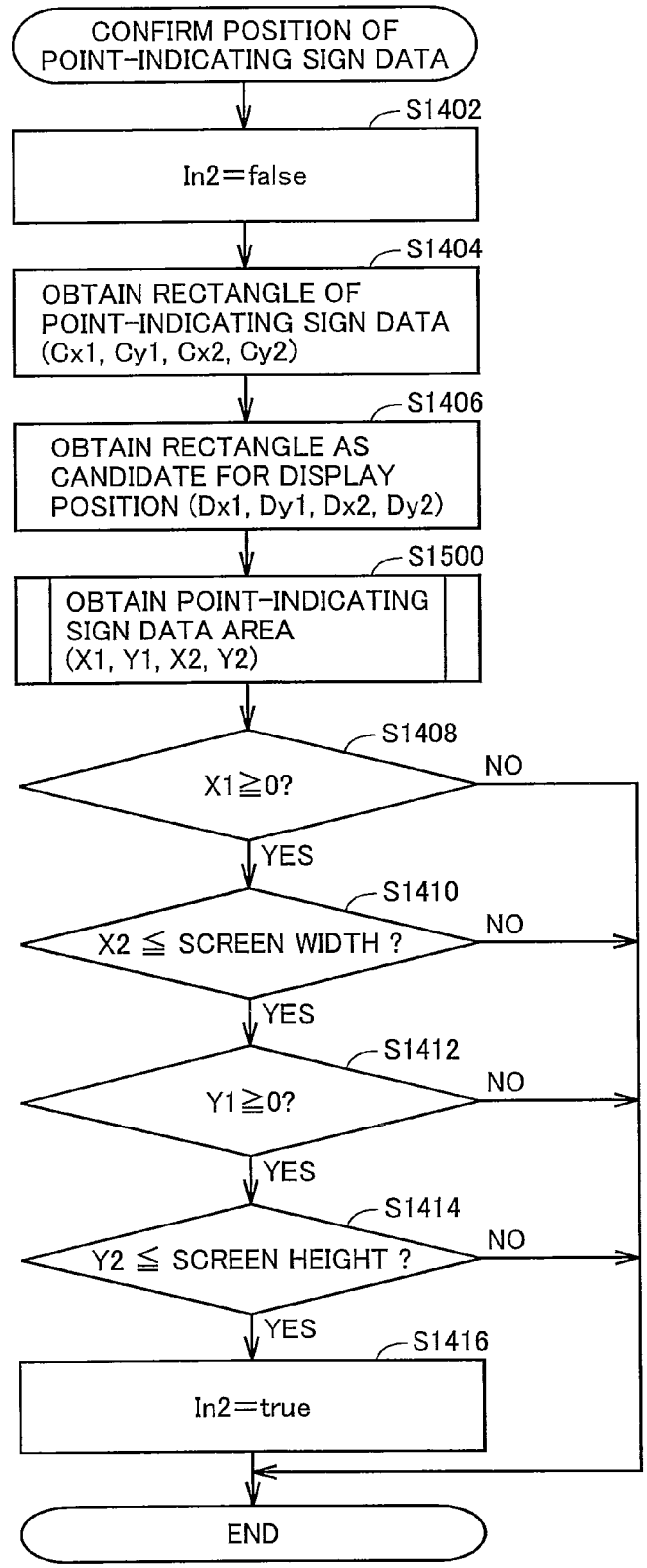
FIG. 53 is a flowchart illustrating a procedure of a point-indicating sign data position confirmation process in the mobile phone according to the present embodiment.

In the present embodiment, mobile phone 100 performs a point-indicating sign data position confirmation process, as will be described hereinafter. FIG. 53 is a flowchart illustrating a procedure of the point-indicating sign data position confirmation process in the mobile phone according to the present embodiment.

Referring to FIG. 53, CPU 106 substitutes "false" into variable In2 (step S1402). CPU 106 obtains a rectangular area of the point-indicating sign data position (1404). More specifically, CPU 106 obtains the upper-left coordinates (Cx1, Cy1) and the lower-right coordinates (Cx2, Cy2) of the area (rectangular area) for displaying the point-indicating sign data.

CPU 106 obtains a rectangular area as a candidate for the display position (step S1406). More specifically, CPU 106 obtains the upper-left coordinates (Dx1, Dy1) and the lower-right coordinates (Dx2, Dy2) of the rectangular area as a candidate for the display position.

CPU 106 then performs the point-indicating sign data area obtaining process (step S1500). The point-indicating sign data area obtaining process (step S1500) will be described later.

CPU 106 determines whether or not variable X1 is not less than 0 (step S1408). When variable X1 is less than 0 (NO in step S1408), CPU 106 ends the point-indicating sign data position confirmation process.

When variable X1 is not less than 0 (YES in step S1408), CPU 106 determines whether or not variable X2 is not more than the screen width (step S1410). When variable X2 is greater than the screen width (NO in step S1410), CPU 106 ends the point-indicating sign data position confirmation process.

When variable X is not more than the screen width (YES in step S1410), CPU 106 determines whether or not variable Y1 is not less than 0 (step S1412). When variable Y1 is less than 0 (NO in step S1412), CPU 106 ends the point-indicating sign data position confirmation process.

When variable Y1 is not less than 0 (YES in step S1412), CPU 106 determines whether or not variable Y2 is not more than the screen height (step S1414). When variable Y2 is greater than the screen height (NO in step S1414), CPU 106 ends the point-indicating sign data position confirmation process.

When variable Y2 is not more than the screen height (YES in step S1414), CPU 106 substitutes "true" into variable In2 (step S1416). CPU 106 then ends the point-indicating sign data position confirmation process.

Figure 54:
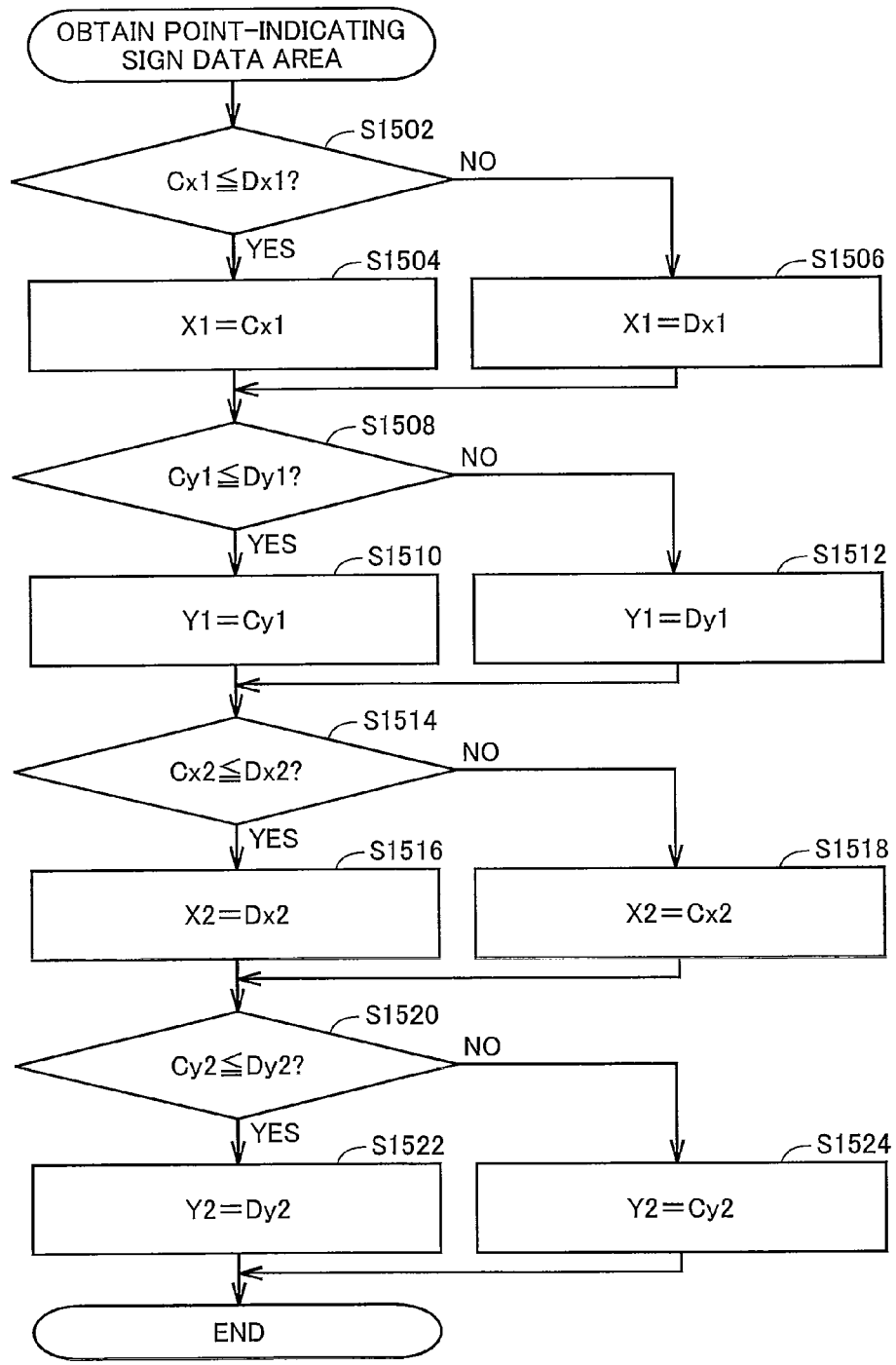
FIG. 54 is a flowchart illustrating a procedure of a point-indicating sign data area obtaining process in the mobile phone according to the present embodiment.

In the present embodiment, mobile phone 100 performs a point-indicating sign data area obtaining process, as will be described hereinafter. FIG. 54 is a flowchart illustrating a procedure of the point-indicating sign data area obtaining process in mobile phone 100 according to the present embodiment.

Referring to FIG. 54, CPU 106 determines whether or not a variable Cx1 is not more than a variable Dx1 (step S1502). When variable Cx1 is not more than variable Dx1 (YES in step S1502), CPU 106 substitutes variable Cx1 into variable X1 (step S1504). CPU 106 then performs the process from step S1508.

When variable Cx1 is greater than variable Dx1 (NO in step S1502), CPU 106 substitutes variable Dx1 into variable X1 (step S1506). CPU 106 determines whether or not variable Cy1 is not more than variable Dy1 (step S1508). When variable Cy1 is not more than variable Dy1 (YES in step S1508), CPU 106 substitutes variable Cy1 into variable Y1 (step S1510). CPU 106 then performs the process from step S1514.

When variable Cy1 is greater than variable Dy1 (NO in step S1508), CPU 106 substitutes variable Dy1 into variable Y1 (step S1512). CPU 106 determines whether or not a variable Cx2 is not more than a variable Dx2 (step S1514). When variable Cx2 is not more than variable Dx2 (YES in step S1514), CPU 106 substitutes variable Dx2 into variable X2 (step S1516). CPU 106 then performs the process from step S1520.

When variable Cx2 is greater than variable Dx2 (NO in step S1514), CPU 106 substitutes variable Cx2 into variable x2 (step S1518). CPU 106 determines whether or not variable Cy2 is not more than variable Dy2 (step S1520). When variable Cy2 is not more than variable Dy2 (YES in step S1520), CPU 106 substitutes variable Dy2 into variable Y2 (step S1522). CPU 106 then ends the point-indicating sign data area obtaining process.

When variable Cy2 is greater than variable Dy2 (NO in step S1520), CPU 106 substitutes variable Cy2 into variable Y2 (step S1524). CPU 106 then ends the point-indicating sign data area obtaining process.

Figure 55:
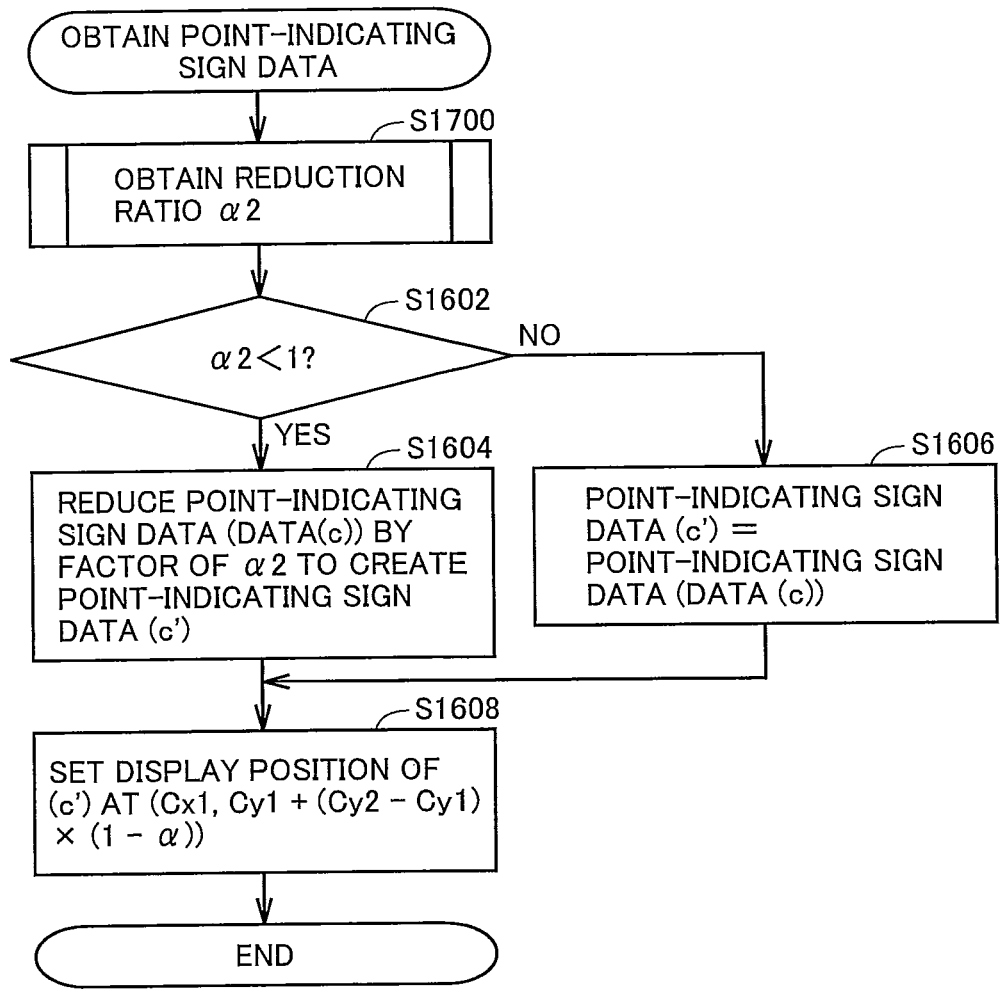
FIG. 55 is a flowchart illustrating a procedure of a point-indicating sign data obtaining process in the mobile phone according to the present embodiment.
Figure 56:
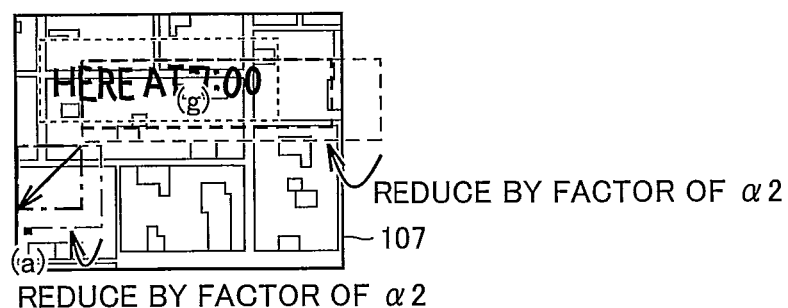
FIG. 56 is a representation of a screen in which the point-indicating sign data is reduced by a factor of $\alpha 2$, according to the present embodiment.
Figure 57:
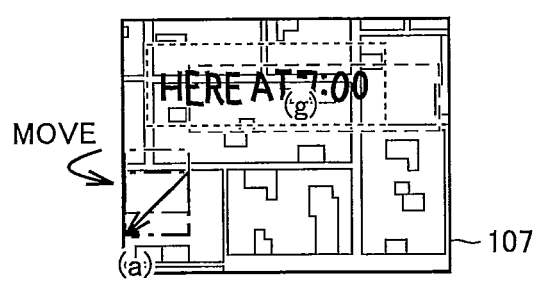
FIG. 57 is a representation of the screen in which the display position of the point-indicating sign data is moved, according to the present embodiment.

In the present embodiment, mobile phone 100 performs the point-indicating sign data obtaining process, as will be described hereinafter. FIG. 55 is a flowchart illustrating a procedure of a point-indicating sign data obtaining process in mobile phone 100 according to the present embodiment. FIG. 56 is a representation of a screen in which the point-indicating sign data is reduced by a factor of $\alpha 2$. FIG. 57 is a representation of the screen in which the display position of the point-indicating sign data is moved.

Referring to FIG. 55, CPU 106 performs the process of obtaining reduction ratio $\alpha 2$ (step S1700). The process of obtaining reduction ratio $\alpha 2$ (step S1700) will be described later.

CPU 106 determines whether or not variable $\alpha 2$ is less than 1 (step S1602). When variable $\alpha 2$ is less than 1 (YES in step S1602), CPU 106 reduces the point-indicating sign data (data (c)) by a factor of $\alpha 2$, to create point-indicating sign data (c') (step S1604). More specifically, as shown in FIG. 56, CPU 106 reduces the size of the display area for the sign data. CPU 106 then performs the process from step S1608.

On the other hand, when variable $\alpha 2$ is not less than 1 (NO in step S1602), CPU 106 substitutes the point-indicating sign data (data (c)) into the point-indicating sign data (c') (step S1606). CPU 106 sets the display position of the data (c') at (Cx1, Cy1+(Cy2−Cy1)−(1−$\alpha$)) (step S1608). In other words, CPU 106 causes the display position of the sign data to be moved as shown in FIG. 57. CPU 106 then ends the point-indicating sign data obtaining process.

Figure 58:
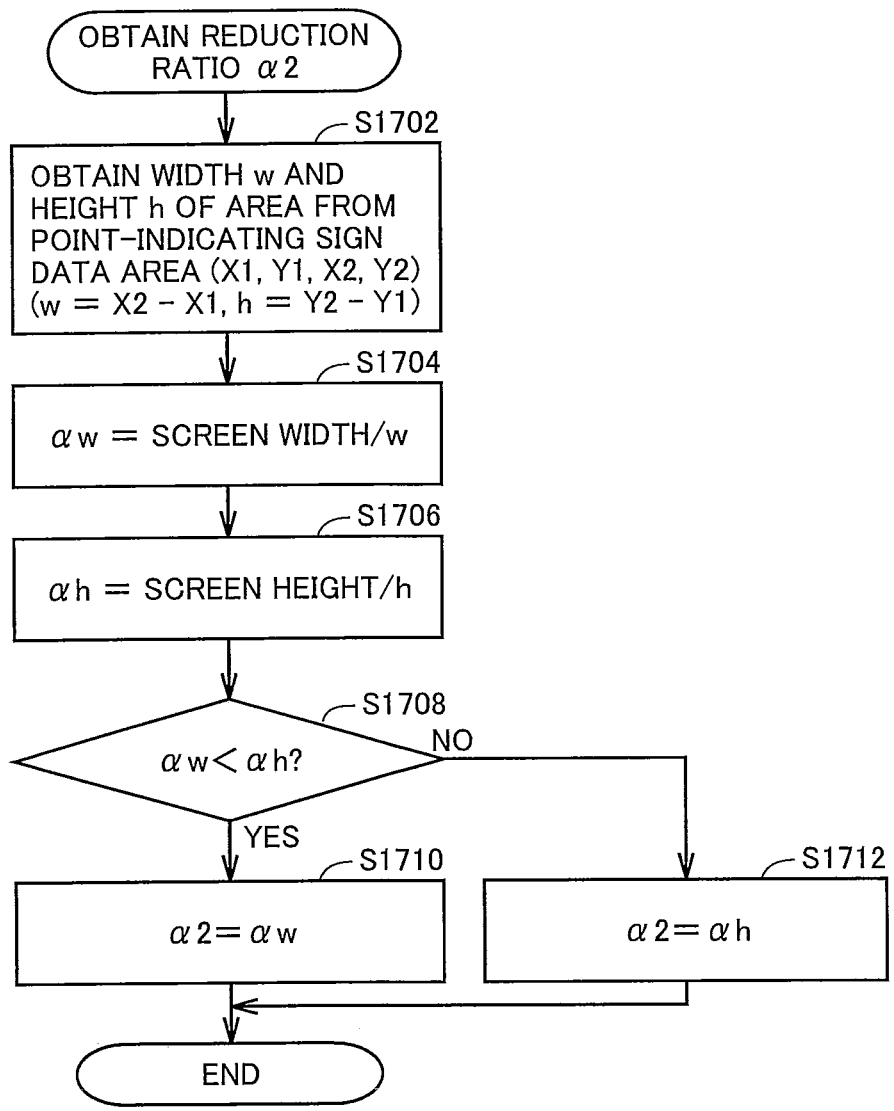
FIG. 58 is a flowchart illustrating a procedure of a process of obtaining a reduction ratio $\alpha 2$ in the mobile phone according to the present embodiment.

In the present embodiment, mobile phone 100 performs the process of obtaining a reduction ration $\alpha 2$, as will be described hereinafter. FIG. 58 is a flowchart illustrating a procedure of the process of obtaining reduction ration $\alpha 2$ in mobile phone 100 according to the present embodiment.

Referring to FIG. 58, based on the area of the point-indicating sign data, CPU 106 obtains width w and height h of this area (step S1702). More specifically, as for the area of the point-indicating sign data, width w and height h can be calculated by equations such as w=X2−X1 and h=Y2−Y1 based on the upper-left corner coordinates (X1, Y1) and the lower-right corner coordinates (X2, Y2).

CPU 106 substitutes a screen width/w into variable $\alpha w$ (step S1704). CPU 106 substitutes a screen height/h into variable $\alpha h$ (step S1706). CPU 106 determines whether or not variable $\alpha w$ is less than variable $\alpha h$ (step S1708). When variable $\alpha w$ is less than variable $\alpha h$ (YES in step S1708), CPU 106 substitutes variable αw into variable α2 (step S1710). CPU 106 then ends the process of obtaining reduction ratio α2.

On the other hand, when variable αw is not less than variable αh (NO in step S1708), CPU 106 substitutes variable αh into variable α2 (step S1712). CPU 106 then ends the process of obtaining reduction ratio α2.

Figure 59:
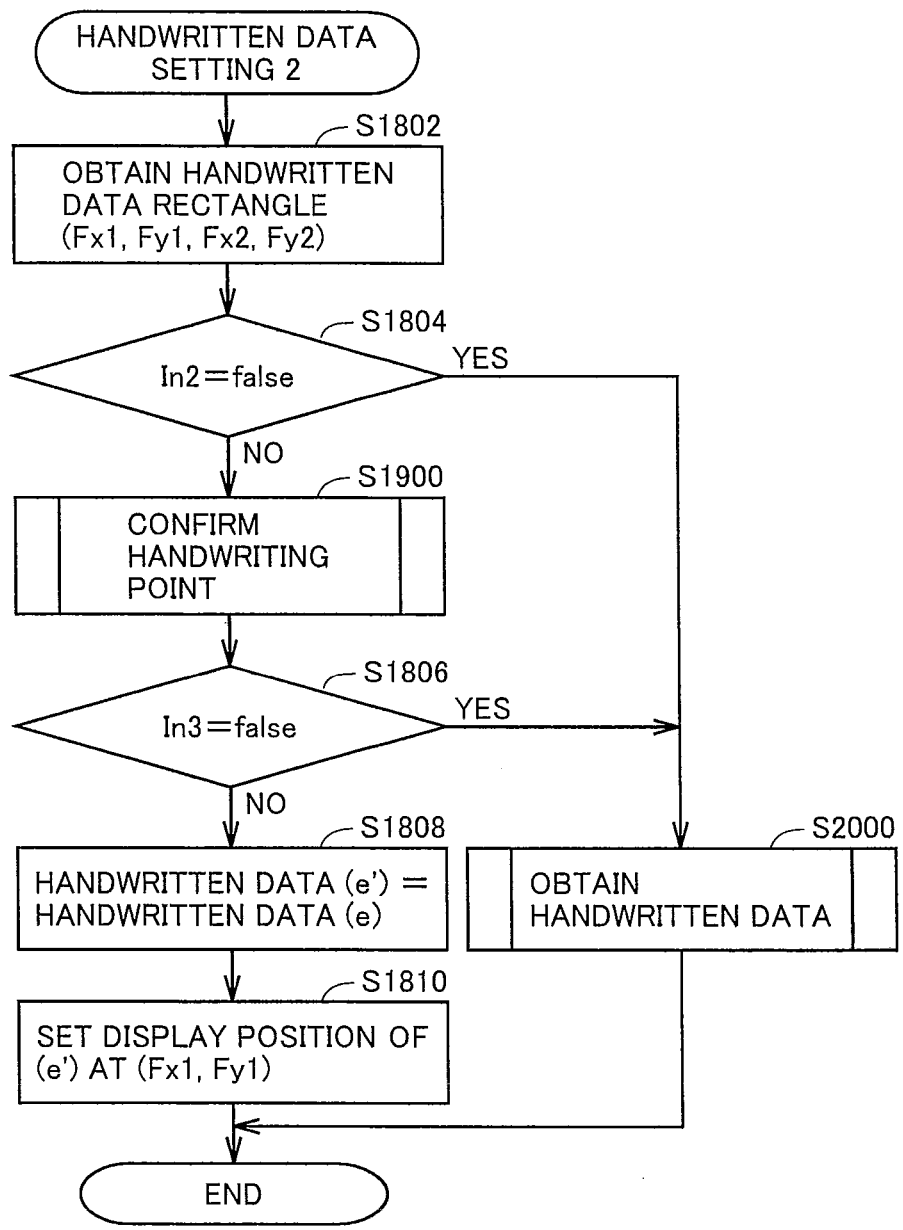
FIG. 59 is a flowchart illustrating a procedure of a handwritten data setting process 2 in the mobile phone according to the present embodiment.

In the present embodiment, mobile phone 100 performs handwritten data setting process 2, as will be described hereinafter. FIG. 59 is a flowchart illustrating a procedure of handwritten data setting process 2 in mobile phone 100 according to the present embodiment.

Referring to FIG. 59, CPU 106 obtains a rectangle outlined in the handwritten data (step S1802). More specifically, CPU 106 obtains upper-left coordinates (Fx1, Fy1) and lower-right coordinates (Fx2, Fy2) of the rectangle. CPU 106 determines whether or not "false" is substituted into variable In2 (step S1804). When "false" is substituted into variable In2 (YES in step S1804), CPU 106 performs a handwritten data obtaining process (step S2000). The handwritten data obtaining process (step S2000) will be described later. CPU 106 then ends handwritten data setting process 2.

When "false" is not substituted into variable In2 (No in step S1804), CPU 106 performs the handwriting point confirmation process (step S1900). The handwriting point confirmation process (step S1900) will be described later.

CPU 106 determines whether or not "false" is substituted into a variable In3 (step S1806). When "false" is substituted into variable In3 (YES in step S1806), CPU 106 performs the handwritten data obtaining process (step S2000).

When "false" is not substituted into variable In3 (NO in step S1806), CPU 106 substitutes handwritten data (e) into handwritten data (e') (step S1808). CPU 106 sets the display position of data (e') at (Fx1, Fy2) (step S1810). CPU 106 then ends handwritten data setting process 2.

Figure 60:
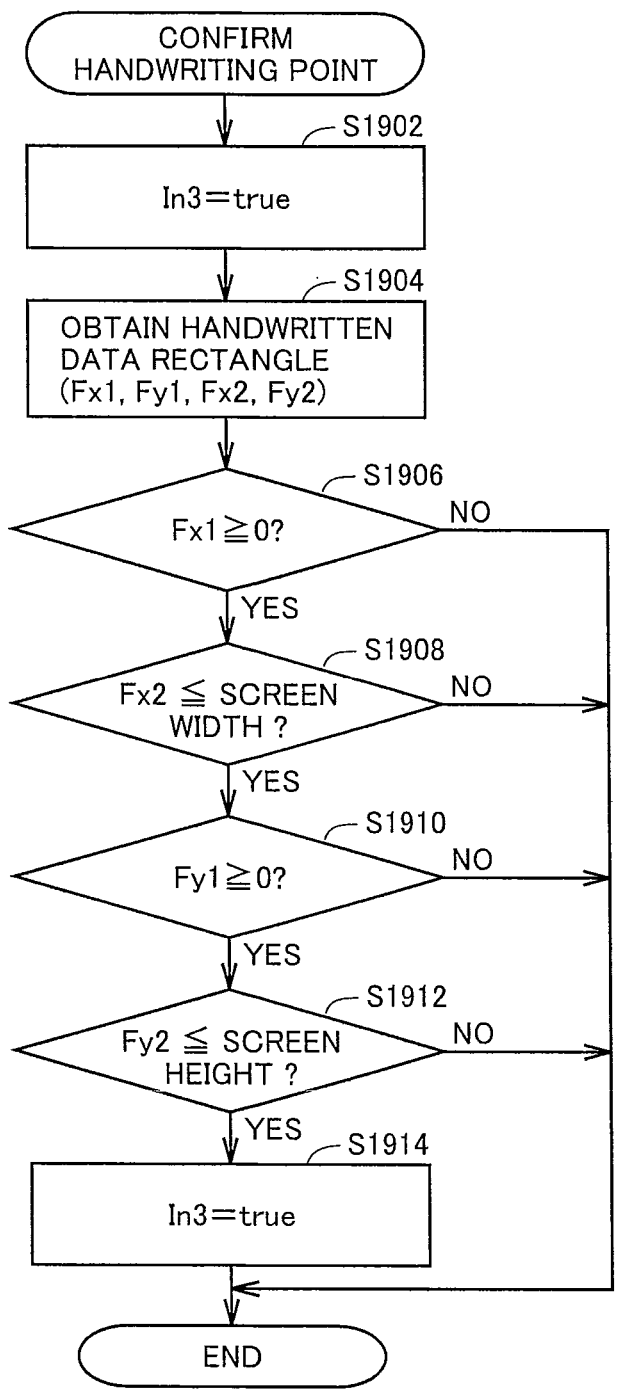
FIG. 60 is a flowchart illustrating a procedure of a handwriting point confirmation process in the mobile phone according to the present embodiment.

In the present embodiment, mobile phone 100 performs the handwriting point confirmation process, as will be described hereinafter. FIG. 60 is a flowchart illustrating a procedure of a handwriting point confirmation process in mobile phone 100 according to the present embodiment.

Referring to FIG. 60, CPU 106 substitutes "false" into variable In3 (step S1902). CPU 106 obtains a rectangular area for displaying handwritten data (step S1904). More specifically, CPU 106 obtains the upper-left coordinates (Fx1, Fy1) and the lower-right coordinates (Fx2, Fy2) of the rectangular area.

CPU 106 determines whether or not a variable Fx1 is not less than 0 (step S1906). When variable Fx1 is less than 0 (NO in step S1906), CPU 106 ends the handwriting point confirmation process.

When variable Fx1 is not less than 0 (YES in step S1906), CPU 106 determines whether or not a variable Fx2 is not more than the screen width (step S1908). When variable Fx2 is greater than the screen width (NO in step S1908), CPU 106 ends the handwriting point confirmation process.

When variable Fx2 is not more than the screen width (YES in step S1908), CPU 106 determines whether or not variable Fy1 is not less than 0 (step S1910). When variable Fy1 is less than 0 (NO in step S1910), CPU 106 ends the handwriting point confirmation process.

When variable Fy1 is not less than 0 (YES in step S1910), CPU 106 determines whether or not variable Fy2 is not more than the screen height (step S1912). When variable Fy2 is greater than the screen height (NO in step S1912), CPU 106 ends the handwriting point confirmation process.

When variable Fy2 is not more than the screen height (YES in step S1912), CPU 106 substitutes "true" into variable In3 (step S1914). CPU 106 then ends the handwriting point confirmation process.

Figure 61:
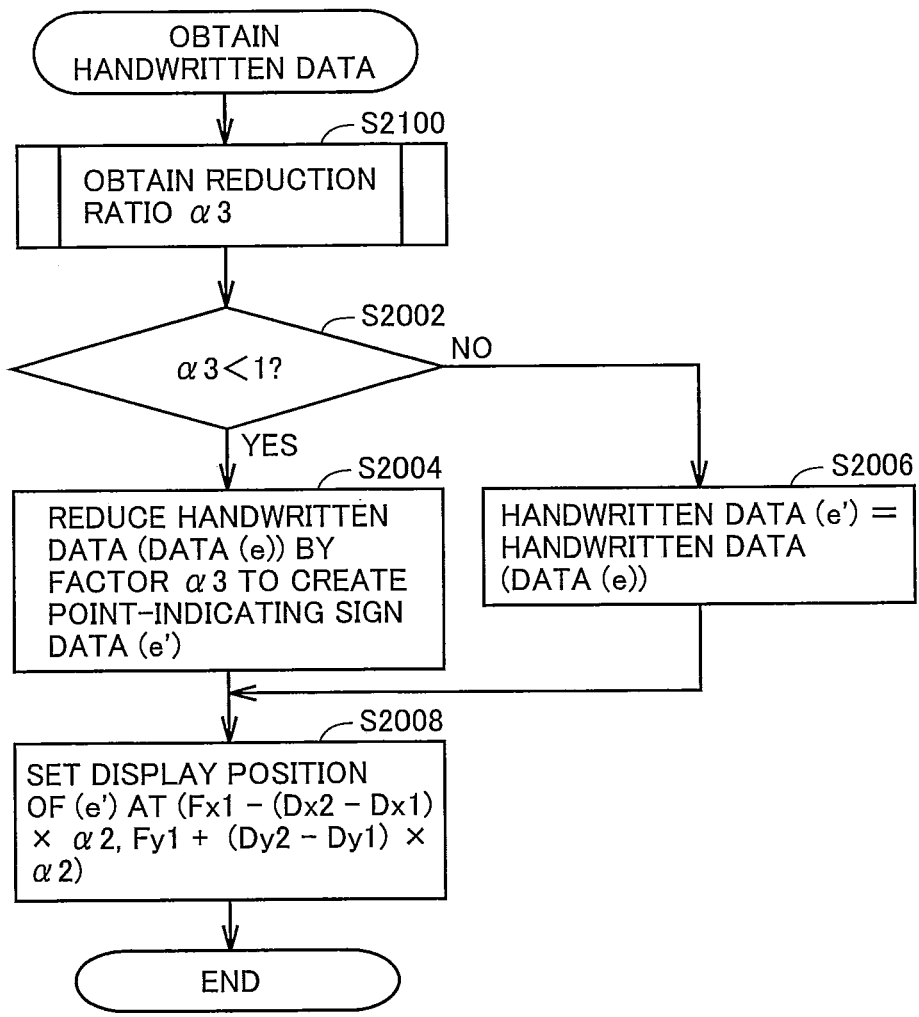
FIG. 61 is a flowchart illustrating a procedure of a handwritten data obtaining process in the mobile phone according to the present embodiment.
Figure 62:
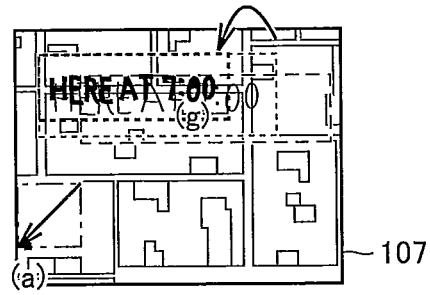
FIG. 62 is a representation of a screen in which a handwritten image is reduced by a factor of $\alpha 3$, according to the present embodiment.
Figure 63:
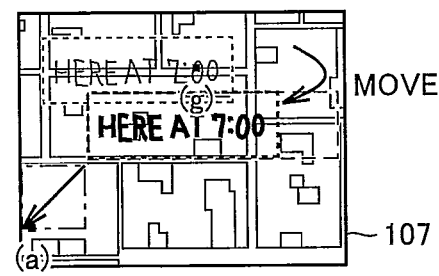
FIG. 63 is a representation of a screen in which the handwritten image is moved, according to the present embodiment.

In the present embodiment, mobile phone 100 performs the handwritten data obtaining process, as will be described hereinafter. FIG. 61 is a flowchart illustrating a procedure of the handwritten data obtaining process in mobile phone 100 according to the present embodiment. FIG. 62 is a representation of a screen in which a handwritten image is reduced by a factor of α3. FIG. 63 is a representation of a screen in which the handwritten image is moved.

Referring to FIG. 61, CPU 106 performs a process of obtaining a reduction ratio α3 (step S2100). CPU 106 determines whether or not variable α3 is less than 1 (step S2002). When variable α3 is less than 1 (YES in step S2002), CPU 106 reduces the handwritten data (data (e)) by a factor of α3 to create point-indicating sign data (e') (step S2004). In other words, as shown in FIG. 62, CPU 106 causes touch panel 102 to display the handwritten image reduced by a factor of α3. CPU 106 then performs the process from step S2008.

When variable α3 is not less than 1 (NO in step S2002), CPU 106 substitutes handwritten data (e) into handwritten data (e') (step S2006). CPU 106 sets the display position of handwritten data (e') at (Fx1−(Dx2−Dx1)×α2, Fy1+(Dy2−Dy1)α2) (step S2008). In other words, CPU 106 causes the handwritten image to be moved as shown in FIG. 63. CPU 106 then ends the handwritten data obtaining process.

Figure 64:
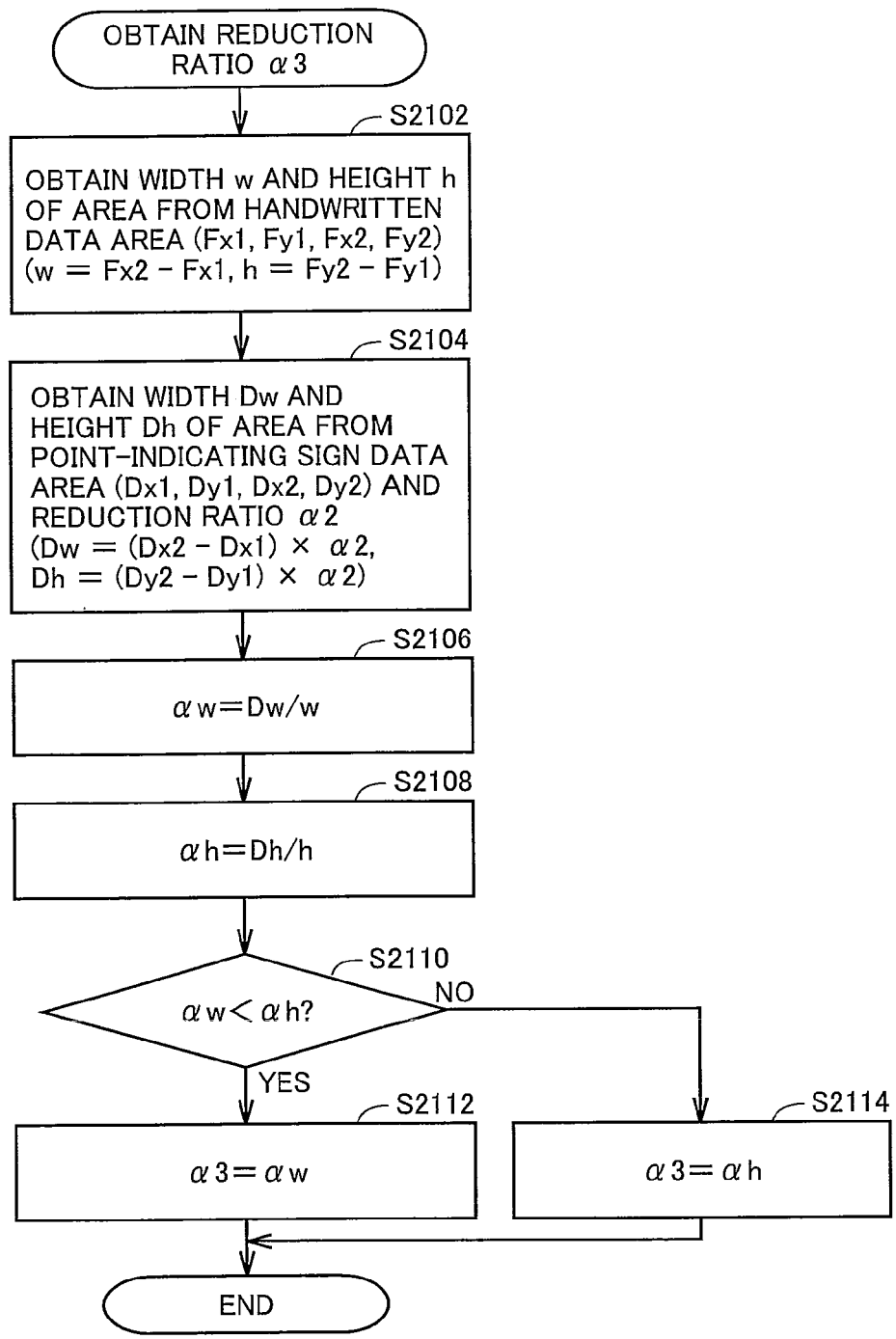
FIG. 64 is a flowchart illustrating a procedure of a process of obtaining a reduction ratio $\alpha 3$ in the mobile phone according to the present embodiment.

In the present embodiment, mobile phone 100 performs the process of obtaining reduction ratio α3, as will be described hereinafter. FIG. 64 is a flowchart illustrating a procedure of the process of obtaining reduction ratio α3 in mobile phone 100 according to the present embodiment.

Referring to FIG. 64, CPU 106 obtains a width w and a height h of the area based on the handwritten data area (step S2102). More specifically, CPU 106 obtains width w and height h of the handwritten data area based on the upper-left coordinates (Fx1, Fy1) and the lower-right coordinates (Fx2, Fy2) of the handwritten data area. For example, CPU 106 obtains width w and height h from the equations of w=Fx2−Fx1 and h=Fy2−Fy1.

Based on the area of the point-indicating sign data (sign area), CPU 106 obtains a width Dw and a height Dh of the sign area (step S2104). More specifically, CPU 106 obtains width Dw and height Dh of the sign area based on the upper-left coordinates (Dx1, Dy1) and the lower-right coordinates (Dx2, Dy2) of the sign area. For example, CPU 106 obtains width Dw and height Dh of the sign area based on Dw=(Dx2−Dx1)×α2 and Dh=(Dy2−Dy1)×α2.

CPU 106 substitutes Dw/w into variable αw (step S2106). CPU 106 substitutes Dh/h into variable αh (step S2108). CPU 106 determines whether or not variable αw is less than variable αh (step S2110). When variable αw is less than variable αh (YES in step S2110), CPU 106 substitutes variable αw into variable α3 (step S2112). CPU 106 then ends the process of obtaining reduction ratio α3.

When variable αw is not less than variable αh (NO in step S2110), CPU 106 substitutes variable αh into variable α3 (step S2114). CPU 106 then ends the process of obtaining reduction ratio α3.

Thus, the communication terminal according to the present embodiment is constituted as described below. CPU 106 of the communication terminal on the transmitting side associates designation of the point within the background with an input of the handwritten image and receives them via touch panel 102. CPU 106 of the communication terminal on the transmitting side stores the information for identifying the position in association with the handwritten image data in memory 103, and transmits the information and the handwritten image data to another communication terminal (communication terminal on the receiving side) via communication device 101.

CPU 106 of the communication terminal on the receiving side associates the information for identifying the position with the handwritten image data and receives them from another communication terminal (communication terminal on the transmitting side) via communication device 101. Accordingly, CPU 106 of the communication terminal on the receiving side can cause touch panel 102 (display 107) to display the handwritten image in the area corresponding to the point on the background (for example, in the vicinity of this point or around this point) and also in the area where the handwritten image can be entirely displayed.

In addition, the communication terminal may associate, with one another, the information showing the designated point on the background image, the information showing the position or the area at which the sign indicating a point on the background image is displayed, and the information showing the point or the area at which the handwritten image on the background image is displayed. The communication terminal then may these pieces of information to another communication terminal. Alternatively, the communication terminal may associate, with one another, the information showing the designated point on the background image, the information showing the position or the area at which the sign indicating the point to the designated point is displayed, and the information showing the point or the area at which the handwritten image with respect to the designated point is displayed. Then, the communication terminal may transmit these pieces of information to another communication terminal.

Particularly in consideration of bidirectional communication, the background image may be greater in size than the display of any of the communication terminals.

Furthermore, the communication terminal according to the present embodiment is not limited to any of those performing P2P communication. For example, the communication terminal may associate the information for identifying the position with the handwritten image data, and transmit and receive the same through a server or the like.

According to the above-described configuration, the communication terminal in accordance with the present embodiment allows the communication terminal on the receiving side to display the contents transmitted from the communication terminal on the transmitting side in the position corresponding to the display position desired by the transmitting side.

<Application Example of Network System 1 According to Present Embodiment>

It is needless to say that the present invention is also applicable to a case achieved by providing a system or a device with a program. The present invention's effect can also be achieved in such a manner that a storage medium having stored therein a program represented by software for achieving the present invention is provided to a system or a device, and a computer (or CPU or MPU) of the system or device reads and performs a program code stored in the storage medium.

In that case, the program code per se read from the storage medium will implement the function of the above-described embodiment, and the storage medium having the program code stored therein will configure the present invention.

The storage medium for providing the program code can, for example, be a hard disc, an optical disc, a magneto-optical disc, a CD-ROM, a CD-R, a magnetic tape, a non-volatile memory card (an IC memory card), ROMs (mask ROM, flash EEPROM, or the like), or the like.

Furthermore, it is needless to say that not only can the program code read by the computer be executed to implement the function of the above-described embodiment, but a case is also included in which, in accordance with the program code's instruction, an operating system (OS) running on the computer performs an actual process partially or entirely and that process implements the function of the above-described embodiment.

Furthermore, it is also needless to say that a case is also included in which the program code read from the storage medium is written to memory included in a feature expansion board inserted in a computer or a feature expansion unit connected to the computer, and subsequently, in accordance with the program code's instruction, a CPU included in the feature expansion board or the feature expansion unit performs an actual process partially or entirely and that process implements the function of the above-described embodiment.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST

1 network system, 100, 100A, 100B, 100C mobile phone, 101 communication device, 102 touch panel, 103 memory 103A work memory, 103B address book data, 103C own terminal's data, 103D address data, 103E address data, 104 pen tablet, 106 CPU, 107 display, 107A, 107B, 107C display, 107X handwritten image, 107Y point image, 107Z scroll bar, 108 microphone, 109 speaker, 110 various types of buttons, 110A button, 110B mail button, 110C button, 110D address book button, 110E end button, 111 first notification unit, 112 second notification unit, 120 stylus pen, 200 car navigation device, 250 vehicle, 300 personal computer, 400 chat server, 406 memory, 406A room management table, 407 fixed disk, 408 internal bus, 409 server communication device, 500 Internet network, 600 contents server, 606 memory, 607 fixed disk, 608 Internal bus, 609 server communication device, 615 fixed disk, 700 carrier network, 1030a, 1030b image data, 1031a, 1031b, 1032a, 1032b, 1033a, 1033b layer, 1071 point designation button, 1072 call-out button, 1073 arrow button, 1074 rectangular button, 1075 handwriting button, 1076 setting button.

The invention claimed is:

1. A network system including at least first and second communication terminals capable of communicating with each other via a network,
said first communication terminal comprising:
a first display;
a first communication device; and
a first processor causing an image to be displayed on said first display, causing handwritten data input, in response to an instruction for a positional reference point on said image, to be displayed in a certain position on the image corresponding to said positional reference point, associating point information about said positional reference point with said handwritten data, and causing said first communication device to transmit the point information about said positional reference point and the handwritten data to said second communication terminal,
said second communication terminal comprising:
a second display;

a second communication device; and a second processor, based on said point information about said positional reference point and said handwritten data from said first communication terminal, causing at least a part of said image to be displayed on said second display and causing said handwritten data to be displayed in a location in accordance with said point information about said positional reference point, wherein said positional reference point is separate from the handwritten data;

wherein said second processor determines whether or not said positional reference point in said image is displayed on said second display, and when said positional reference point is displayed, said second processor causes all regions of said handwritten data to be entirely displayed on said second display based on said point information.

2. The network system according to claim 1, wherein said image is greater in size than said second display.

3. The network system according to claim 1, wherein when said positional reference point is displayed, said second processor determines whether or not said second display can entirely display all regions of said handwritten data, and when said second display cannot entirely display all regions of said handwritten data, said second processor causes said handwritten data to be moved based on said point information, thereby allowing all regions of said handwritten data to be entirely displayed on said second display.

4. The network system according to claim 1, wherein when said positional reference point is displayed, said second processor determines whether or not said second display can entirely display all regions of said handwritten data, and when said second display cannot entirely display all regions of said handwritten data, said second processor reduces a size of said handwritten data based on said point information, thereby allowing all regions of said handwritten data to be entirely displayed on said second display.

5. The network system according to claim 1, wherein, when said positional reference point is not displayed, said second processor causes all regions of said handwritten data to be displayed in a prescribed position on said second display.

6. The network system according to claim 5, wherein, when said positional reference point is not displayed, said second processor causes an image showing a direction of said positional reference point to be displayed on said second display.

7. The network system according to claim 1, wherein said image is a map.

8. A communication method in a network system including at least first and second communication terminals capable of communicating with each other via a network, said communication method comprising:

said first communication terminal receiving an instruction for a positional reference point on an image;

said first communication terminal receiving an input of handwritten data;

said first communication terminal causing at least a part of said image to be displayed on a first display and causing said handwritten data to be displayed in a location corresponding to said positional reference point;

said first communication terminal associating point information about said positional reference point with said handwritten data and causing a first communication device to transmit said point information about said positional reference point and said handwritten data to said second communication terminal; and based on said point information and said handwritten data from said first communication terminal, said second communication terminal causing at least a part of said image to be displayed on a second display and causing said handwritten data to be displayed in a location in accordance with said point information about said positional reference point, wherein said positional reference point is separate from the handwritten data;

wherein said second processor determines whether or not said positional reference point in said image is displayed on said second display, and when said positional reference point is displayed, said second processor causes all regions of said handwritten data to be entirely displayed on said second display based on said point information.

9. A communication terminal capable of communicating with another communication terminal via a network, said communication terminal comprising:

a display;

a communication device; and a processor, based on positional reference point information and handwritten data from said another communication terminal, causing said display to display said handwritten data in a location in accordance with said positional reference point information about said positional reference point, wherein said positional reference point is separate from the handwritten data;

wherein said processor determines whether or not said positional reference point in said image is displayed on said display, and when said positional reference point is displayed, said processor causes all regions of said handwritten data to be entirely displayed on said second display based on said point information.

* * * * *